United States Patent
Sasaki et al.

(10) Patent No.: US 10,802,694 B2
(45) Date of Patent: Oct. 13, 2020

(54) INFORMATION APPARATUS HAVING AN INTERFACE FOR A REMOTE CONTROL

(71) Applicant: PANASONIC INTELLECTUAL PROPERTY CORPORATION OF AMERICA, Torrance (CA)

(72) Inventors: Takamitsu Sasaki, Osaka (JP); Eiichi Naito, Kyoto (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 475 days.

(21) Appl. No.: 14/546,368

(22) Filed: Nov. 18, 2014

(65) Prior Publication Data

US 2015/0074584 A1     Mar. 12, 2015

Related U.S. Application Data

(63) Continuation of application No. PCT/JP2014/000658, filed on Feb. 7, 2014.
(Continued)

(51) Int. Cl.
*G06F 3/0484* (2013.01)
*G08C 17/00* (2006.01)
(Continued)

(52) U.S. Cl.
CPC ........... *G06F 3/04847* (2013.01); *A47H 5/02* (2013.01); *E06B 3/485* (2013.01); *E06B 9/32* (2013.01);
(Continued)

(58) Field of Classification Search
CPC ... G05B 19/042; G06F 3/04883; G06F 3/017; G06F 3/147; G06F 3/12; G06F 3/048;
(Continued)

(56) References Cited

U.S. PATENT DOCUMENTS

| | | |
|---|---|---|
| 5,297,252 A | 3/1994 | Becker |
| 5,650,800 A | 7/1997 | Benson |

(Continued)

FOREIGN PATENT DOCUMENTS

| | | |
|---|---|---|
| CN | 101519941 A | 9/2009 |
| CN | 102289319 A | 12/2011 |

(Continued)

OTHER PUBLICATIONS

Final Office Action in U.S. Appl. No. 14/547,700 dated Nov. 17, 2015.
(Continued)

*Primary Examiner* — Jennifer N To
*Assistant Examiner* — Qi Wan
(74) *Attorney, Agent, or Firm* — Greenblum & Bernstein, P.L.C.

(57) ABSTRACT

A control method of the present disclosure causes a computer of an information apparatus to: display an operation icon on a display screen of the information apparatus, the operation icon causing an operation screen for an electric curtain device to be displayed; display the operation screen for the electric curtain device when selection of the operation icon is sensed, the operation screen including a curtain image representing a curtain of the electric curtain device; and when a pinch-out operation is sensed on the operation screen, output to a network a first open control command for opening the curtain of the electric curtain device.

27 Claims, 54 Drawing Sheets

Related U.S. Application Data

(60) Provisional application No. 61/766,843, filed on Feb. 20, 2013.

(51) Int. Cl.

| | | |
|---|---|---|
| *A47H 5/02* | (2006.01) | |
| *E06B 9/32* | (2006.01) | |
| *H04L 12/28* | (2006.01) | |
| *G06F 3/0481* | (2013.01) | |
| *G06F 3/0482* | (2013.01) | |
| *G06F 3/0488* | (2013.01) | |
| *H04L 29/08* | (2006.01) | |
| *E06B 3/48* | (2006.01) | |

(52) U.S. Cl.
CPC .......... *G06F 3/0482* (2013.01); *G06F 3/0484* (2013.01); *G06F 3/0488* (2013.01); *G06F 3/04817* (2013.01); *G06F 3/04842* (2013.01); *G06F 3/04883* (2013.01); *G08C 17/00* (2013.01); *H04L 12/282* (2013.01); *H04L 67/025* (2013.01); *A47H 2005/025* (2013.01); *G06F 2203/04808* (2013.01); *G08C 2201/30* (2013.01); *G08C 2201/40* (2013.01); *G08C 2201/50* (2013.01)

(58) Field of Classification Search
CPC ......... H05B 37/0245; A47H 5/02; E06B 3/48; E06B 9/32
See application file for complete search history.

(56) References Cited

U.S. PATENT DOCUMENTS

| | | | |
|---|---|---|---|
| 5,897,252 A | 4/1999 | Kanakubo | |
| 6,057,814 A * | 5/2000 | Kalt | G02B 26/02 345/31 |
| 6,160,359 A | 12/2000 | Fleischmann | |
| 6,909,921 B1 | 6/2005 | Bilger | |
| 7,730,223 B1 | 6/2010 | Bavor et al. | |
| 8,239,087 B2 | 8/2012 | Dybalski et al. | |
| 8,330,572 B2 | 12/2012 | Rodriguez et al. | |
| 8,380,359 B2 | 2/2013 | Duchene et al. | |
| 8,579,452 B2 | 11/2013 | Diederiks et al. | |
| 8,665,225 B2 | 3/2014 | Herz et al. | |
| 8,717,403 B1 * | 5/2014 | Kalevo | H04N 7/15 348/14.02 |
| 2002/0040266 A1 * | 4/2002 | Edgar | H02H 7/0851 701/49 |
| 2003/0069665 A1 | 4/2003 | Haag | |
| 2003/0231197 A1 | 12/2003 | Janevski | |
| 2004/0260427 A1 | 12/2004 | Wimsatt | |
| 2005/0044511 A1 * | 2/2005 | Jong | G06F 3/147 715/865 |
| 2007/0080940 A1 | 4/2007 | Aoki et al. | |
| 2007/0187042 A1 | 8/2007 | Kallstrom | |
| 2007/0229465 A1 | 10/2007 | Sakai et al. | |
| 2008/0191898 A1 | 8/2008 | Janik | |
| 2008/0238913 A1 * | 10/2008 | Katoh | B60K 37/02 345/418 |
| 2008/0316730 A1 | 12/2008 | Diederiks et al. | |
| 2009/0210110 A1 | 8/2009 | Dybalski et al. | |
| 2009/0271738 A1 | 10/2009 | Glaser-Seidnitzer et al. | |
| 2010/0031202 A1 | 2/2010 | Morris et al. | |
| 2010/0141602 A1 | 6/2010 | Duchene et al. | |
| 2010/0145485 A1 * | 6/2010 | Duchene | G05B 19/042 700/90 |
| 2010/0146423 A1 | 6/2010 | Duchene et al. | |
| 2010/0154124 A1 | 6/2010 | Zerhusen et al. | |
| 2010/0157124 A1 | 6/2010 | Inoue et al. | |
| 2010/0241982 A1 * | 9/2010 | Motosugi | G06F 3/1204 715/771 |
| 2010/0312366 A1 * | 12/2010 | Madonna | H05B 37/0245 700/90 |
| 2011/0037712 A1 * | 2/2011 | Kim | H04M 1/7253 345/173 |
| 2011/0246538 A1 * | 10/2011 | Boley | G06F 17/30398 707/805 |
| 2012/0029701 A1 * | 2/2012 | Houser | E05F 15/63 700/275 |
| 2012/0066608 A1 * | 3/2012 | Sundermeyer | G08B 25/003 715/738 |
| 2012/0083244 A1 * | 4/2012 | Verthein | H04M 1/72533 455/411 |
| 2012/0218206 A1 * | 8/2012 | Sato | G06F 3/041 345/173 |
| 2013/0121510 A1 | 5/2013 | Yuasa et al. | |
| 2013/0127603 A1 | 5/2013 | Choo et al. | |
| 2013/0135234 A1 * | 5/2013 | Hisano | G06F 3/017 345/173 |
| 2013/0139102 A1 | 5/2013 | Miura et al. | |
| 2013/0346906 A1 * | 12/2013 | Farago | G06F 3/04883 715/776 |
| 2014/0002387 A1 * | 1/2014 | Hashiba | G06F 3/041 345/173 |
| 2014/0040831 A1 | 2/2014 | Akasaka et al. | |
| 2014/0043791 A1 | 2/2014 | Diederiks et al. | |
| 2014/0236358 A1 | 8/2014 | Sasaki et al. | |
| 2015/0114574 A1 | 4/2015 | Fiedler et al. | |
| 2015/0339031 A1 | 11/2015 | Zeinstra et al. | |
| 2016/0096509 A1 * | 4/2016 | Ette | B60R 25/305 382/103 |

FOREIGN PATENT DOCUMENTS

| | | |
|---|---|---|
| EP | 2196878 A1 | 6/2010 |
| JP | 08-149575 | 6/1996 |
| JP | 10-220139 | 8/1998 |
| JP | 2000-138979 | 5/2000 |
| JP | 2000-291351 | 10/2000 |
| JP | 2002-300680 | 10/2002 |
| JP | 2003-348250 | 12/2003 |
| JP | 2004-166980 | 6/2004 |
| JP | 2007-104567 | 4/2007 |
| JP | 2009-521090 | 5/2009 |
| JP | 2009-213107 | 9/2009 |
| JP | 2009-301302 | 12/2009 |
| JP | 2010-158002 | 7/2010 |
| JP | 2011-094408 | 5/2011 |
| JP | 2012-050653 | 3/2012 |
| JP | 2012-231249 | 11/2012 |
| JP | 5128489 | 11/2012 |

OTHER PUBLICATIONS

Avery, Yan, "MyDoorOpener-2.0.mp4", Jun. 6, 2012, YouTube video, https://www.youtube.com/watch?v=2L4TArAwTGk.
"Smart Garage Door Systems", Postscapes, accessed Jul. 13, 2015.
Avery, Yan, "MyDoorOpener-1.3.mov", Jan. 9, 2011, YouTube video, https://www.youtube.com/watch?v=iqFs5aXuzxY.
U.S. Appl. No. 14/547,700 to Takamitsu Sasaki et al., filed Nov. 19, 2014.
Search report from PCT/JP2013/005788, dated Jan. 7, 2014.
Search report from PCT/JP2014/000772, dated Apr. 28, 2014.
Search report from PCT/JP2013/002879, dated Aug. 6, 2013.
Search report from PCT/JP2014/000658, dated Apr. 8, 2014.
Office Action in U.S. Appl. No. 14/165,767 dated Aug. 5, 2016.
Office Action in U.S. Appl. No. 14/165,767 dated Apr. 29, 2016.
Somfy: "Somfy Domotique: Decouvrez TaHoma de Somfy—Solution domotique pour piloter votre maison!", XP054975583, Nov. 5, 2010.
Extended European Search Report in EP 13821050.5, dated Feb. 11, 2016.
Extended European Search Report in EP 13874218.4, dated Mar. 9, 2016.
Extended European Search Report in EP 14754062.9, dated Mar. 9, 2016.
Office Action in U.S. Appl. No. 14/462,614 dated Dec. 19, 2016.

(56) References Cited

OTHER PUBLICATIONS

Office Action issued in U.S. Appl. No. 14/462,614, dated Jan. 4, 2018.

* cited by examiner

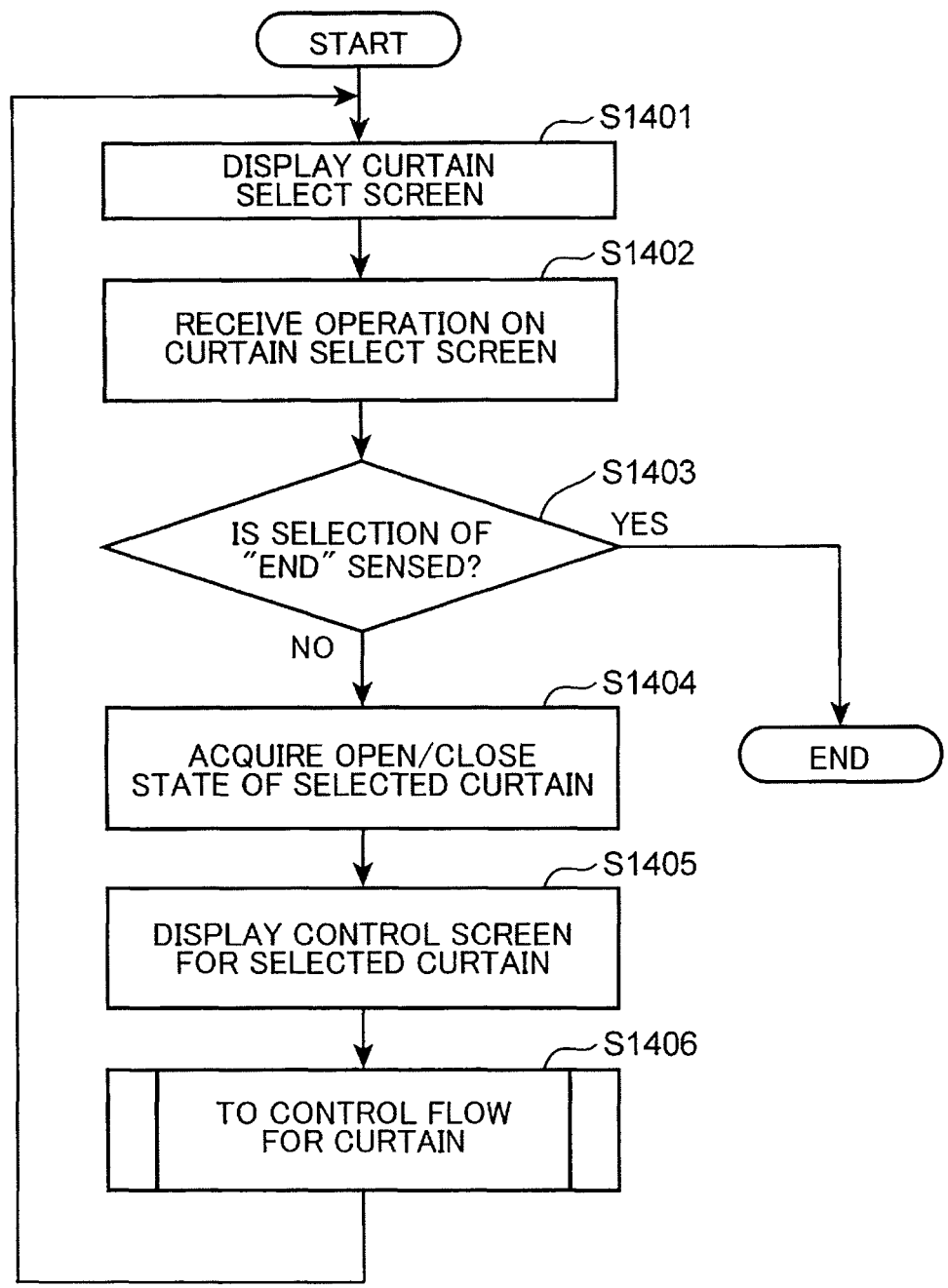

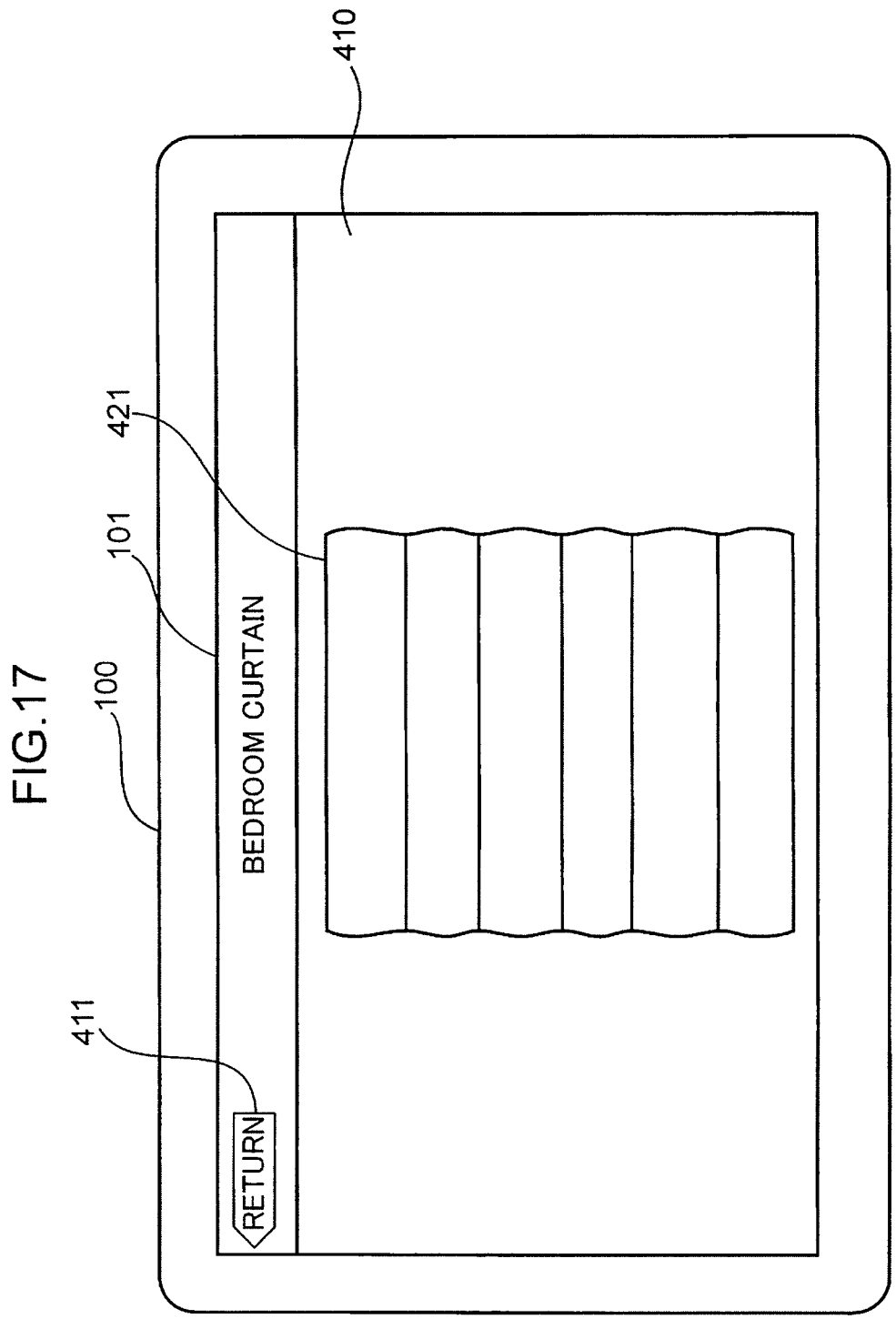

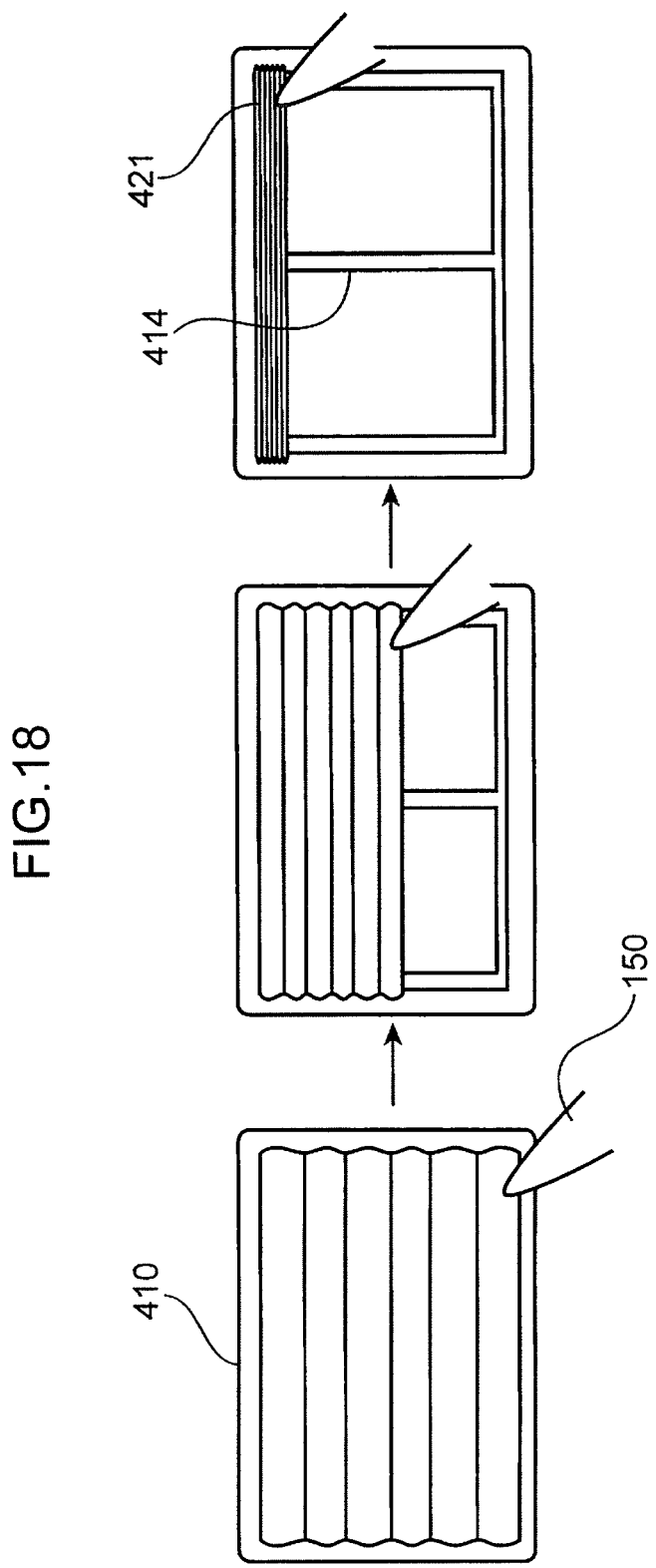

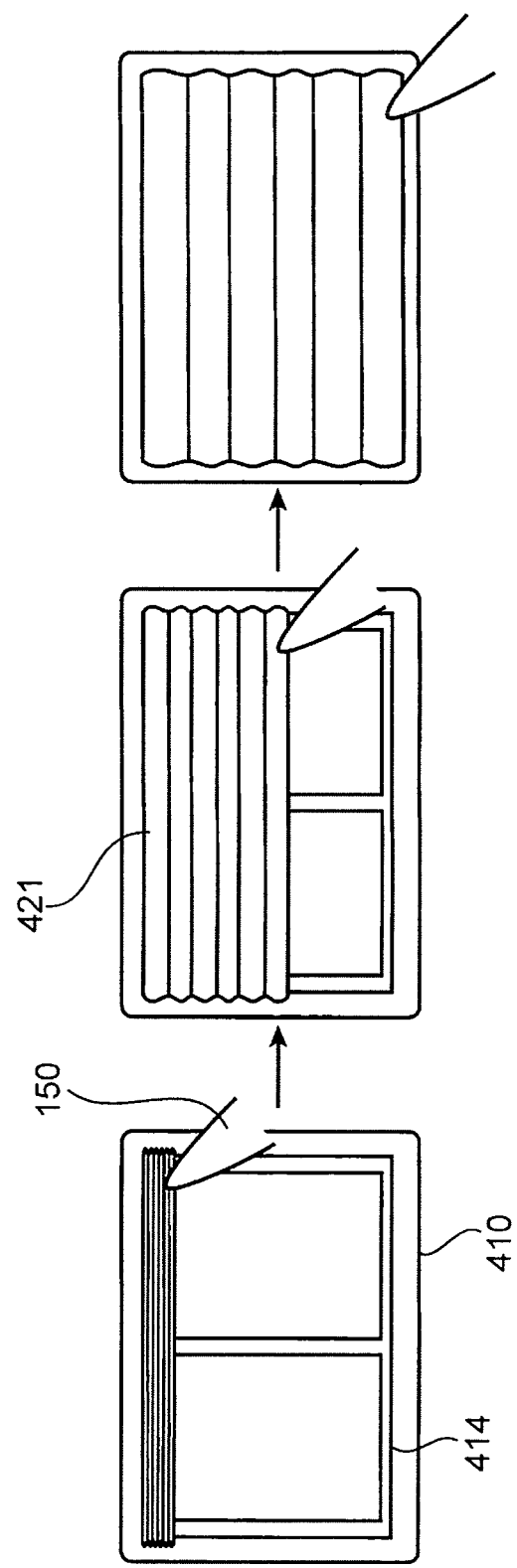

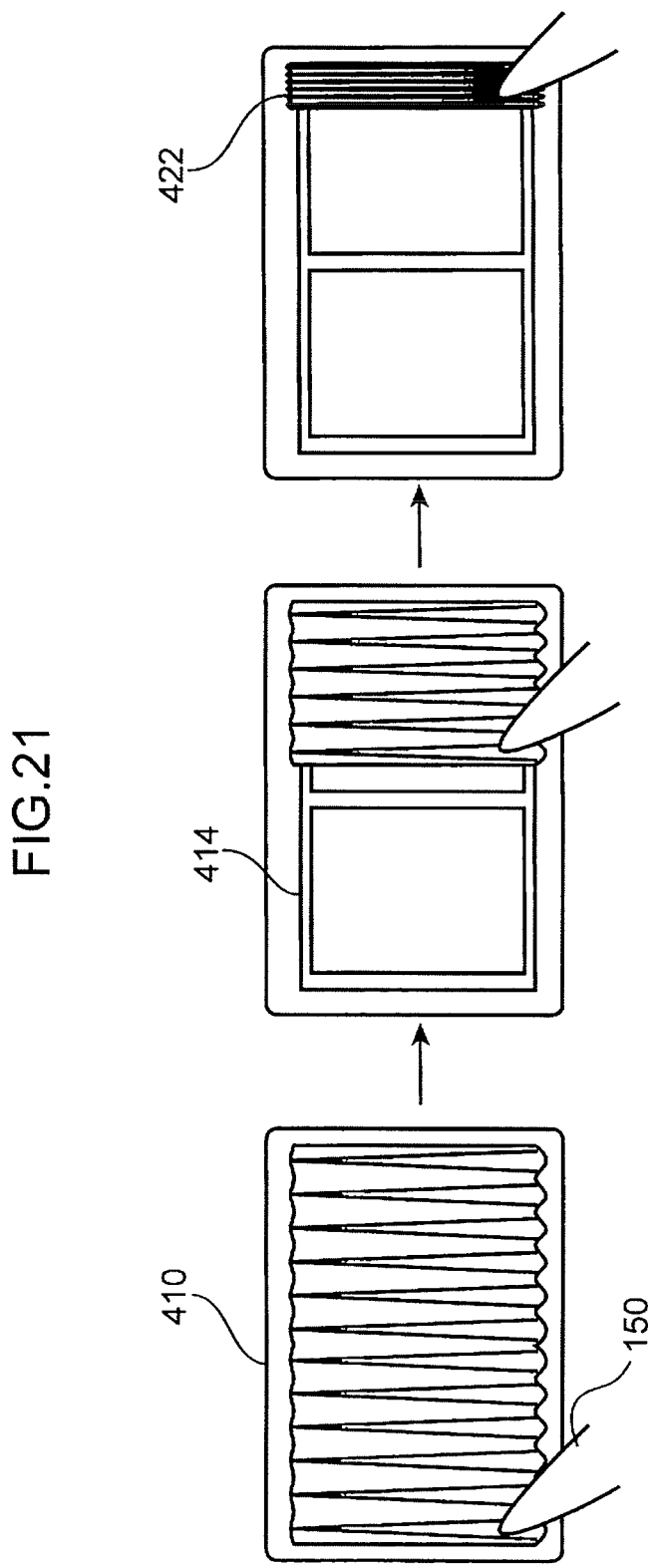

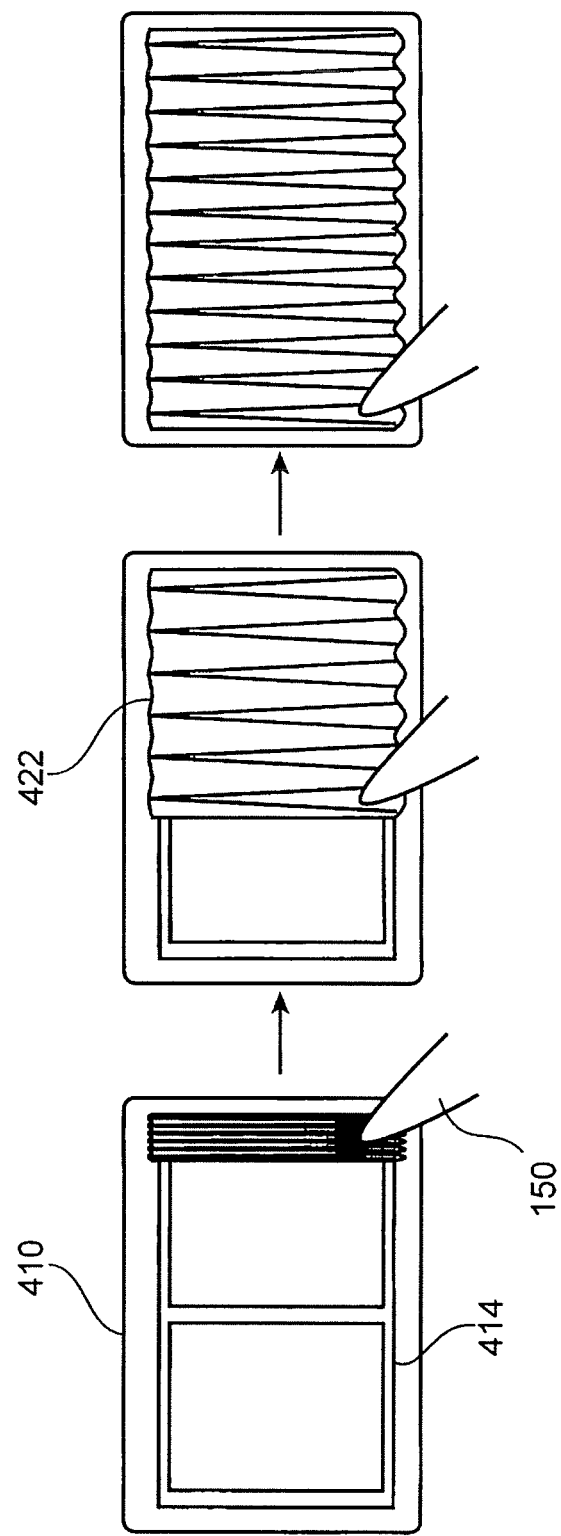

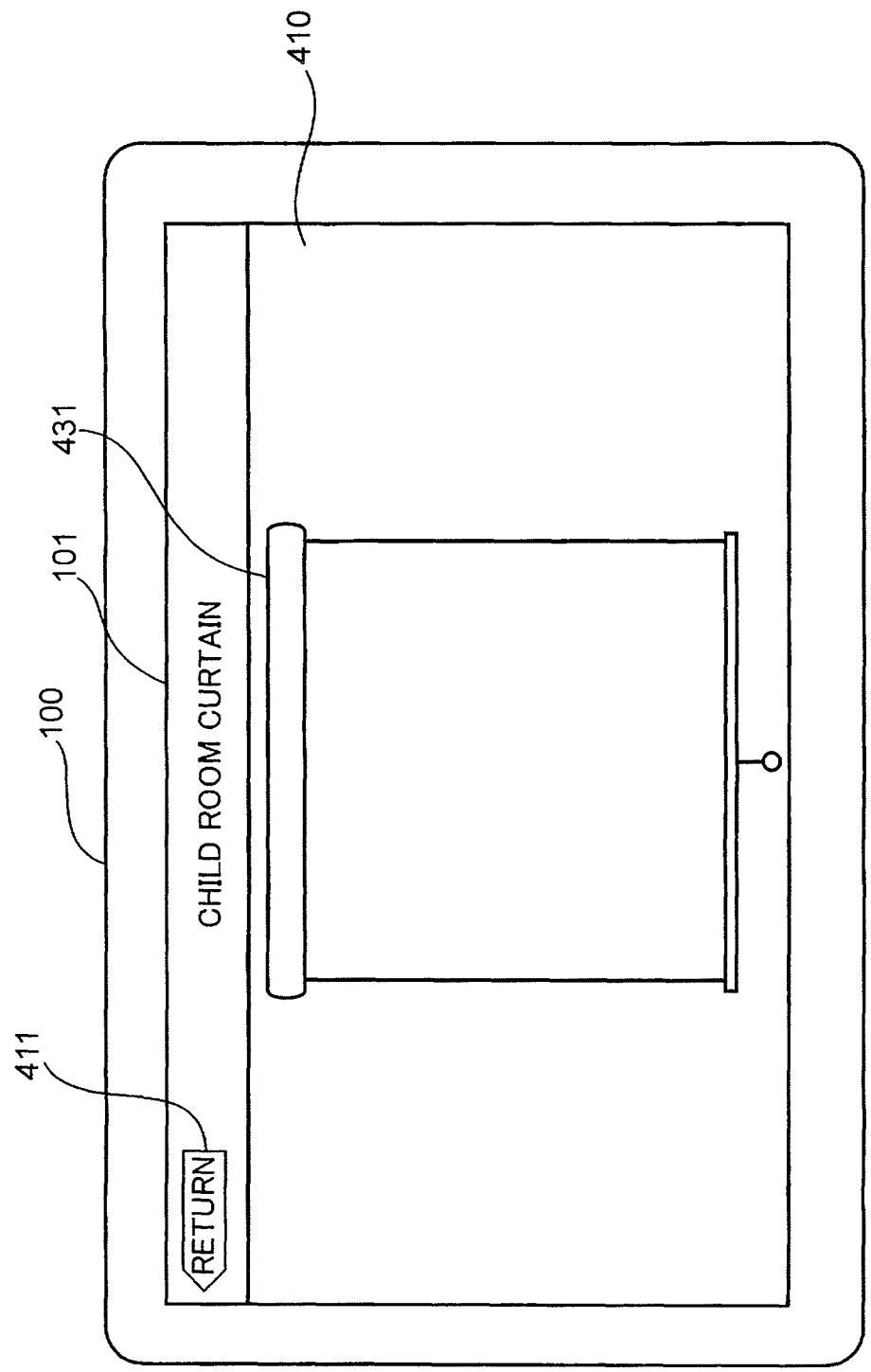

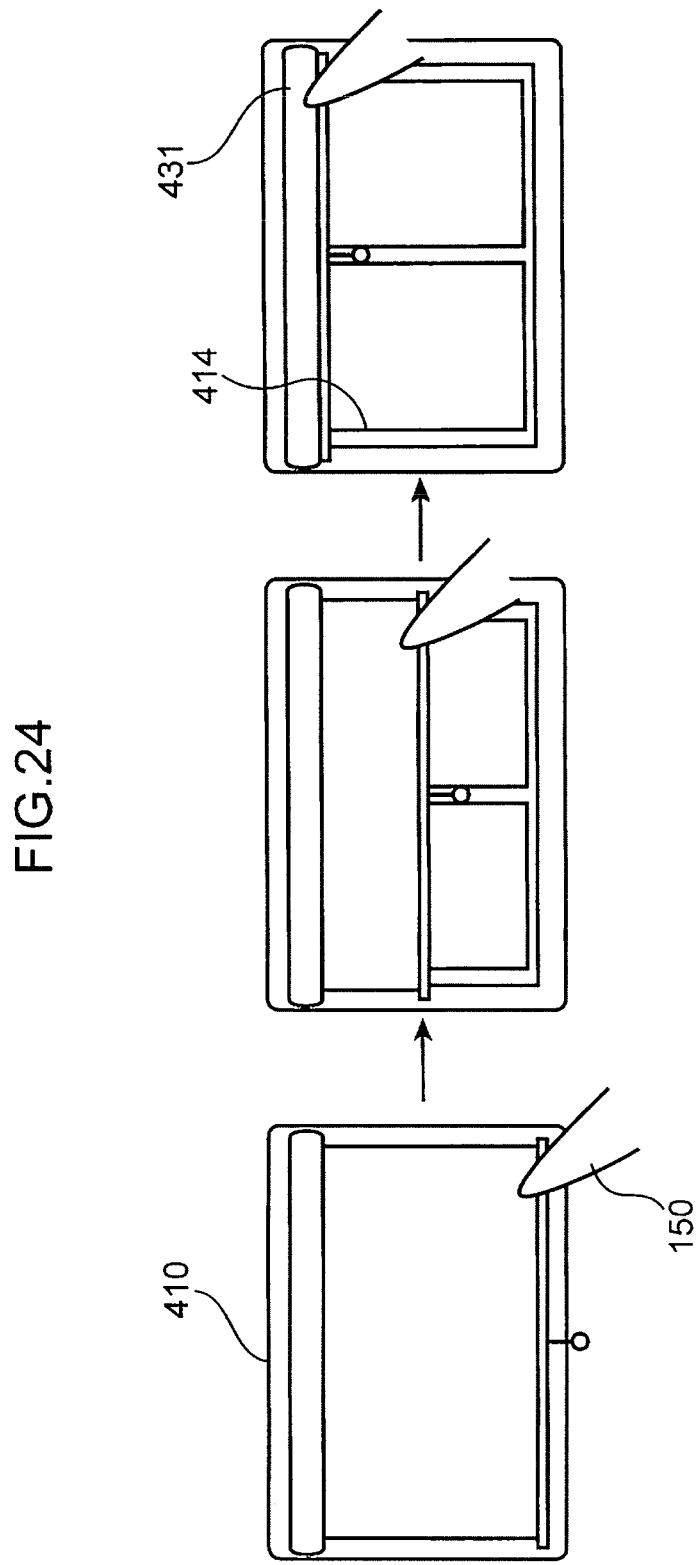

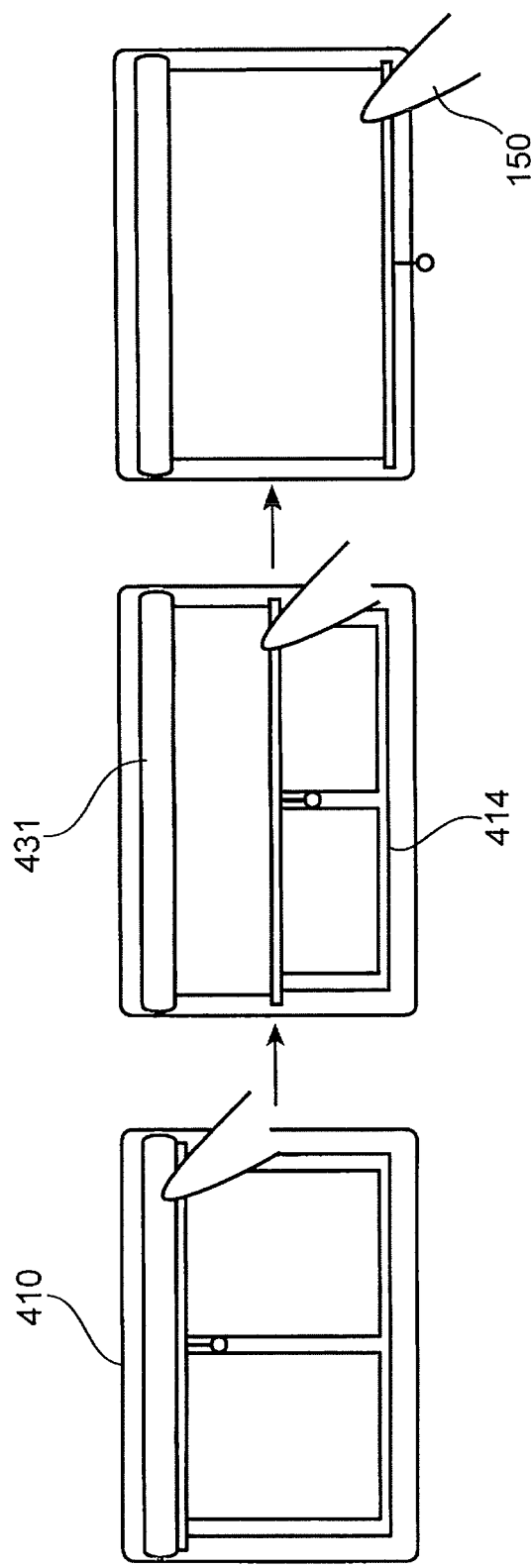

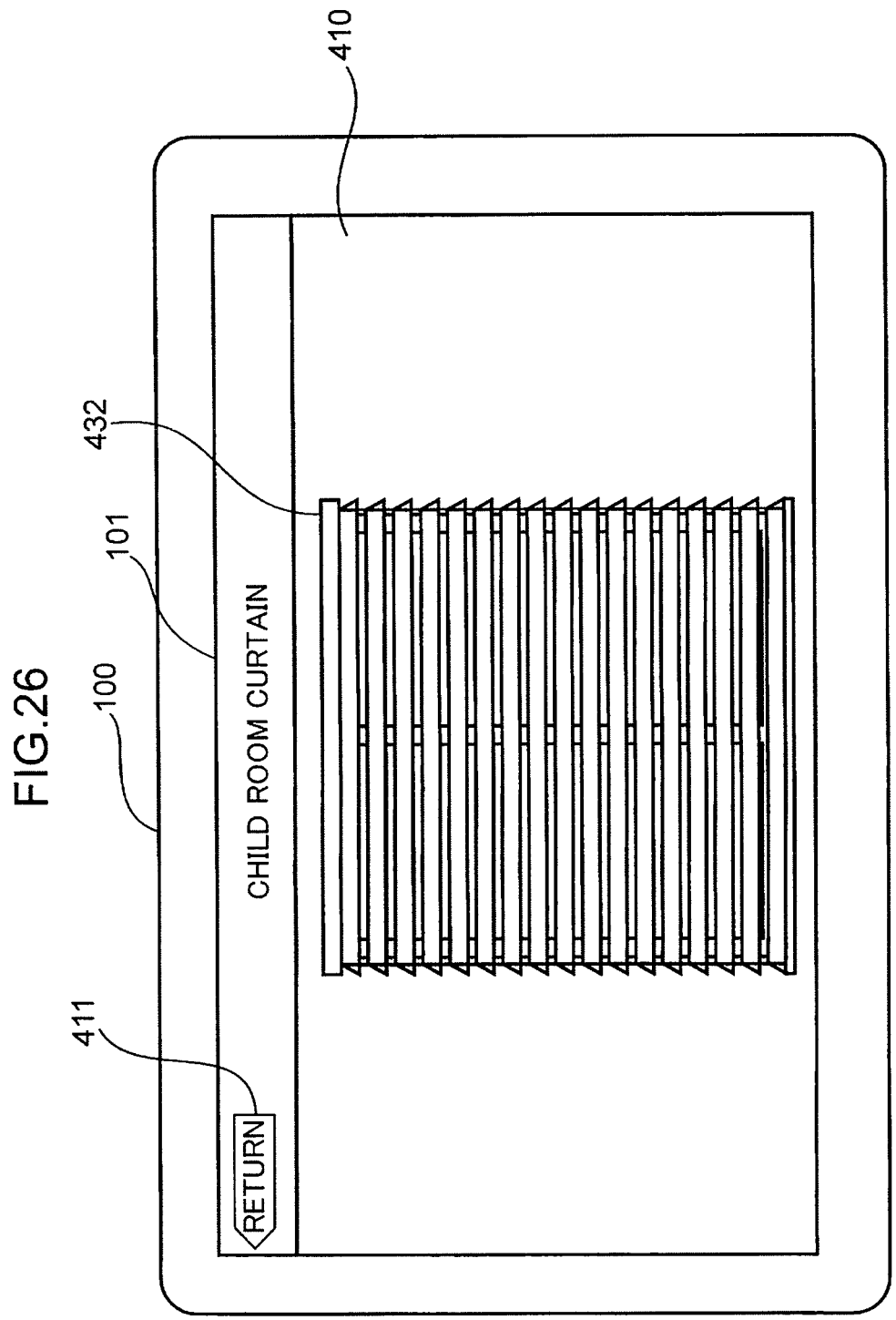

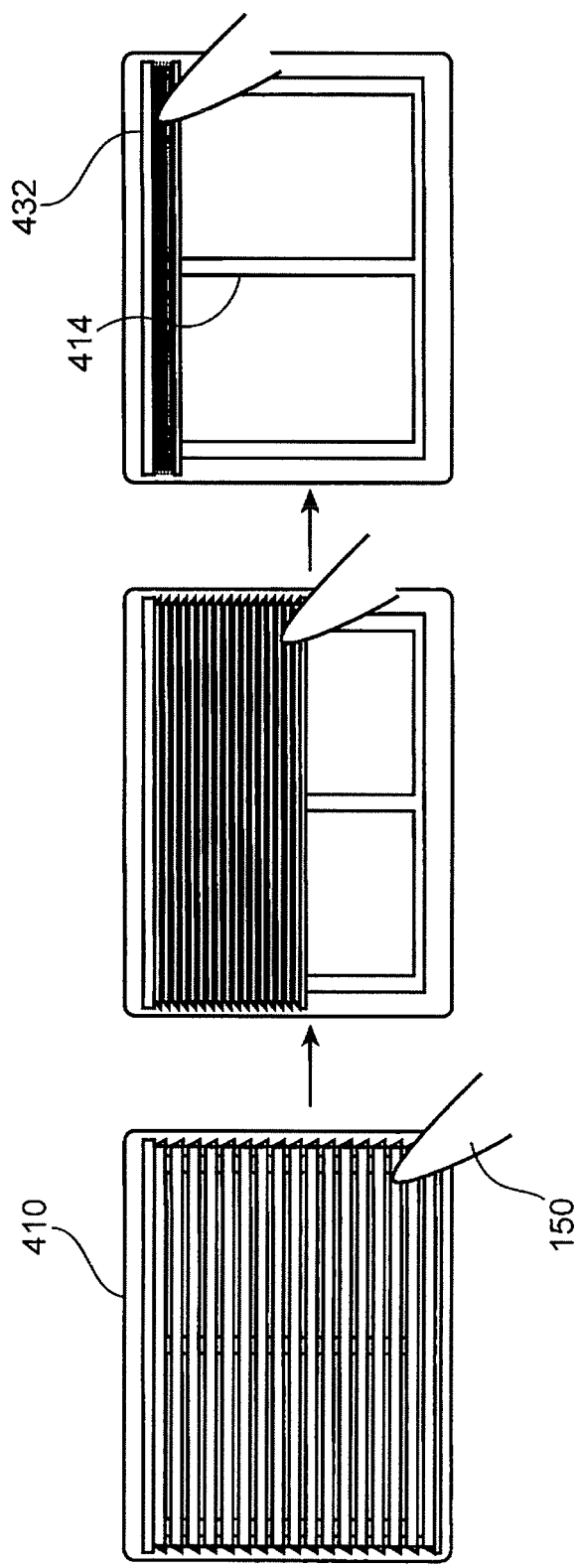

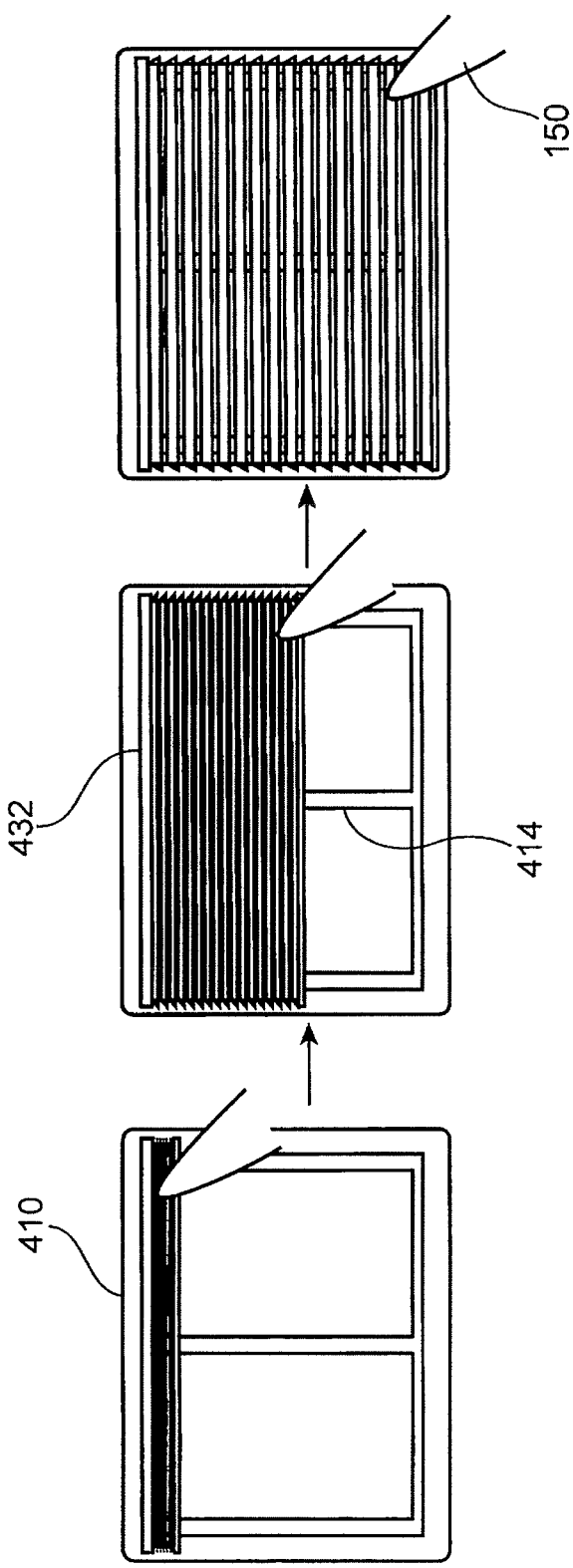

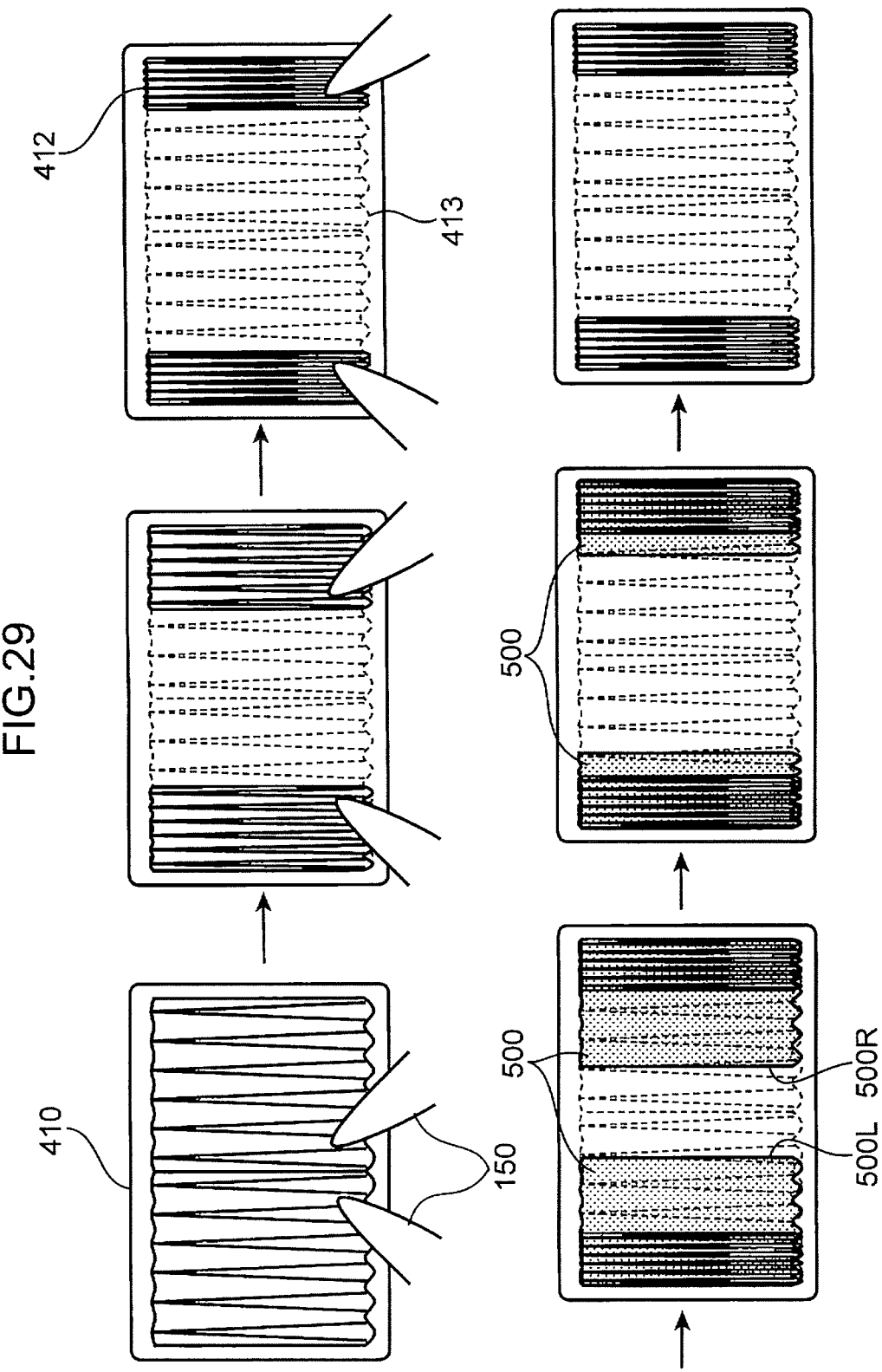

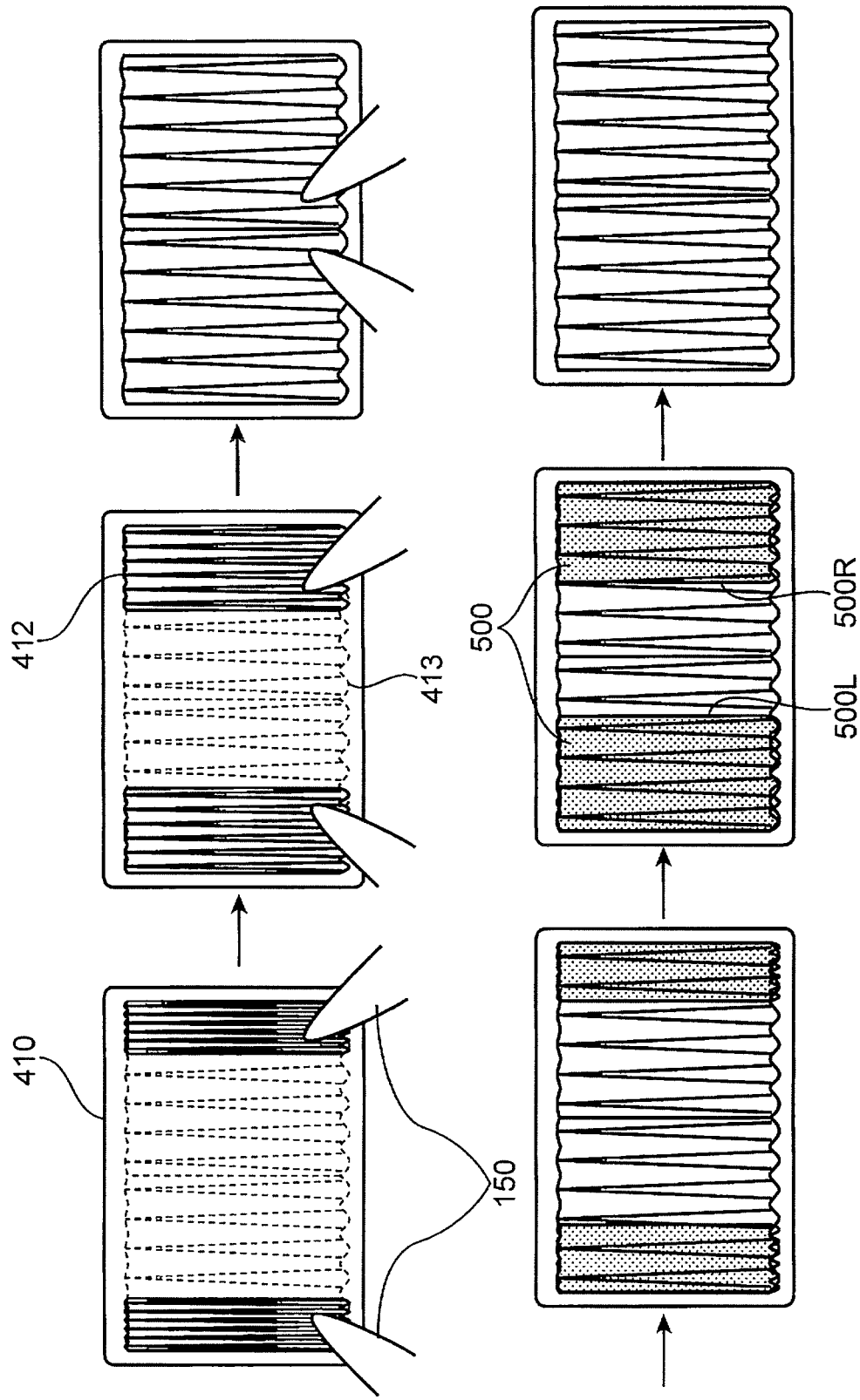

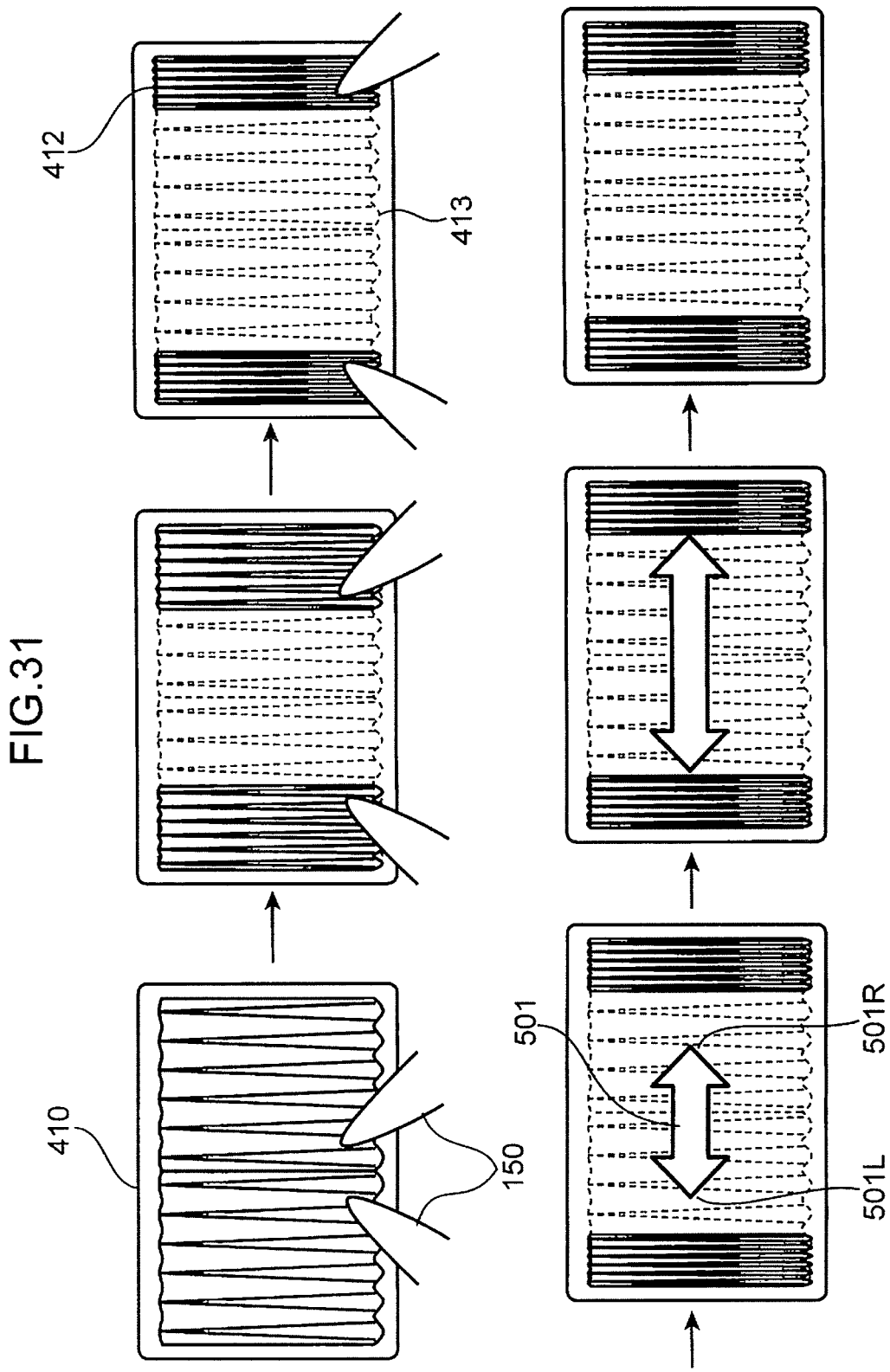

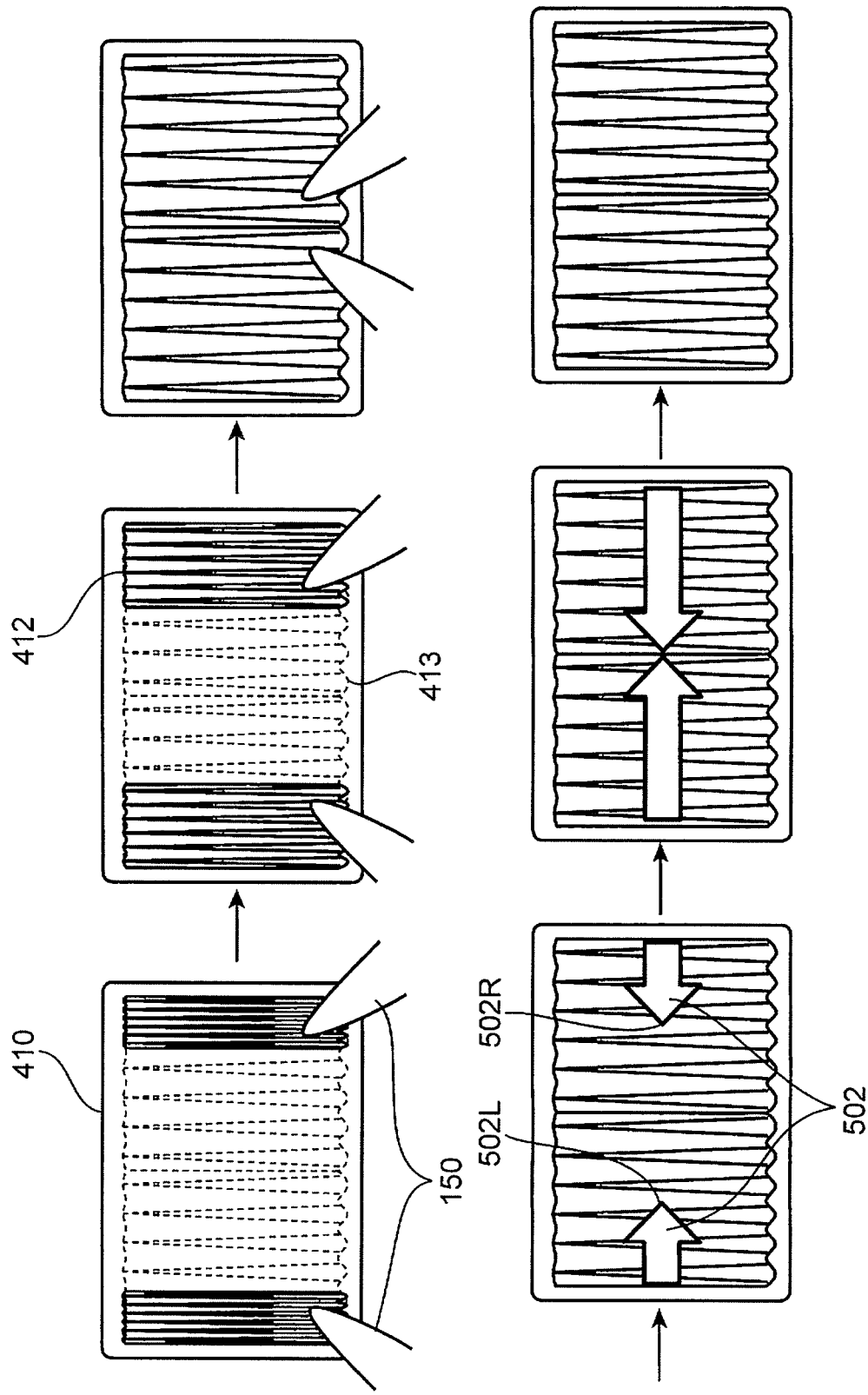

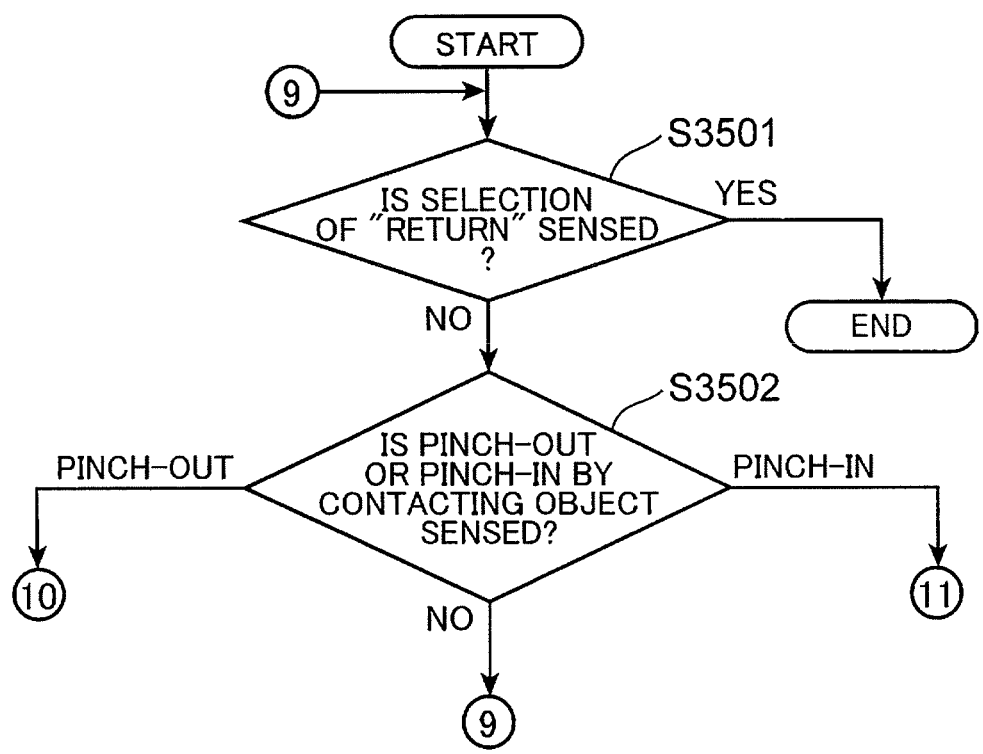

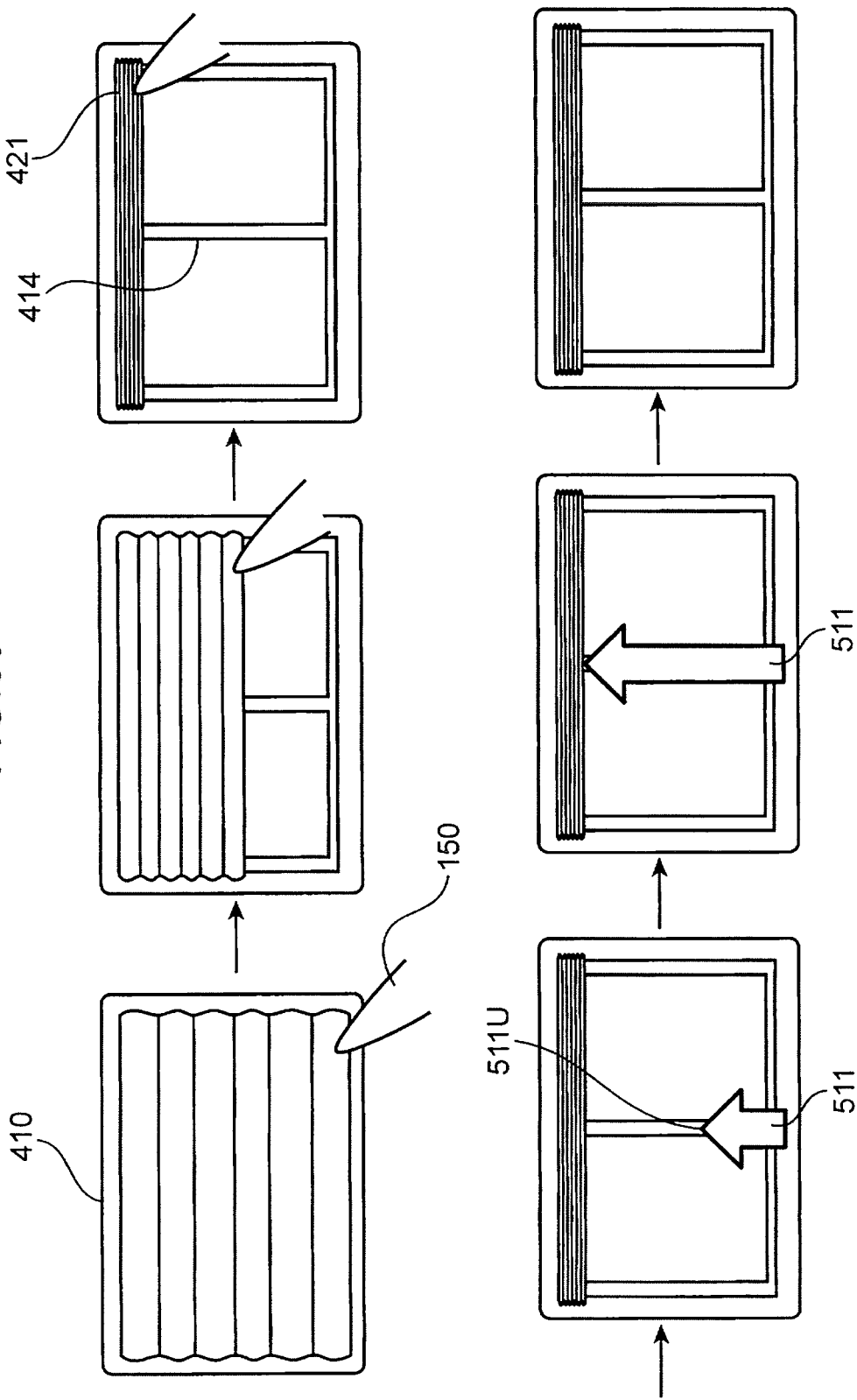

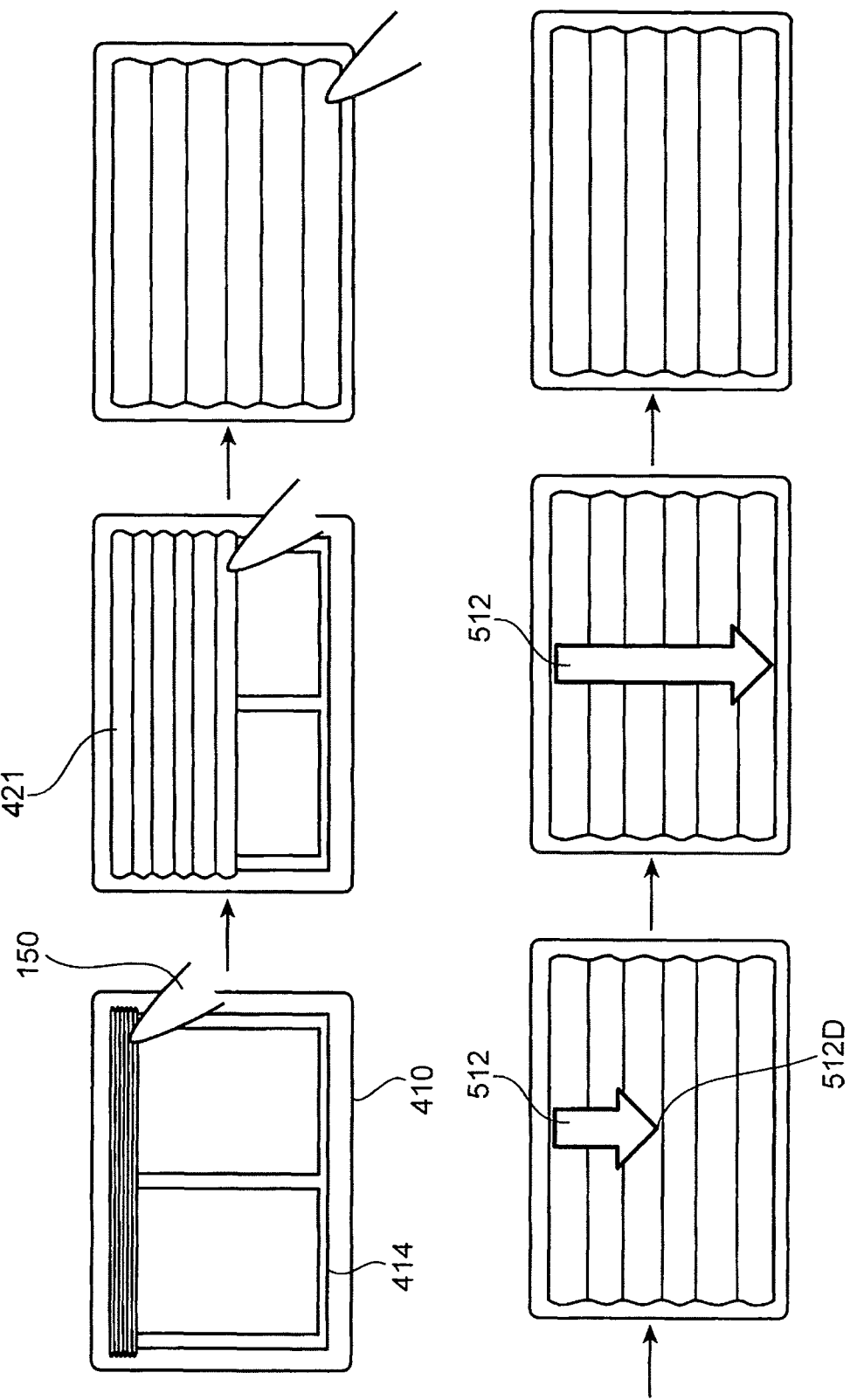

INFORMATION APPARATUS HAVING AN INTERFACE FOR A REMOTE CONTROL

RELATED APPLICATIONS

This application is a continuation application of International Application No. PCT/JP2014/000658, filed Feb. 7, 2014, which claims the benefit of U.S. Provisional application No. 61/766,843, filed Feb. 20, 2013, the disclosures of which are incorporated by reference herein in their entireties.

TECHNICAL FIELD

The present disclosure relates to a method for controlling an information apparatus and a computer-readable recording medium.

BACKGROUND ART

A variety of proposals have been made for open/close control for a curtain of an electric curtain device.

Patent Document 1 relates to a motor-operated wireless remote control system for an electric curtain. The system includes a motor-side device 2 having a motor 4, a motor control device 5, and a converter 6, and a wireless remote controller 3 having a transmitter 21 and a receiver 22. The converter 6 converts AC from a commercial power source into DC to supply DC electric power to the motor 4 and the motor control device 5, and is connected to a power source output terminal 8 provided to the motor-side device 2. A power source input terminal 51 of the receiver 22 can be connected to the power source output terminal 8.

Patent Document 2 discloses a technology in which a sound generated by a telephone set is input, a command from the outside is recognized in accordance with the sound generated by the telephone set, and a drive motor that opens and closes a curtain is actuated in accordance with a control signal corresponding to the command.

Patent Document 3 relates to an electric curtain open/close device. The electric curtain device is provided with a carriage provided directly above a plurality of curtain rails to be moved in parallel with the curtain rails by a motor. A solenoid is mounted on the carriage corresponding to each of the curtain rails. Curtains are hung from the curtain rails by curtain rings including a ferromagnetic portion. When the carriage is moved with a current applied to the solenoid, a curtain ring corresponding to the solenoid is attracted by a magnetic force and the curtain is pulled. When the curtain is pulled to a desired position, the current applied to the solenoid is stopped, which disconnects the curtain ring from the solenoid to stop the curtain at the desired position.

However, Patent Documents 1 to 3 described above need a further improvement.

Patent Document 1: Japanese Patent Application Laid-open No. 2012-50653 (for example, abstract and FIG. 1)
Patent Document 2: Japanese Patent Application Laid-open No. 2003-348250
Patent Document 3: Japanese Patent Application Laid-open No. 2004-166980

SUMMARY OF THE INVENTION

In one general aspect, the techniques disclosed here feature a method for controlling an information apparatus, the information apparatus having a touch panel display and being connected to a network, an electric curtain device being controlled over the network, the electric curtain device being capable of opening and closing a curtain through remote operation, the method causing a computer of the information apparatus to:

display an operation icon on a display screen of the information apparatus, the operation icon causing an operation screen for the electric curtain device to be displayed;

display the operation screen for the electric curtain device when selection of the operation icon is sensed, the operation screen including a curtain image representing the curtain of the electric curtain device; and when a pinch-out operation is sensed on the operation screen, output to the network a first open control command for opening the curtain of the electric curtain device.

According to the aspect described above, it is possible to embody a further improvement. These general and specific aspects may be implemented using a system, a method, and a computer program, and any combination of systems, methods, and computer programs.

BRIEF DESCRIPTION OF THE DRAWINGS

FIG. 14 is a flowchart showing a process flow for the operation terminal to control the electric curtain system.

FIG. 17 is a diagram showing an example, different from FIG. 8, of the curtain control screen displayed on the display of the operation terminal.

FIG. 18 is a diagram showing an operation example by the contacting object and a display example of the curtain control screen during open-close control for a shade curtain.

FIG. 19 is a diagram showing an operation example by the contacting object and a display example of the curtain control screen during open-close control for a shade curtain.

FIG. 21 is a diagram showing a display example of the curtain control screen and an operation example by the contacting object during open-close control for a one-way draw curtain.

FIG. 22 is a diagram showing a display example of the curtain control screen and an operation example by the contacting object during open-close control for a one-way draw curtain.

FIG. 23 is a diagram showing a further different example of the curtain control screen displayed on the display of the operation terminal.

FIG. 24 is a diagram showing a display example of the curtain control screen and an operation example by the contacting object during open-close control for a roll screen.

FIG. 25 is a diagram showing a display example of the curtain control screen and an operation example by the contacting object during open-close control for a roll screen.

FIG. 26 is a diagram showing a further different example of the curtain control screen displayed on the display of the operation terminal.

FIG. 27 is a diagram showing a display example of the curtain control screen and an operation example by the contacting object during open-close control for a blind.

FIG. 28 is a diagram showing a display example of the curtain control screen and an operation example by the contacting object during open-close control for a blind.

FIG. 29 is a diagram showing a display example of the curtain control screen in which an actual position of the curtain is displayed when opening the curtain.

FIG. 30 is a diagram showing a display example of the curtain control screen in which the actual position of the curtain is displayed when closing the curtain.

FIG. 31 is a diagram showing a display example of the curtain control screen which is different from FIG. 29 and in which the actual position of the curtain is displayed when opening the curtain.

FIG. 32 is a diagram showing a display example of the curtain control screen which is different from FIG. 30 and in which the actual position of the curtain is displayed when closing the curtain.

FIG. 35A is a flowchart showing a process flow for the operation terminal to generate and transmit a control command for controlling the curtain and the lace curtain of the electric curtain system in the embodiment of FIGS. 29 to 33.

FIG. 39 is a diagram showing a display example of the curtain control screen which is different from FIG. 37 and in which the actual position of the shade curtain is displayed when opening the shade curtain.

FIG. 40 is a diagram showing a display example of the curtain control screen which is different from FIG. 38 and in which the actual position of the shade curtain is displayed when closing the shade curtain.

DETAILED DESCRIPTION (Story Before Inventing Aspect According to Present Disclosure)

First, the point of view of an aspect according to the present disclosure will be described.

Figure 2:
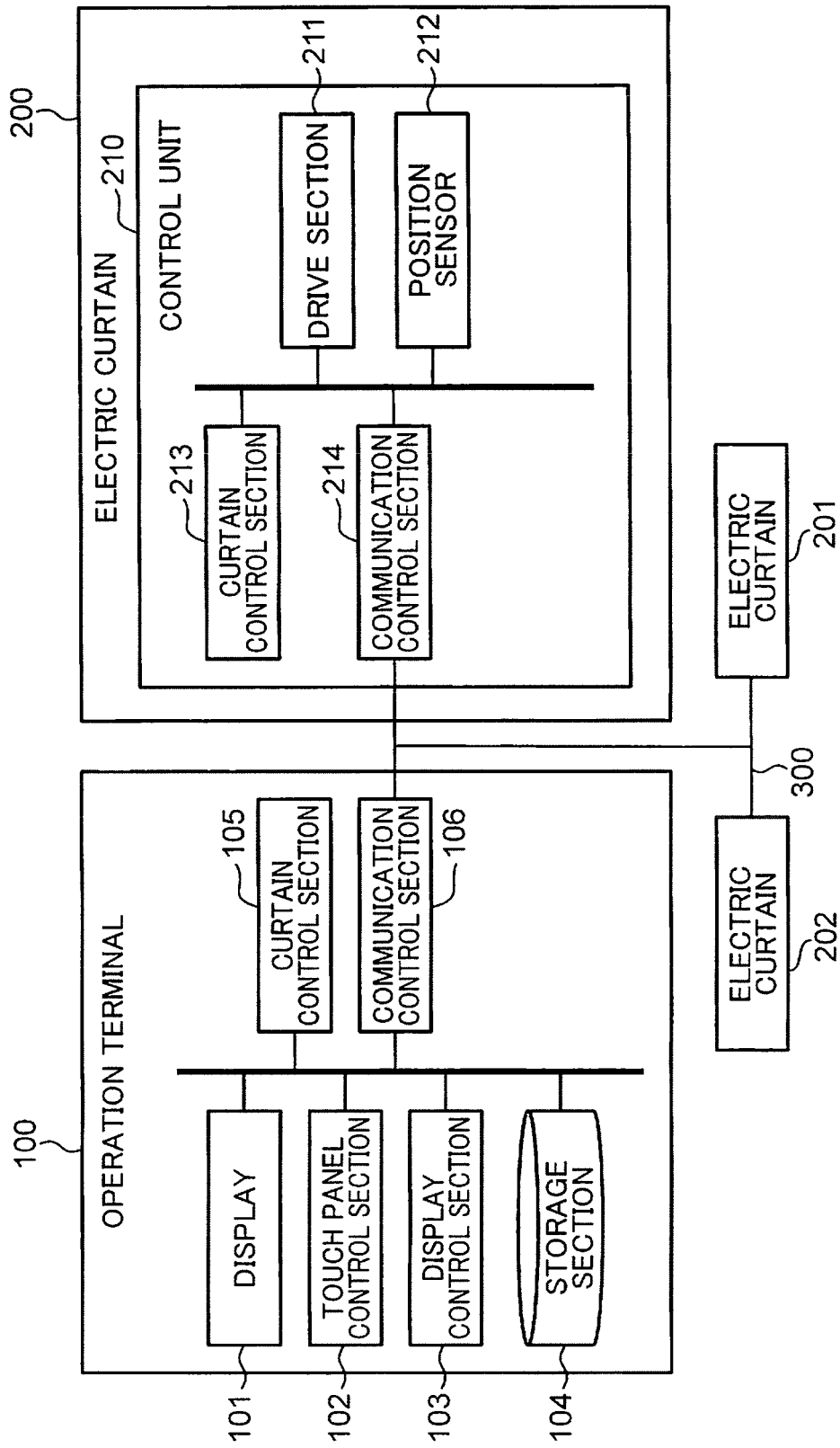
FIG. 2 is a block diagram showing an electrical configuration of an operation terminal and an electric curtain system according to the embodiment of the present disclosure.

In Patent Document 1 described above, in the transmitter 21 of the wireless remote controller 3, a user operates an operation button of an operation switch 24 to generate an operation signal for operation such as opening, closing, and stopping the curtain, and the operation signal is sent to a microcomputer 25, and thereafter converted into a radio signal to be transmitted into the atmosphere (paragraphs [0035] and [0038] and FIG. 2 of Patent Document 1). When an operation signal is input to the microcomputer 25 by an operation button, a display signal generated by the microcomputer 25 in accordance with the operation signal is sent to an LED display unit 30, and the LED display unit 30 displays the operation state (paragraph [0039] and FIG. 2 of Patent Document 1).

In the receiver 22 of the wireless remote controller 3, on the other hand, the radio signal transmitted from the transmitter 21 is received, and converted into a digital signal. A microcomputer 45 generates a motor operation control signal and a display signal indicating operation of an electric curtain in accordance with the digital signal. The microcomputer 45 sends the motor operation control signal to the motor-side device 2, and sends the display signal to an LED display unit 50 of the receiver 22. The LED display unit 50 displays the operation state of the electric curtain (paragraphs [0043] to [0045] and FIG. 3 of Patent Document 1).

In Patent Document 1 described above, however, the transmitter 21 having the operation switch 24 for operation such as opening, closing, and stopping the curtain and the receiver 22 having the LED display unit 50 which displays the operation state of the electric curtain are separate devices. Therefore, the operation state of the electric curtain cannot be confirmed at the same time while operating to open, close, or stop the curtain. As a result, if the operation state of the electric curtain is confirmed with the LED display unit 50 of the receiver 22 which is a device that is different from the transmitter 21 in the case where the curtain is opened and stopped at a desired position, the curtain may be stopped past the desired position because of a time lag. For example, the curtain may be opened too widely, where it is intended to open the curtain only slightly, and it may be difficult to stop opening operation of the curtain at a position intended by the user.

Thus, in Patent Document 1 described above, the operation switch 24 provided to the transmitter 21 and the LED display unit 50 provided to the receiver 22 are separate members in separate devices. Therefore, the system is unsuitable for a process in which opening and closing of the electric curtain is finely adjusted. The transmitter 21 is provided with the LED display unit 30. However, the LED display unit 30 displays the operation state of the operation switch 24, not the operation state of the curtain.

In addition, Patent Document 1 does not disclose at all how to operate an electric curtain and an electric lace curtain provided for an identical window, for example. For example, Patent Document 1 does not disclose at all how to operate the electric curtain and the electric lace curtain in the case where it is desired to open the electric curtain and to open the electric lace curtain successively thereafter.

Patent Document 2 described above merely discloses a technology in which a winding shaft for the electric curtain is rotated forward to lower the curtain, or the winding shaft for the electric curtain is rotated in reverse to raise the curtain, in accordance with the sound generated by the telephone set, and does not disclose at all means for confirming the open/close state of the curtain. Therefore, it is not possible to confirm what intermediate position the curtain is actually opened or closed to, even if opening and closing of the electric curtain can be remotely operated. Thus, Patent Document 2 described above does not disclose means for confirming the open/close state of the curtain. Therefore, it is difficult to finely adjust opening and closing of the electric curtain.

In addition, Patent Document 2 does not disclose at all how to operate an electric curtain and an electric lace curtain provided for an identical window, for example. For example, Patent Document 2 does not disclose at all how to operate the electric curtain and the electric lace curtain in the case where it is desired to open the electric curtain and to open the electric lace curtain successively thereafter.

Patent Document 3 described above discloses an electric curtain open/close device and an electric curtain open/close method in which a plurality of curtains are individually opened to a desired position by a drive force of a single motor. In the electric curtain open/close device and the electric curtain open/close method, an open/close instruction is received from a predetermined cellular phone 24 via the Internet 23 (paragraph [0040] of Patent Document 3). The open/close instruction includes information related to which curtain is opened to what position (paragraph [0048] of Patent Document 3).

However, Patent Document 3 does not disclose at all means for confirming the open/close state of the curtain. Therefore, it is not possible to confirm what intermediate position the curtain is actually opened or closed to, even if opening and closing of the electric curtain can be operated remotely. Thus, Patent Document 3 described above does not disclose means for confirming the open/close state of the curtain. Therefore, it is difficult to finely adjust opening and closing of the electric curtain.

In addition, Patent Document 3 does not disclose at all how to operate an electric curtain and an electric lace curtain provided for an identical window, for example. For example, Patent Document 3 does not disclose at all how to operate the electric curtain and the electric lace curtain in the case where it is desired to open the electric curtain and to open the electric lace curtain successively thereafter.

Based on the considerations described above, the inventors have conceived various aspects of the present disclosure to be described below.

A first aspect of the present disclosure is a method for controlling an information apparatus, the information apparatus having a touch panel display and being connected to a network, an electric curtain device being controlled over the network, the electric curtain device being capable of opening and closing a curtain through remote operation, the method causing a computer of the information apparatus to:

display an operation icon on a display screen of the information apparatus, the operation icon causing an operation screen for the electric curtain device to be displayed;

display the operation screen for the electric curtain device when selection of the operation icon is sensed, the operation screen including a curtain image representing the curtain of the electric curtain device; and when a pinch-out operation is sensed on the operation screen, output to the network a first open control command for opening the curtain of the electric curtain device.

According to the aspect, when the operation screen for the electric curtain device is displayed, a curtain image representing the curtain of the electric curtain device is included in the operation screen. Then, the curtain image included in the operation screen is utilized to sense a pinch-out operation on the curtain image, for example, on the operation screen to perform control for opening the curtain of the corresponding electric curtain device.

This enables remotely controlling the open-close operation of the curtain of the electric curtain device which is not a device in which power is simply turned on and off.

Open-close of the curtain of the electric curtain device is controlled through the pinch-out operation, for example, which enables the curtain of the electric curtain device to be not only opened completely but also opened halfway.

For example, there is a case where the curtain of the electric curtain device is opened halfway and further opened or closed while confirming the opened state. Also in this case, the open/close state of the curtain of the electric curtain device can be confirmed while performing an operation (pinch-out operation) of opening the curtain of the electric curtain device on the operation screen. That is, the operation screen also serves as a confirmation screen for confirmation as to what position the curtain is opened to in accordance with an instruction given by the user by performing an operation on the operation screen. Thus, the screen for operation instruction is also used as the screen for confirmation of the open/close state. Therefore, it is possible to effectively process an operation of opening the curtain of the electric curtain device, and to make the most of the display area of the operation screen.

Further, as described above, the operation screen also serves as display for confirmation of the open/close state of the curtain. Thus, the operation screen can be used not only to stop the curtain of the electric curtain device in the middle of being opened and closed, but also to confirm that an instruction to stop the curtain at a desired position has been given at the same time. As a result, for example, opening and closing of the curtain of the electric curtain device can be stopped without the curtain moving past the desired position. In addition, for example, the open/close position of the curtain of the electric curtain device can be finely adjusted.

Further, in the aspect described above, when the pinch-out operation is sensed on the operation screen, display of the curtain image on the operation screen may be varied from a state in which the curtain of the electric curtain device is closed to a state in which the curtain of the electric curtain device is opened, and a lace curtain image may be displayed on the operation screen, the lace curtain image representing a lace curtain of an electric lace curtain device capable of opening and closing the lace curtain through remote operation.

This allows an operation of opening the curtain of the electric curtain device and confirmation of the open-close state of the curtain of the electric curtain device to be performed with an identical curtain image on the operation screen. Thus, the operation screen and the confirmation screen are integral with each other. Therefore the open-close state of the curtain of the electric curtain device can be confirmed by making the most of the size of the operation screen. As a result, even an operation that needs fine adjustment such as opening the curtain of the electric curtain device halfway is enabled.

Further, in the aspect described above, for example, when a second pinch-out operation is sensed on the operation screen, a second open control command may be output to the network, the second open control command for opening the lace curtain of the electric lace curtain device corresponding to the lace curtain image.

Consequently, in the case where an electric curtain device and an electric lace curtain device are provided for an identical window, an operation screen for the electric curtain device and an operation screen for the electric lace curtain device are not separately displayed. In this case, an operation for the electric curtain device and an operation for the electric lace curtain device can be performed on a common operation screen. Thus, also in the case where it is desired to open the curtain of the electric curtain device and to open the lace curtain of the electric lace curtain device successively thereafter, control can be performed effectively on the common operation screen.

Further, in the aspect described above, for example, when the second pinch-out operation is sensed on the operation screen, display of the lace curtain image on the operation screen may be varied to a state in which the lace curtain of the electric lace curtain device is opened.

This allows an operation of opening the lace curtain of the electric lace curtain device and confirmation of the open-close state of the lace curtain of the electric lace curtain device to be performed on the operation screen for the electric curtain device as overlapped on the curtain image representing the curtain of the electric curtain device. Thus, the operation screen and the confirmation screen for the electric curtain device and the operation screen and the confirmation screen for the electric lace curtain device are integral with each other. Therefore the open-close state of the electric curtain device and the electric lace curtain device can be confirmed by making the most of the size of the operation screen.

Further, in the aspect described above, for example, when the pinch-out operation is sensed on the operation screen, display of the curtain image on the operation screen may be varied from a state in which the curtain of the electric curtain device is closed to a state in which the curtain of the electric curtain device is opened, and when a pinch-in operation is sensed on the operation screen, a first close control command may be output to the network, the first close control command being for closing the curtain of the electric curtain device corresponding to the curtain image.

Further, in the aspect described above, for example, when the pinch-in operation is sensed on the operation screen, display of the curtain image on the operation screen may be varied from a state in which the curtain of the electric curtain device is opened to a state in which the curtain of the electric curtain device is closed.

Further, in the aspect described above, for example, when the pinch-out operation is sensed on the operation screen, a width control command may be output to the network as the first open control command, the width control command being for moving the curtain of the electric curtain device in accordance with an operation width of the pinch-out operation.

Consequently, open-close of the curtain of the electric curtain device is controlled in accordance with the operation width of the pinch-out operation, for example. Therefore, the curtain of the electric curtain device may be not only opened completely but also opened halfway.

In a second aspect of the present disclosure, for example, a method for controlling an information apparatus, the information apparatus having a touch panel display and being connected to a network, an electric curtain device being controlled over the network, the electric curtain device being capable of opening and closing a curtain through remote operation, the method may cause a computer of the information apparatus to:

display an operation icon on a display screen of the information apparatus, the operation icon causing an operation screen for the electric curtain device to be displayed;

display the operation screen for the electric curtain device when selection of the operation icon is sensed, the operation screen including a curtain image representing the curtain of the electric curtain device; and when a pinch-in operation is sensed on the operation screen, output to the network a first close control command being for closing the curtain of the electric curtain device.

Further, in the second aspect described above, for example, when the pinch-in operation is sensed on the operation screen, a width control command may be output to the network as the first close control command, the width control command being for moving the curtain of the electric curtain device in accordance with an operation width of the pinch-in operation.

In any of the aspects described above, for example, the electric curtain device may include an electric blind device capable of opening or closing a blind through a remote operation.

A third aspect of the present disclosure is a method for controlling an information apparatus, the information apparatus having a touch panel display and being connected to a network, an electric curtain device being controlled over the network, the electric curtain device being capable of opening and closing a curtain through remote operation, the method causing a computer of the information apparatus to:

display an operation icon on a display screen of the information apparatus, the operation icon causing an operation screen for the electric curtain device to be displayed;

display the operation screen for the electric curtain device when selection of the operation icon is sensed, the operation screen including a curtain image representing the curtain of the electric curtain device; and when a swipe operation is sensed on the operation screen, output to the network a movement control command for moving the curtain of the electric curtain device in a swipe direction of the swipe operation.

According to the aspect, when the operation screen for the electric curtain device is displayed, a curtain image representing the curtain of the electric curtain device is included in the operation screen. Then, the curtain image included in the operation screen is utilized to sense a swipe operation on the curtain image, for example, on the operation screen to perform control for moving the curtain of the electric curtain device in the swipe direction of the swipe operation.

This enables remotely controlling the electric curtain device which is not simply turned on and off.

Movement of the curtain of the electric curtain device is controlled through the swipe operation, for example. Therefore, the curtain of the electric curtain device may be not only opened completely but also opened halfway.

For example, there is a case where the curtain of the electric curtain device is opened halfway and further opened or closed while confirming the opened state. Also in this case, the open/close state of the electric curtain can be confirmed while performing a moving operation of the curtain of the electric curtain device on the operation screen. That is, the operation screen also serves as a confirmation screen for confirmation as to what position the curtain is moved to in accordance with an instruction by performing an operation on the operation screen.

Thus, the operation instruction screen and the moving state confirmation screen are common to each other. Therefore, it is possible to effectively process an operation of moving the curtain of the electric curtain device, and to make the most of the display area of the operation screen. Further, as described above, the operation screen also serves as display for confirmation of the open/close state of the curtain. Thus, the operation screen can be used not only to stop the curtain of the electric curtain device in the middle of being opened and closed, but also to confirm that an instruction to stop the curtain at a desired position has been given at the same time. As a result, for example, opening and closing of the curtain of the electric curtain device can be stopped without the curtain moving past the desired position. In addition, for example, the open/close position of the curtain of the electric curtain device can be finely adjusted.

In the third aspect described above, for example, a distance control command may be output to the network as the movement control command when the swipe operation is sensed on the operation screen, the distance control command causing the curtain of the electric curtain device to move in the swipe direction a distance in accordance with an amount of movement in the swipe direction of the swipe operation.

Consequently, movement of the curtain of the electric curtain device is controlled through the swipe operation. Therefore, the curtain of the electric curtain device may be not only opened completely but also opened halfway.

In the third aspect described above, for example, movement of the curtain of the electric curtain device may be movement to open the curtain of the electric curtain device or movement to close the curtain of the electric curtain device.

In the third aspect described above, for example, the electric curtain device may have a curtain which opens or closes in one direction.

In the third aspect described above, for example, the electric curtain device may include an electric roll screen device, the electric roll screen device having a roll screen which opens or closes in one direction, as the curtain which opens or closes in one direction.

In the third aspect described above, for example, the electric curtain device may include an electric blind device, the electric blind device having a blind which opens or closes in one direction, as the curtain which opens or closes in one direction.

In the first aspect described above, for example, when the pinch-out operation is sensed on the operation screen, display of the curtain image on the operation screen may be varied from a state in which the curtain of the electric curtain device is closed to a state in which the curtain of the electric curtain device is opened, positional information indicating a position of the curtain of the electric curtain device may be received via the network, and state information representing a position of an end portion of the curtain of the electric curtain device may be displayed on the operation screen in accordance with the positional information.

According to the aspect, state information representing the position of the end portion of the curtain of the electric curtain device is displayed on the operation screen besides a curtain image representing to what position the curtain of the electric curtain device is moved by an operation on the operation screen. For example, there may be a case where a gap is present between the position of the end of the curtain image representing the curtain of the electric curtain device in the operation screen and the actual position to which the curtain of the electric curtain device has been moved. Also in such a case, the user is allowed to recognize the presence of the gap by confirming the state information representing the position of the end portion of the curtain of the electric curtain device.

Therefore, it is possible to prevent an erroneous recognition that the curtain of the electric curtain device is closed, even if the curtain of the electric curtain device is actually not closed yet, just by confirming display on the operation screen, the erroneous recognition being due to a gap between the moving speed of the curtain of the electric curtain device on the operation screen and the actual moving speed of the curtain of the electric curtain device, for example.

As a result, the operation screen functions not only to represent to what position the curtain of the electric curtain device is moved by an operation of the operation screen, but also as a confirmation screen for confirmation of the actual position to which the curtain of the electric curtain device has been moved, without confirming the actual curtain of the electric curtain device. Thus, the actual position to which the curtain of the electric curtain device has been moved can be confirmed using the operation screen.

In the aspect described above, for example, the state information representing the position of the end portion of the curtain of the electric curtain device may be displayed on the operation screen as overlapped on the curtain image.

According to the aspect, the state information representing the position of the end portion of the curtain of the electric curtain device is displayed as overlapped on the curtain image. This allows the user to confirm the position of the end portion of the curtain of the electric curtain device with the user's eyes keeping on confirming the curtain image which is varied from a state in which the curtain of the electric curtain device is closed to a state in which the curtain of the electric curtain device is opened.

Therefore, the actual position of the end portion of the curtain of the electric curtain device can be confirmed, while performing an operation on the operation screen, at the same time as the operation. For example, there may be a case where a gap is present between the position of the curtain image representing the curtain of the electric curtain device in the operation screen and the actual position to which the curtain of the electric curtain device has been moved. Also in such a case, it is possible to prevent an erroneous recognition that the curtain of the electric curtain device is closed even if the curtain of the electric curtain device is actually not closed yet because of failing to confirm the actual position of the end portion of the curtain of the electric curtain device.

In the aspect described above, for example, the state information representing the position of the end portion of the curtain of the electric curtain device may include a schematic curtain movement image representing the position of the end portion of the curtain of the electric curtain device.

According to the aspect, the schematic curtain movement image representing the position of the end portion of the curtain of the electric curtain device is displayed as overlapped on the curtain image which is varied from a state in which the curtain of the electric curtain device is closed to a state in which the curtain of the electric curtain device is opened. This allows the user to recognize a gap, if any, that is present between the curtain image representing the curtain of the electric curtain device in the operation screen and the actual position to which the curtain of the electric curtain device has been moved, for example, at a glance. Therefore, the operation screen can be used not only to perform the operation but also to confirm the operation instruction and confirm the actual position to which the curtain of the electric curtain device has been moved on the same screen.

In the second aspect described above, for example, when the pinch-in operation is sensed on the operation screen, display of the curtain image on the operation screen may be varied from a state in which the curtain of the electric curtain device is opened to a state in which the curtain of the electric curtain device is closed, positional information indicating a position of the curtain of the electric curtain device may be received via the network; and state information representing a position of an end portion of the curtain of the electric curtain device may be displayed on the operation screen in accordance with the positional information.

According to the aspect, state information representing the position of the end portion of the curtain of the electric curtain device is displayed on the operation screen besides a curtain image representing to what position the curtain of the electric curtain device is moved by an operation of the operation screen. For example, there may be a case where a gap is present between the position of the curtain image representing the curtain of the electric curtain device in the operation screen and the actual position to which the curtain of the electric curtain device has been moved. Also in this case, the user is allowed to recognize the presence of the gap by confirming the state information representing the position of the end portion of the curtain of the electric curtain device.

Therefore, it is possible to prevent an erroneous recognition that the curtain of the electric curtain device is opened, even if the curtain of the electric curtain device is actually not opened yet, just by confirming display on the operation screen, the erroneous recognition being due to a gap between the moving speed of the curtain of the electric curtain device on the operation screen and the actual moving speed of the curtain of the electric curtain device, for example.

As a result, the operation screen functions not only to represent to what position the curtain of the electric curtain device is moved by an operation of the operation screen, but also as a confirmation screen for confirmation of the actual position to which the curtain of the electric curtain device has been moved, without confirming the actual curtain of the electric curtain device. Thus, the actual position to which the curtain of the electric curtain device has been moved can be confirmed using the operation screen.

In the aspect described above, for example, the state information representing the position of the end portion of the curtain of the electric curtain device may be displayed on the operation screen as overlapped on the curtain image.

According to the aspect, the state information representing the position of the end portion of the curtain of the electric curtain device is displayed as overlapped on the curtain image. This allows the user to confirm the position of the end portion of the curtain of the electric curtain device with the user's eyes keeping on confirming the curtain image which is varied from a state in which the curtain of the electric curtain device is opened to a state in which the curtain of the electric curtain device is closed.

Therefore, the actual position of the end portion of the curtain of the electric curtain device can be confirmed while performing an operation on the operation screen at the same time as the operation. For example, there may be a case where a gap is present between the curtain image representing the curtain of the electric curtain device in the operation screen and the actual position to which the curtain of the electric curtain device has been moved. Also in this case, it is possible to prevent an erroneous recognition that the curtain of the electric curtain device is opened even if the curtain of the electric curtain device is actually not opened yet because of failing to confirm the actual position of the end portion of the curtain of the electric curtain device.

In the aspect described above, for example, the state information representing the position of the end portion of the curtain of the electric curtain device may include a schematic curtain movement image representing the position of the end portion of the curtain of the electric curtain device.

According to the aspect, a schematic curtain movement image representing the position of the end portion of the curtain of the electric curtain device is displayed as overlapped on the curtain image which is varied from a state in which the curtain of the electric curtain device is opened to a state in which the curtain of the electric curtain device is closed. This allows the user to recognize a gap, if any, that is present between the curtain image representing the curtain of the electric curtain device in the operation screen and the actual position to which the curtain of the electric curtain device has been moved, for example, at a glance. Therefore, the operation screen can be used not only to perform the operation but also to confirm the operation instruction and confirm the actual position to which the curtain of the electric curtain device has been moved on the same screen.

In the third aspect described above, for example, when the swipe operation is sensed on the operation screen, display of the curtain image on the operation screen may be varied to an image representing movement of the curtain of the electric lace curtain device, positional information indicating a position of the curtain of the electric curtain device may be received via the network, and state information representing a position of an end portion of the curtain of the electric curtain device may be displayed on the operation screen in accordance with the positional information.

According to the aspect, state information representing the position of the end portion of the curtain of the electric curtain device is displayed on the operation screen besides a curtain image representing to what position the curtain of the electric curtain device is moved by an operation of the operation screen. For example, there may be a case where a gap is present between the curtain image representing the curtain of the electric curtain device in the operation screen and the actual position to which the curtain of the electric curtain device has been moved. Also in this case, the user is allowed to recognize the presence of the gap by confirming the state information representing the position of the end portion of the curtain of the electric curtain device.

Therefore, it is possible to prevent an erroneous recognition that the curtain of the electric curtain device is closed, even if the curtain of the electric curtain device is actually not closed yet, for example, just by confirming display on the operation screen, the erroneous recognition being due to a gap between the moving speed of the curtain of the electric curtain device on the operation screen and the actual moving speed of the curtain of the electric curtain device, for example.

As a result, the operation screen functions not only to represent to what position the curtain of the electric curtain device is moved by an operation of the operation screen, but also as a confirmation screen for confirmation of the actual position to which the curtain of the electric curtain device has been moved, without confirming the actual curtain of the electric curtain device. Thus, the actual position to which the curtain of the electric curtain device has been moved can be confirmed using the operation screen.

In the aspect described above, for example, the state information representing the position of the end portion of the curtain of the electric curtain device may be displayed on the operation screen as overlapped on the image representing movement of the curtain of the electric curtain device.

According to the aspect, the state information representing the position of the end portion of the curtain of the electric curtain device is displayed as overlapped on the image representing movement of the curtain of the electric curtain device. This allows the user to confirm the position of the end portion of the curtain of the electric curtain device with the user's eyes keeping on confirming the image representing movement of the curtain of the electric curtain device.

Therefore, the actual position of the end portion of the curtain of the electric curtain device can be confirmed while performing an operation on the operation screen at the same time as the operation. For example, there may be an occasion where a gap is present between the curtain image representing the curtain of the electric curtain device in the operation screen and the actual position to which the curtain of the electric curtain device has been moved. Also in this case, it is possible to prevent an erroneous recognition that the curtain of the electric curtain device is opened even if the curtain of the electric curtain device is actually not opened yet because of failing to confirm the actual position of the end portion of the curtain of the electric curtain device.

In the aspect described above, for example, the state information representing the position of the end portion of the curtain of the electric curtain device may include a schematic curtain movement image representing the position of the end portion of the curtain of the electric curtain device.

According to the aspect, the schematic curtain movement image representing the position of the end portion of the curtain of the electric curtain device is displayed as overlapped on the image representing movement of the curtain of the electric curtain device. This allows the user to recognize a gap, if any, that is present between the curtain image representing the curtain of the electric curtain device in the operation screen and the actual position to which the curtain of the electric curtain device has been moved, for example, at a glance. Therefore, the operation screen can be used not only to perform the operation but also to confirm the operation instruction and confirm the actual position to which the curtain of the electric curtain device has been moved on the same screen.

Embodiment

An embodiment of the present disclosure will be described below with reference to the drawings. In the drawings, the same symbols are used for the same constituent elements.

In the embodiment, an operation terminal which can remotely control curtain will be described.

Figure 1:
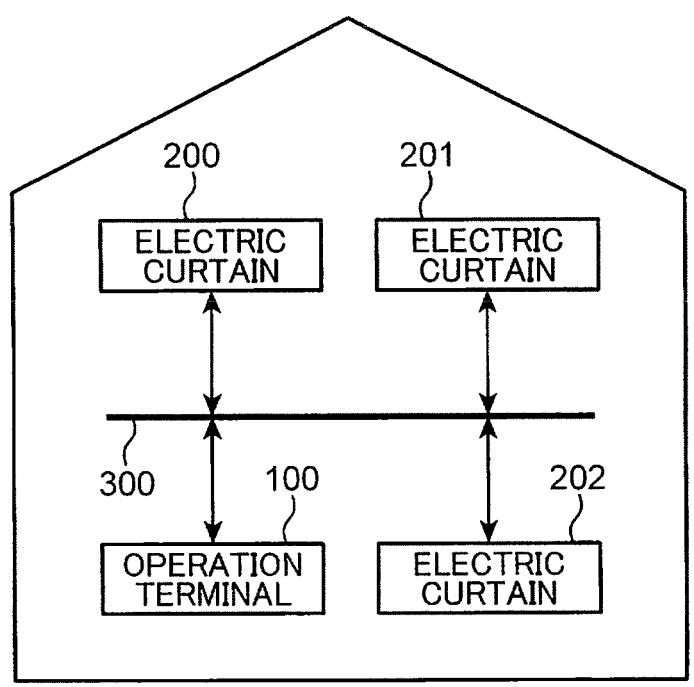
FIG. 1 is a diagram showing an overall configuration of a curtain control system according to an embodiment of the present disclosure.

FIG. 1 is a diagram showing an overall configuration of a curtain control system according to the embodiment. As shown in FIG. 1, the curtain control system includes an operation terminal 100, and electric curtain systems 200, 201, and 202.

The operation terminal 100 and the electric curtain systems 200, 201, and 202 are disposed in a house. The operation terminal 100 and the electric curtain systems 200, 201, and 202 communicate with each other via a wired or wireless network 300. For example, the electric curtain systems 200, 201, and 202 and the operation terminal 100 are communicably connected to each other via the wireless or wired in-home network 300. The network 300 may be an external network such as the Internet.

The operation terminal 100 is not necessarily disposed in the house, and may be disposed outside the house. In this case, a user controls the electric curtain systems 200, 201, and 202 from a location away from the home.

An information terminal such as a smartphone or a tablet terminal may be adopted as the operation terminal 100. It should be noted, however, that the smartphone and the tablet terminal are merely exemplary, and an information terminal of a button type such as a cellular phone may be adopted as the operation terminal 100.

In the embodiment, as shown in FIG. 1, three electric curtain systems 200, 201, and 202 are provided. However, this is exemplary. Alternatively, one, two, or four or more electric curtain systems may be provided.

Figure 3:
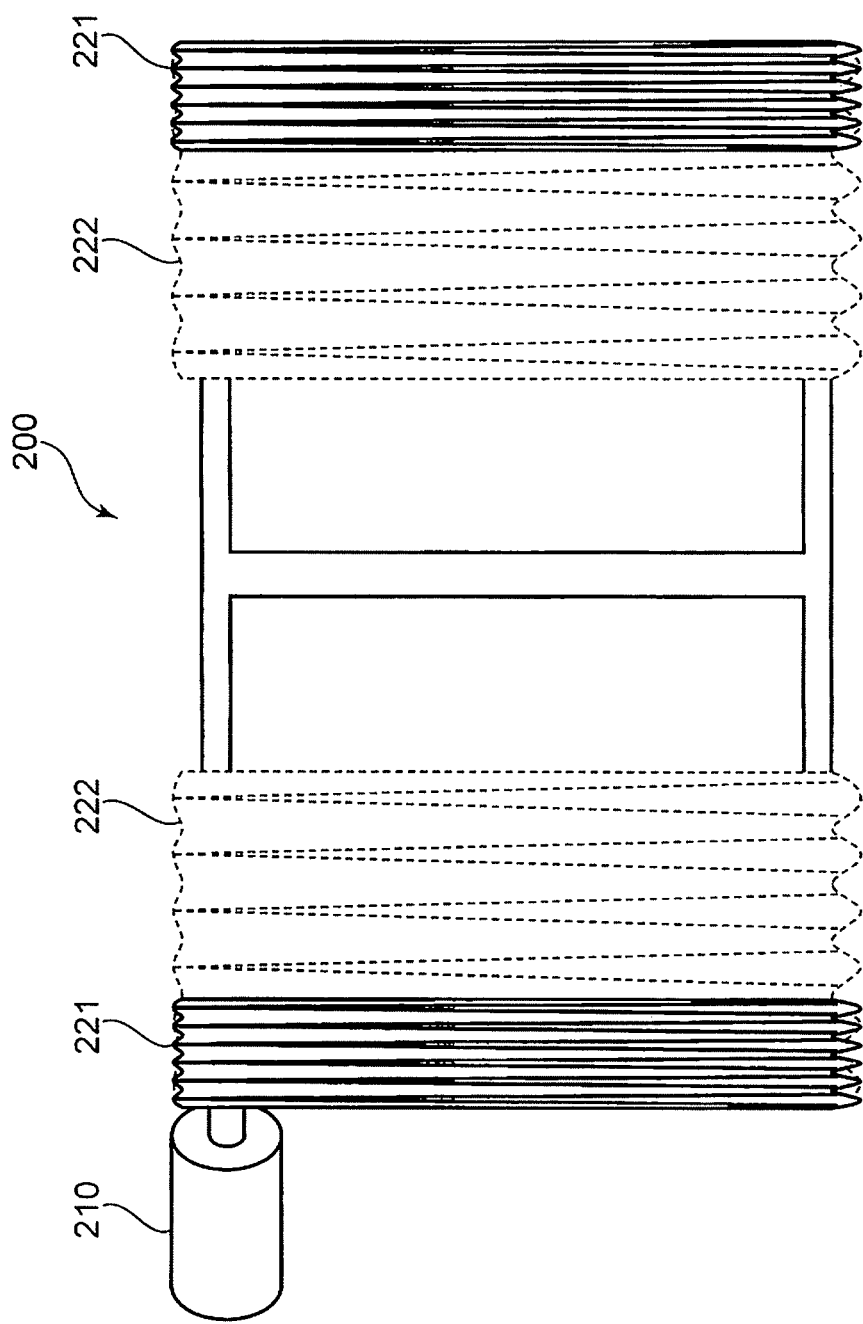
FIG. 3 is a diagram schematically showing a configuration of an electric curtain system according to an embodiment of the present disclosure.

FIG. 2 is a block diagram showing the electrical configuration of the operation terminal 100 and the electric curtain systems 200, 201, and 202. FIG. 3 is a diagram schematically showing the configuration of the electric curtain system 200. As shown in FIG. 2, the operation terminal 100 includes a display 101, a touch panel control section 102, a display control section 103, a storage section 104, a curtain control section 105, and a communication control section 106.

The display 101 is formed from a touch panel display, for example, and displays a user interface that allows the user to operate the operation terminal 100. The user can input various operations to the operation terminal 100 by contacting the display 101.

The touch panel control section 102 recognizes an operation performed on the display 101 by the user, interprets the content of the operation, and notifies the other constituent elements of the content of the operation. For example, if an object is displayed at a position on the display 101 tapped on by the user, the touch panel control section 102 judges that the object is selected by the user. A variety of GUI (Graphical User Interface) parts that receive a user operation such as buttons are adopted as the object.

The display control section 103 generates a GUI of the operation terminal 100, and causes the display 101 to display the GUI. The storage section 104 stores information that is necessary for operation of the operation terminal 100 such as the type and the arrangement of the curtain which is the operation target.

The curtain control section 105 generates a control command for each of the electric curtain systems 200, 201, and 202. The communication control section 106 controls communication between the operation terminal 100 and the electric curtain systems 200, 201, and 202. In addition, the communication control section 106 receives a request to transmit a variety of data from other blocks such as the curtain control section 105, and transmits the received data to the electric curtain systems 200, 201, and 202. Further, the communication control section 106 receives data transmitted from the electric curtain systems 200, 201, and 202, and delivers the received data to relevant blocks such as the curtain control section 105.

The display 101 may be a normal display rather than a touch panel display. In this case, the user may use an external input device such as a mouse (not shown) to input an instruction to select an object by moving a pointer displayed on the display 101 and clicking on a desired object. That is, in the embodiment, a series of operations performed by the user by contacting the display 101 may be replaced with operations of moving a pointer and clicking using an external input device such as a mouse.

As shown in FIG. 3, the electric curtain system 200 includes a control unit 210, a thick curtain (hereinafter referred to simply as a "curtain") 221, a thin lace curtain 222, and so forth. The electric curtain system 200 includes an electric curtain device capable of electrically opening and closing the curtain 221 through remote operation, and an electric lace curtain device capable of electrically opening and closing the lace curtain 222 through remote operation.

As shown in FIG. 2, the control unit 210 includes a drive section 211, a position sensor 212, a curtain control section 213, and a communication control section 214. The drive section 211 includes a motor capable of rotating is forward and reverse directions, for example, to open and close the curtain 221 and the lace curtain 222.

The position sensor 212 detects the open/close state (position) of the curtain 221 and the lace curtain 222. The position sensor 212 specifically detects the position of an end portion on the moving side of the curtain 221 and the lace curtain 222, for example, as the open/close state of the curtain 221 and the lace curtain 222.

The position sensor 212 includes an encoder attached to a rotary shaft of the motor of the drive section 211 coupled to the curtain 221 or the lace curtain 222, for example. In this case, the position sensor 212 detects the open/close state of the curtain 221 in the case where the rotary shaft of the motor of the drive section 211 is coupled to the curtain 221, and detects the open/close state of the lace curtain 222 in the case where the rotary shaft of the motor of the drive section 211 is coupled to the lace curtain 222.

Alternatively, the position sensor 212 may count the number of steps of a stepping motor driven when opening and closing the curtain 221 and the lace curtain 222 in the case where the drive section 211 includes a stepping motor. The position sensor 212 may be any unit that can detect the open/close state of the curtain 221 and the lace curtain 222.

The curtain control section 213 controls opening and closing of the curtain 221 and the lace curtain 222 of the electric curtain system 200 in accordance with a control command transmitted from the operation terminal 100. In addition, the curtain control section 213 requests the communication control section 214 to transmit the result of execution of the control command, the open/close state of the curtain 221 and the lace curtain 222 of the electric curtain system 200, and so forth to the operation terminal 100.

The communication control section 214 controls communication between the electric curtain system 200 and the operation terminal 100. In addition, the communication control section 214 receives a request to transmit a variety of data from the curtain control section 213, and transmits such data to the operation terminal 100. The communication control section 214 receives data transmitted from the operation terminal 100, and delivers the data to the curtain control section 213.

The electric curtain systems 201 and 202 are the same in electrical configuration as the electric curtain system 200 shown in FIG. 2. The electric curtain system 200 is disposed in a living room, for example. The electric curtain system 201 is disposed in a bedroom, for example. The electric curtain system 202 is disposed in a child room, for example.

Figure 4:
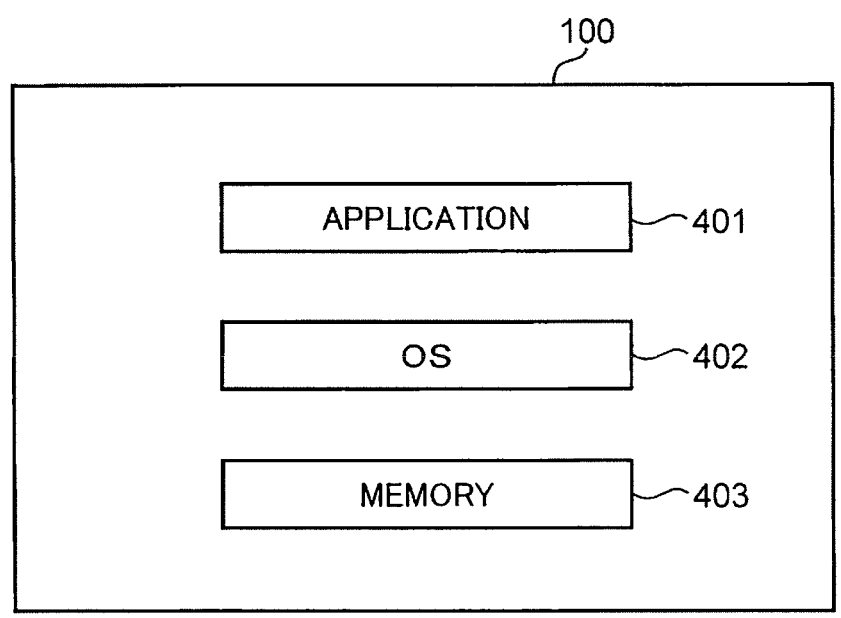
FIG. 4 is a diagram showing a configuration example of the form of implementation of the operation terminal according to an embodiment of the present disclosure.

FIG. 4 is a diagram showing a configuration example of the form of implementation of the operation terminal 100. As shown in FIG. 4, the operation terminal 100 includes an application 401, an OS (Operating System) 402, a memory 403, and other hardware (not shown).

The application 401 is application software for causing the information terminal to function as the operation terminal 100, and is executed by a processor of the operation terminal 100. The operation terminal 100 may read the application 401 from a computer readable recording medium to implement the application 401, or may download the application 401 from a network to implement the application 401. The OS 402 is basic software of the information terminal, and is executed by the processor of the operation terminal 100. The memory 403 is formed from a storage device such as a RAM and a ROM of the operation terminal 100, and stores a group of data included in the application 401. The processor of the operation terminal 100 executes the application 401 to embody the functions of the touch panel control section 102, the display control section 103, the storage section 104, the curtain control section 105, and the communication control section 106 shown in FIG. 2. In addition, the processor of the operation terminal 100 executes the application 401 to cause the memory 403 to function as the storage section 104.

It should be noted, however, that in the embodiment, the operation terminal 100 may be implemented by the application 401 alone, may be implemented by the application 401 and the OS 402, may be implemented by the application 401, the OS 402, and the memory 403, or may be implemented by the application 401, the OS 402, the memory 403, and other hardware (not shown). In any embodiment, the operation terminal 100 according to the embodiment can be embodied. In the embodiment, the processor and the storage device forming the information terminal, for example, form a computer. One of a CPU, an FPGA, and an ASIC or a combination of two or more of these may be adopted as the processor. One of a ROM, a RAM, and a hard disk or a combination of two or more of these may be adopted as the storage device.

Figure 5:
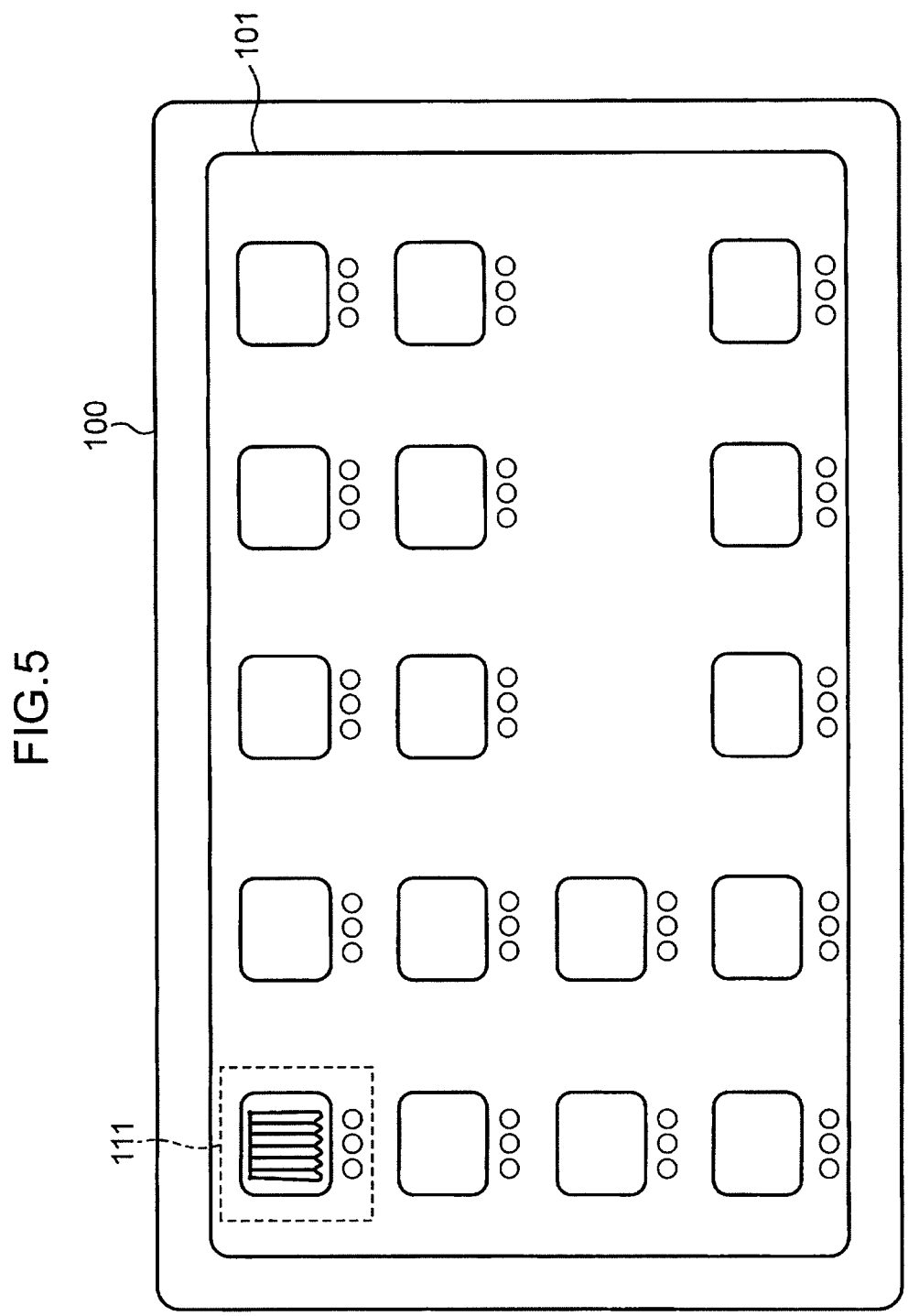
FIG. 5 is a diagram showing a display example of a menu screen displayed on a display for a case where a tablet is used as the operation terminal.
Figure 6:
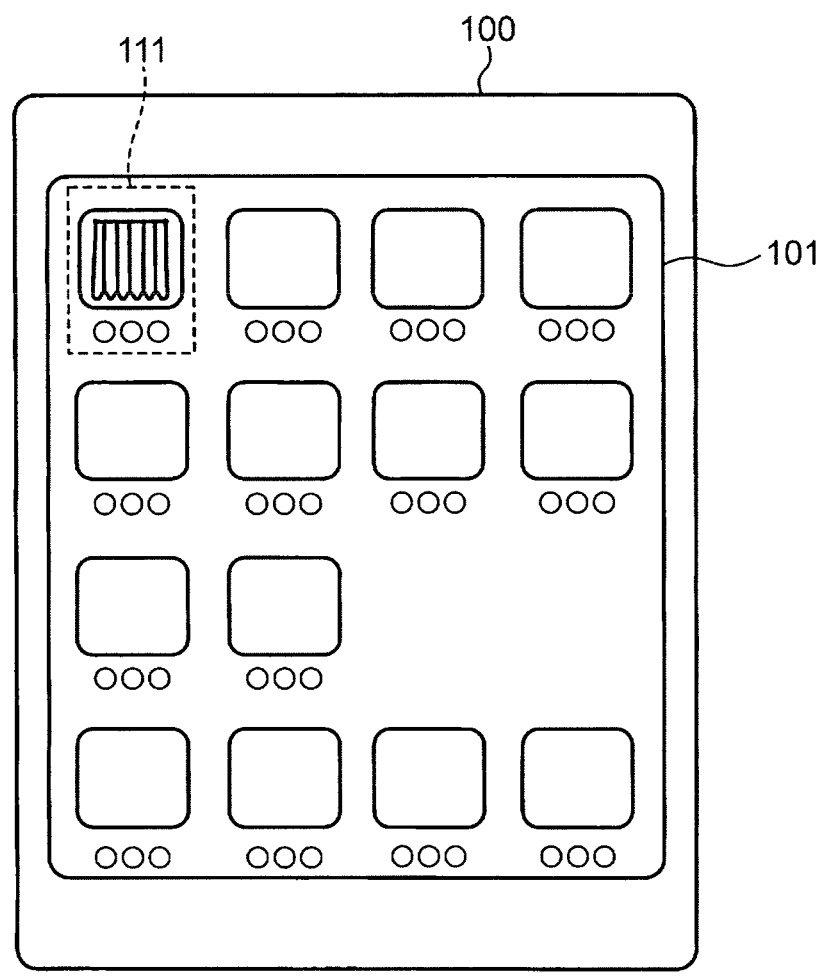
FIG. 6 is a diagram showing a display example of the menu screen displayed on the display for a case where a smartphone is used as the operation terminal.

FIG. 5 is a diagram showing a display example of a menu screen displayed on the display 101 for a case where a tablet is used as the operation terminal 100. FIG. 6 is a diagram showing a display example of a menu screen displayed on the display 101 for a case where a smartphone is used as the operation terminal 100. As shown in FIGS. 5 and 6, the menu screen displayed on the display 101 of the operation terminal 100 includes a curtain icon 111. The curtain icon 111 is an operation icon for starting the application 401 for electric curtain control. The curtain icon 111 includes an image schematically representing a curtain.

Figure 7:
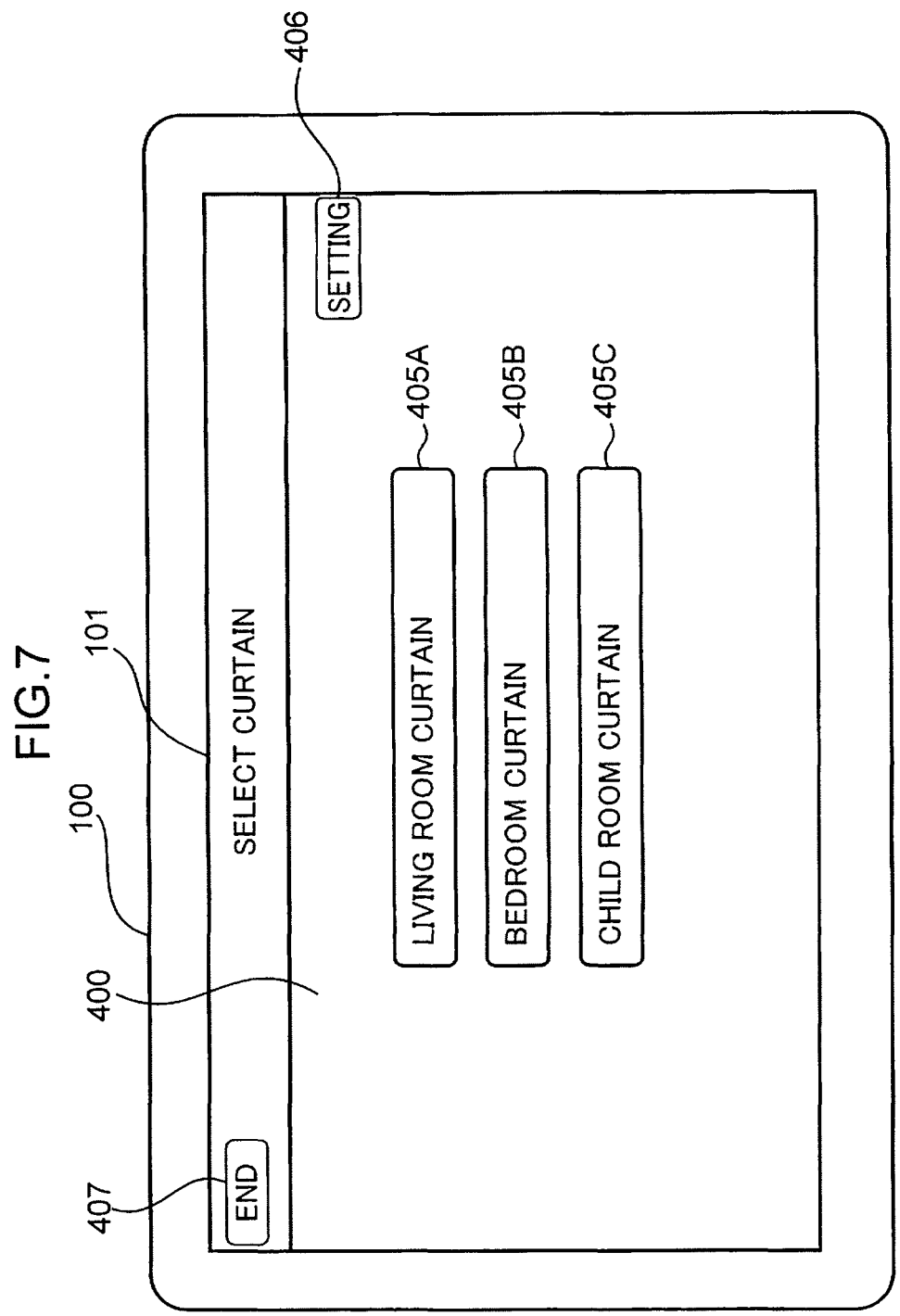
FIG. 7 is a diagram showing an example of a curtain select screen displayed on the display of the operation terminal.

FIG. 7 is a diagram showing an example of a curtain select screen 400 displayed on the display 101 of the operation terminal 100. When the user selects the curtain icon 111 with a contacting object (for example, one finger of the user) in the menu screen shown in FIG. 5 or 6, the touch panel control section 102 senses the selection. Then, the application 401 for electric curtain control is started, and the display control section 103 displays the curtain select screen 400 corresponding to the curtain icon 111 on the display 101 as shown in FIG. 7.

The curtain select screen 400 includes select buttons 405A, 405B, and 405C, a set button 406, and an end button 407. A text "SELECT CURTAIN" is affixed to the curtain select screen 400. The configuration allows the user to easily understand that the screen displayed on the display 101 is a screen for selecting an electric curtain system.

The select button 405A is an operation button for selecting the electric curtain system 200 in the living room. The select button 405B is an operation button for selecting the electric curtain system 201 in the bedroom. The select button 405C is an operation button for selecting the electric curtain system 202 in the child room. The select buttons 405A, 405B, and 405C are operation icons for displaying a curtain control screen for the electric curtain systems 200, 201, and 202, respectively.

The set button 406 is an operation button for making a variety of settings. The set button 406 is used to associate a select button and a curtain as the operation target with each other, for example. The set button 406 is used to set the type of an electric curtain system such as a double type provided with a curtain and a lace curtain, a shade curtain type, a roll screen type, a blind type, a center draw type, and a one-way draw type, for example. The set button 406 is used to set a name given to a select button, for example.

The end button 407 is an operation button for ending the application 401 for electric curtain control. When the user selects the end button 407 with a contacting object (for example, one finger of the user), the touch panel control section 102 senses the selection. Then, the application 401 for electric curtain control is ended, and the display control section 103 restores a state in which the menu screen is displayed on the display 101 as shown in FIG. 5 or 6.

(Open/Close Control for Curtain)

Figure 8:
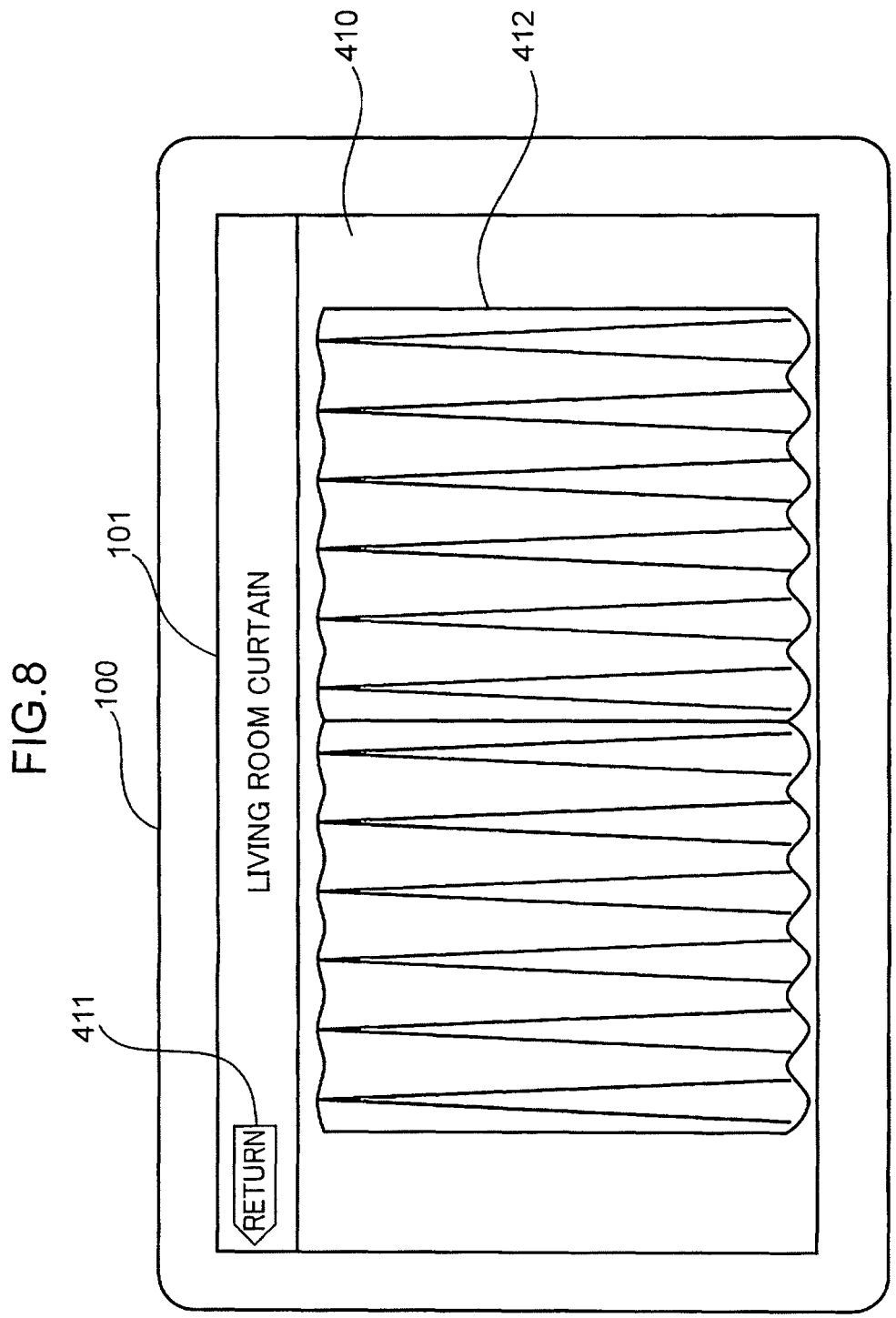
FIG. 8 is a diagram showing an example of a curtain control screen displayed on the display of the operation terminal.

FIG. 8 is a diagram showing an example of a curtain control screen 410 displayed on the display 101 of the operation terminal 100. The curtain control screen 410 shown in FIG. 8 is an operation screen that allows performing an open/close operation for the curtain 221 of the electric curtain device and the lace curtain 222 of the electric lace curtain device included in the electric curtain system 200 disposed in the living room.

The curtain control screen 410 includes a return button 411, a curtain image 412 representing the curtain 221 of the electric curtain device, and a lace curtain image 413 (FIGS. 9 to 12) representing the lace curtain 222 of the electric lace curtain device. In addition, a text saying "LIVING ROOM CURTAIN" is affixed to the curtain control screen 410 of FIG. 8. This allows the user to easily understand that the screen is a control screen for a curtain disposed in the living room.

When the user selects the select button 405A with a contacting object (for example, one finger of the user) in the curtain select screen 400 shown in FIG. 7, the touch panel control section 102 senses the selection. Then, as shown in FIG. 8, the display control section 103 displays the curtain control screen 410 corresponding to the select button 405A on the display 101.

Meanwhile, when the user selects the return button 411 with the contacting object in the curtain control screen 410 shown in FIG. 8, the touch panel control section 102 senses the selection. Then, the display control section 103 returns the display on the display 101 to the curtain select screen 400 shown in FIG. 7.

Figure 9:
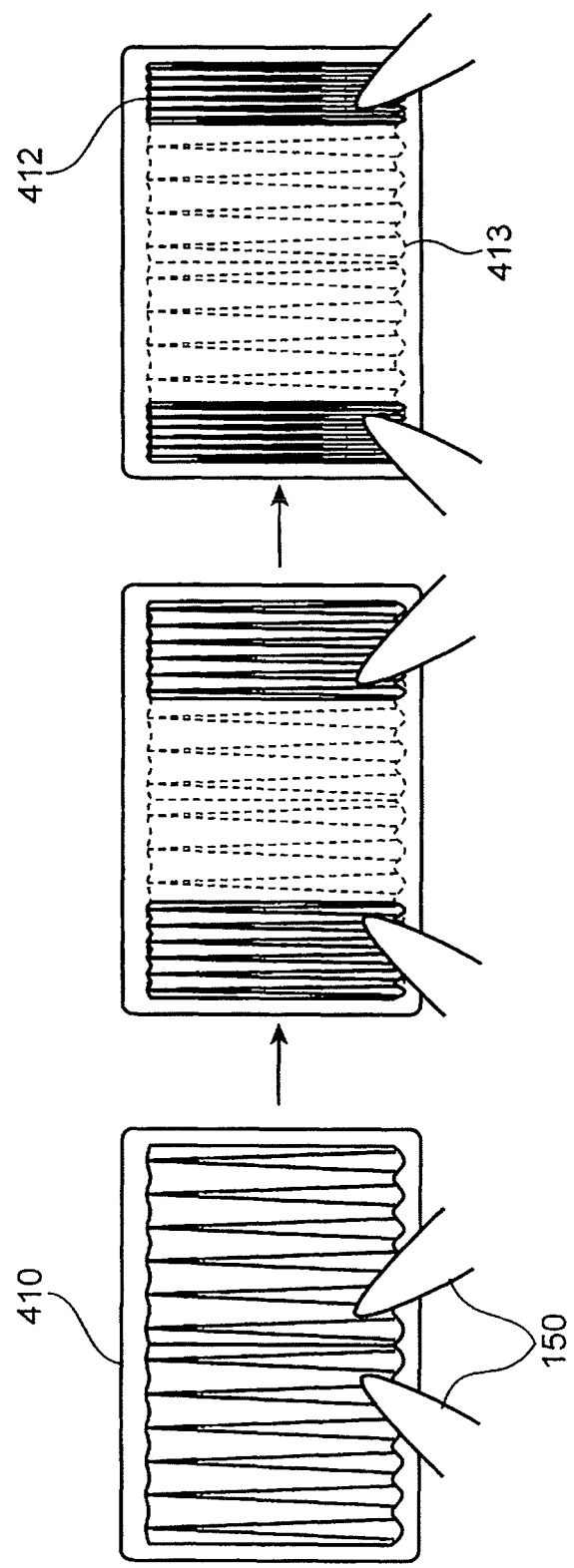
FIG. 9 is a diagram showing a display example of the curtain control screen and an operation example by the contacting object during an open-close operation for the curtain.
Figure 10:
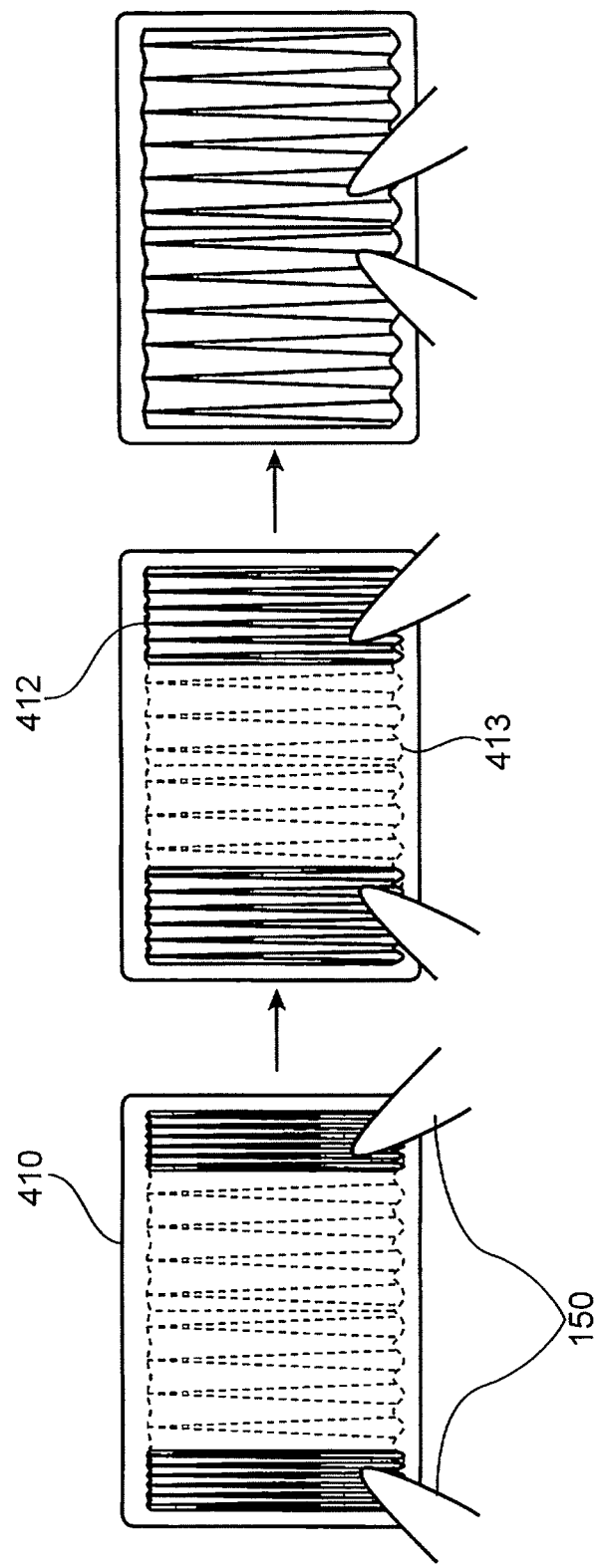
FIG. 10 is a diagram showing a display example of the curtain control screen and an operation example by the contacting object during an open-close operation for the curtain.

FIGS. 9 and 10 are each a diagram showing an example of display on the curtain control screen 410 and an example of an operation by the contacting object 150 during an open/close operation for the curtain. FIG. 9 shows a display example and an operation example at the time when opening the curtain 221. FIG. 10 shows a display example and an operation example at the time when closing the curtain 221.

First, an operation of opening the curtain 221 of the electric curtain device of the electric curtain system 200 will be described with reference to FIG. 9. The curtain image 412 representing a state in which the curtain 221 is closed is displayed on the curtain control screen 410 (the left diagram of FIG. 9). In this state, the touch panel control section 102 senses a pinch-out operation by the contacting object 150 (for example, two fingers of the user) on the curtain control screen 410 (in the order of the left diagram, the middle diagram, and the right diagram of FIG. 9). Then, the display control section 103 varies the curtain image 412 from the state with a closed curtain into a state with an opened curtain in accordance with movement of the contacting object 150 (in the order of the left diagram, the middle diagram, and the right diagram of FIG. 9).

At this time, the display control section 103 displays the lace curtain image 413 representing a state in which the lace curtain 222 is closed as the curtain image 412 is opened. The curtain control section 105 generates a control command (corresponding to an example of the first open control command) for opening the curtain 221 of the electric curtain device of the electric curtain system 200 corresponding to the curtain image 412.

In addition, the display control section 103 displays the curtain image 412 which is opened by a width corresponding to the operation width of the pinch-out operation by the contacting object 150. In addition, the curtain control section 105 generates a control command (corresponding to an example of the width control command) for opening the curtain 221 of the electric curtain device of the electric curtain system 200 by a width corresponding to the operation width of the pinch-out operation by the contacting object 150.

The communication control section 106 transmits the generated control command to the control unit 210 of the electric curtain system 200.

Next, an operation of closing the curtain 221 of the electric curtain device of the electric curtain system 200 will be described with reference to FIG. 10. The curtain image 412 representing a state in which the curtain 221 is opened and the lace curtain image 413 representing a state in which the lace curtain is closed are displayed on the curtain control screen 410 (the left diagram of FIG. 10). In this state, the touch panel control section 102 senses a pinch-in operation by the contacting object 150 on the curtain control screen 410 (in the order of the left diagram, the middle diagram, and the right diagram of FIG. 10).

Then, the display control section 103 varies the curtain image 412 from the state with an opened curtain into a state with a closed curtain in accordance with movement of the contacting object 150 (in the order of the left diagram, the middle diagram, and the right diagram of FIG. 10). The curtain control section 105 generates a control command (corresponding to an example of the first close control command) for closing the curtain 221 of the electric curtain device of the electric curtain system 200 corresponding to the curtain image 412.

In addition, the display control section 103 displays the curtain image 412 which is opened by a width corresponding to the operation width of the pinch-in operation by the contacting object 150. In addition, the curtain control section 105 generates a control command (corresponding to an example of the width control command) for closing the curtain 221 of the electric curtain device of the electric curtain system 200 by a width corresponding to the operation width of the pinch-in operation by the contacting object 150.

The communication control section 106 transmits the generated control command to the control unit 210 of the electric curtain system 200.

Figure 11:
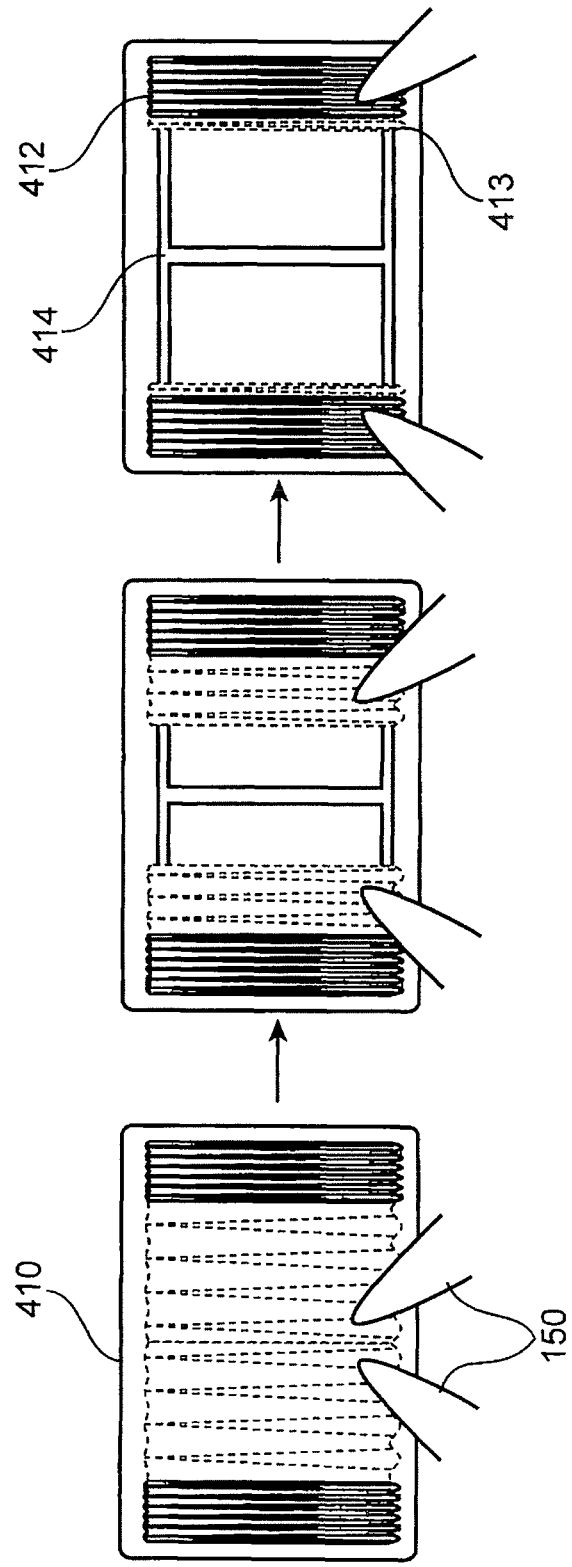
FIG. 11 is a diagram showing a display example of the curtain control screen and an operation example by the contacting object during an open-close operation for the lace curtain.
Figure 12:
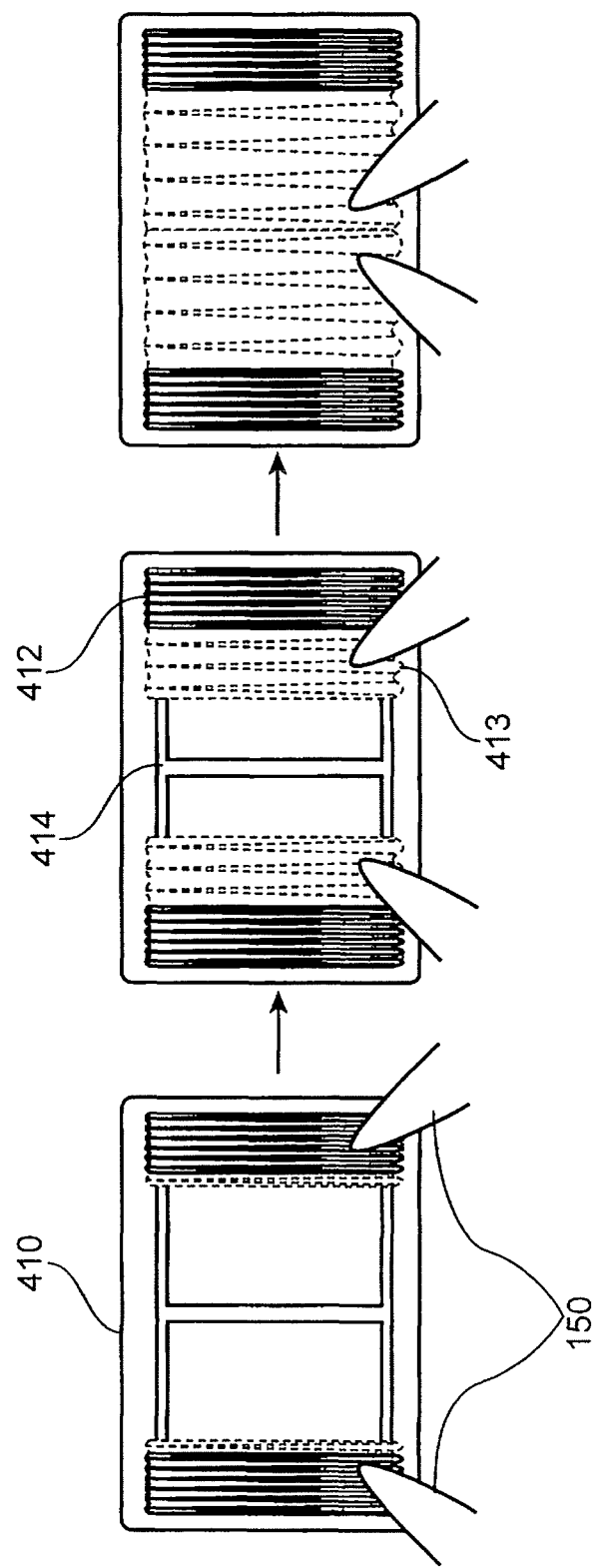
FIG. 12 is a diagram showing a display example of the curtain control screen and an operation example by the contacting object during an open-close operation for the lace curtain.

FIGS. 11 and 12 are each a diagram showing an example of display on the curtain control screen 410 and an example of an operation by the contacting object 150 during an open/close operation for the lace curtain. FIG. 11 shows a display example and an operation example at the time when opening the lace curtain 222. FIG. 12 shows a display example and an operation example at the time when closing the lace curtain 222.

First, an operation of opening the lace curtain 222 of the electric lace curtain device of the electric curtain system 200 will be described with reference to FIG. 11. The curtain image 412 representing a state in which the curtain 221 is opened and the lace curtain image 413 representing a state in which the lace curtain 222 is closed are displayed (the left diagram of FIG. 11). In this state, the touch panel control section 102 senses a pinch-out operation by the contacting object 150 on the curtain control screen 410 (in the order of the left diagram, the middle diagram, and the right diagram of FIG. 11). Then, the display control section 103 varies the lace curtain image 413 from the state with a closed lace curtain into a state with an opened lace curtain in accordance with movement of the contacting object 150 (in the order of the left diagram, the middle diagram, and the right diagram of FIG. 11).

At this time, the display control section 103 displays a window frame image 414 that represents a window frame as the lace curtain image 413 is opened. In order to achieve this, for example, the curtain image 412 may be provided in a first layer, the lace curtain image 413 may be provided in a second layer, the window frame image 414 may be provided in a third layer, the order of priority for image display of the first layer may be the highest, the order of priority for image display of the second layer may be the second highest, and the order of priority for image display of the third layer may be the lowest. The curtain control section 105 generates a control command (corresponding to an example of the second open control command) for opening the lace curtain of the electric lace curtain device of the electric curtain system 200 corresponding to the lace curtain image 413.

In addition, the display control section 103 displays the lace curtain image 413 which is opened by a width corresponding to the operation width of the pinch-out operation by the contacting object 150. In addition, the curtain control section 105 generates a control command for opening the lace curtain 222 of the electric lace curtain device of the electric curtain system 200 by a width corresponding to the operation width of the pinch-out operation by the contacting object 150.

The communication control section 106 transmits the generated control command to the control unit 210 of the electric curtain system 200.

Next, an operation of closing the lace curtain 222 of the electric lace curtain device of the electric curtain system 200 will be described with reference to FIG. 12. The curtain image 412 representing a state in which the curtain 221 is opened and the lace curtain image 413 representing a state in which the lace curtain 222 is opened are displayed (the left diagram of FIG. 12). In this state, the touch panel control section 102 senses a pinch-in operation by the contacting object 150 on the curtain control screen 410 (in the order of the left diagram, the middle diagram, and the right diagram of FIG. 12).

Then, the display control section 103 varies the lace curtain image 413 from the state with an opened lace curtain into a state with a closed lace curtain in accordance with movement of the contacting object 150 (in the order of the left diagram, the middle diagram, and the right diagram of FIG. 12). The curtain control section 105 generates a control command for closing the lace curtain 222 of the electric lace curtain device of the electric curtain system 200 corresponding to the lace curtain image 413.

In addition, the display control section 103 displays the lace curtain image 413 which is closed by a width corresponding to the operation width of the pinch-in operation by the contacting object 150. In addition, the curtain control section 105 generates a control command for closing the lace curtain 222 of the electric lace curtain device of the electric curtain system 200 by a width corresponding to the operation width of the pinch-in operation by the contacting object 150.

The communication control section 106 transmits the generated control command to the control unit 210 of the electric curtain system 200.

Figure 13:
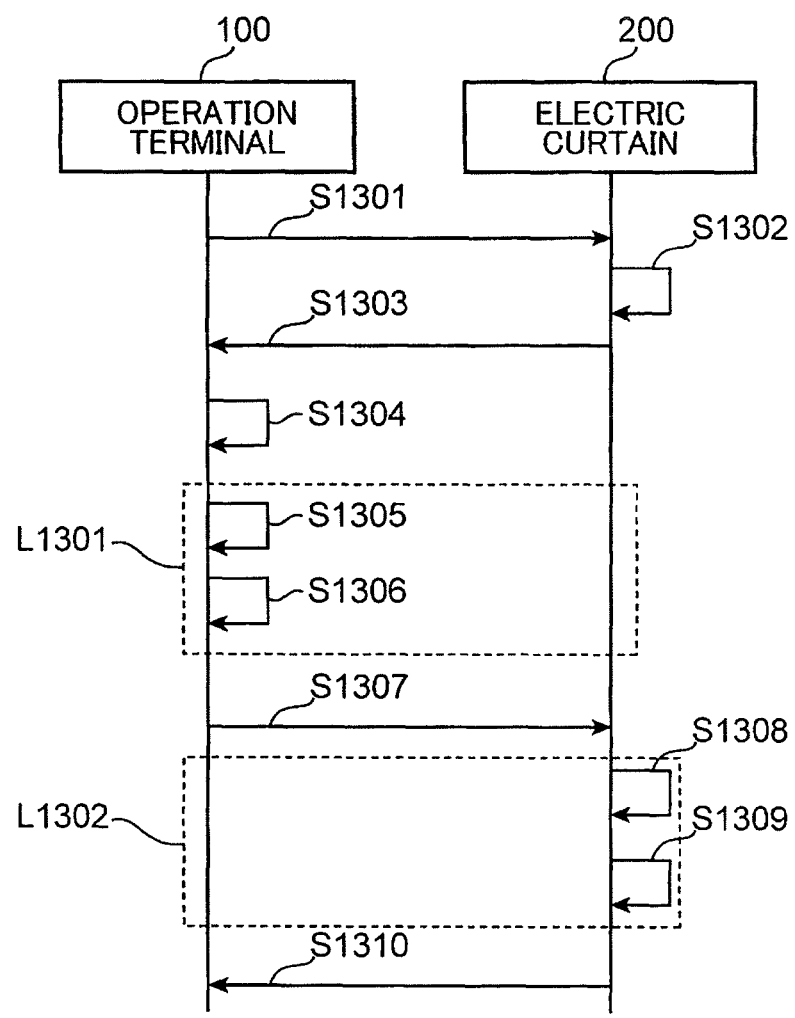
FIG. 13 is a sequence diagram showing a process flow in the operation terminal and the electric curtain system.

FIG. 13 is a sequence diagram showing a process flow in the operation terminal 100 and the electric curtain system 200. First, upon receiving a request from the display control section 103, the communication control section 106 of the operation terminal 100 transmits a request to acquire the present open/close state of the curtain 221 and the lace curtain 222 (for example, the position of an end portion on the moving side of the curtain 221 and the lace curtain 222) to the electric curtain system 200 (S1301). Next, when the acquisition request is received via the communication control section 214, the curtain control section 213 of the electric curtain system 200 acquires the open/close state of the curtain 221 and the lace curtain 222 from the position sensor 212 (S1302).

Upon receiving a request from the curtain control section 213, the communication control section 214 transmits the open/close state of the curtain 221 and the lace curtain 222 to the operation terminal 100 (S1303). The display control section 103 of the operation terminal 100 receives the open/close state of the curtain 221 and the lace curtain 222 via the communication control section 106. The display control section 103 displays the curtain control screen 410 on the display 101 on the basis of the received open/close state of the curtain 221 and the lace curtain 222 (S1304). For example, in the case where the curtain 221 is fully open and the lace curtain 222 is fully closed, the display control section 103 displays the curtain control screen 410 shown in the left diagram of FIG. 10 on the display 101.

Next, the touch panel control section 102 of the operation terminal 100 senses an operation (for example, a pinch-out operation, a pinch-in operation, or a swipe operation) of the contacting object 150 performed by the user on the curtain control screen 410 (S1305). Next, the display control section 103 of the operation terminal 100 varies the curtain image 412 or the lace curtain image 413 so as to represent the target position for opening and closing of the curtain 221 or the lace curtain 222 in accordance with the operation width of the contacting object 150 (S1306).

In the operation terminal 100, S1305 and S1306 included in L1301 are repeated until the touch panel control section 102 senses that the contacting object 150 is moved away from the display 101. As a result, after a pinch-in operation is performed for half an operation width for fully closing the curtain 221 with the curtain control screen 410 shown in the left diagram of FIG. 10 displayed on the display 101, for example, the contacting object 150 is moved away from the display 101. Then, the display control section 103 displays the curtain control screen 410 shown in the middle diagram of FIG. 10 on the display 101. That is, the position of the curtain image 412 shown in the middle diagram of FIG. 10 is determined as the target position for opening and closing of the curtain 221.

In addition, after a pinch-in operation is performed for an operation width for fully closing the curtain 221 with the curtain control screen 410 shown in the left diagram of FIG. 10 displayed on the display 101, for example, the contacting object 150 is moved away from the display 101. Then, the display control section 103 displays the curtain control screen 410 shown in the right diagram of FIG. 10 on the display 101. That is, the position of the curtain image 412 shown in the right diagram of FIG. 10 is determined as the target position for opening and closing of the curtain 221.

When the touch panel control section 102 senses that the contacting object 150 is moved away from the display 101, the curtain control section 105 of the operation terminal 100 generates a control command in accordance with the operation width of the contacting object 150. Upon receiving a request from the curtain control section 105, the communication control section 106 transmits the control command generated by the curtain control section 105 to the electric curtain system 200 (S1307).

After receiving the control command via the communication control section 214 of the electric curtain system 200, the curtain control section 213 controls the drive section 211 on the basis of the control command to perform opening operation or closing operation of the curtain 221 or the lace curtain 222 (S1308). Next, the curtain control section 213 detects the current open/close state of the curtain 221 or the lace curtain 222 (for example, the current position of an end portion on the moving side of the curtain 221 or the lace curtain 222) using the position sensor 212 (S1309).

In the electric curtain system 200, S1308 and S1309 included in L1302 are repeated until the open/close state of the curtain 221 or the lace curtain 222 reaches the target position. When the open/close state of the curtain 221 or the lace curtain 222 reaches the target position, the communication control section 214 receives a request from the curtain control section 213, and transmits the result of control for the curtain 221 or the lace curtain 222 to the operation terminal 100 (S1310). The process is thus terminated.

FIG. 14 is a flowchart showing a process flow for the operation terminal 100 to control the electric curtain system 200.

First, the display control section 103 displays the curtain select screen 400 on the display 101 (S1401). Subsequently, a user operation through contact of the contacting object 150 on the curtain select screen 400 is received (S1402). Next, the touch panel control section 102 judges whether or not the contact target for the contacting object 150 is the end button 407 (S1403).

When the touch panel control section 102 judges that the contact target is the end button 407 (YES in S1403), the flow is terminated. When the touch panel control section 102 judges that the contact target is not the end button 407 (NO in S1403), on the other hand, the touch panel control section 102 judges a select button of the contact target. The display control section 103 acquires the current open/close state of a curtain corresponding to the judged select button from the electric curtain system (S1404). For example, if the touch panel control section 102 judges that the contact target is the select button 405A, the display control section 103 acquires the open/close state of the curtain 221 and the lace curtain 222 from the electric curtain system 200.

Next, the display control section 103 displays a curtain control screen corresponding to the select button of the contact target on the display 101 (S1405). For example, in the case where the contact target is the select button 405A, the display control section 103 displays the curtain control screen 410 shown in FIG. 8 on the display 101. Subsequently, the process is advanced to a control flow for a curtain (FIGS. 15A to 15D) (S1406). After that, the process returns to S1401.

FIGS. 15A to 15D are flowcharts showing a flow of the process (S1406 of FIG. 14) for the operation terminal 100 to generate and transmit a control command for controlling the curtain 221 and the lace curtain 222 of the electric curtain system 200.

First, the touch panel control section 102 judges whether or not selection of the return button 411 by the contacting object 150 is sensed in the curtain control screen 410 (S1501). When selection of the return button 411 is sensed (YES in S1501), the flow is terminated. If selection of the return button 411 is not sensed (NO in S1501), the touch panel control section 102 judges whether or not a pinch-out operation or a pinch-in operation by the contacting object 150 is sensed (S1502).

If the touch panel control section 102 senses a pinch-out operation in S1502, the process is advanced to S1503. If the touch panel control section 102 senses a pinch-in operation, the process is advanced to S1511. Otherwise (NO in S1502), the process returns to S1501.

In S1503, the display control section 103 judges, on the basis of the open/close state acquired in S1404 of FIG. 14, whether or not the curtain 221 of the electric curtain device of the electric curtain system 200 is fully open. If the curtain 221 is not fully open (NO in S1503), the curtain image 412 displayed on the display 101 is varied so as to represent the target position for opening and closing of the curtain 221 in accordance with the operation width of the pinch-out operation acquired from the touch panel control section 102 (S1504).

Next, the display control section 103 judges whether or not the pinch-out operation is terminated (S1505). If the pinch-out operation is not terminated (NO in S1505), the process returns to S1504. If the pinch-out operation is terminated in S1505 (YES in S1505), on the other hand, the process is advanced to S1521. Thus, S1504 is executed until the pinch-out operation is terminated. As a result, the curtain image 412 displayed on the display 101 is updated each time S1504 is executed (for example, at intervals of 0.1 seconds). The curtain image 412 between the left diagram and the middle diagram of FIG. 9 and the curtain image 412 between the middle diagram and the right diagram of FIG. 9 are not shown.

If the curtain 221 is fully open in S1503 (YES in S1503), the display control section 103 judges, on the basis of the open/close state acquired in S1404 of FIG. 14, whether or not the lace curtain 222 of the electric lace curtain device of the electric curtain system 200 is fully open (S1506). If the lace curtain 222 is fully open (YES in S1506), the process returns to S1501.

If the lace curtain 222 is not fully open in S1506 (NO in S1506), on the other hand, the lace curtain image 413 displayed on the display 101 is varied so as to represent the target position for opening and closing of the lace curtain 222 in accordance with the operation width of the pinch-out operation acquired from the touch panel control section 102 (S1507).

Next, the display control section 103 judges whether or not the pinch-out operation is terminated (S1508). If the pinch-out operation is not terminated (NO in S1508), the process returns to S1507. If the pinch-out operation is terminated in S1508 (YES in S1508), on the other hand, the process is advanced to S1521. Thus, S1507 is executed until the pinch-out operation is terminated. As a result, the lace curtain image 413 displayed on the display 101 is updated each time S1507 is executed (for example, at intervals of 0.1 seconds). The lace curtain image 413 between the left diagram and the middle diagram of FIG. 11 and the lace curtain image 413 between the middle diagram and the right diagram of FIG. 11 are not shown.

In S1511, the display control section 103 judges, on the basis of the open/close state acquired in S1404 of FIG. 14, whether or not the lace curtain 222 of the electric lace curtain device of the electric curtain system 200 is fully closed. If the lace curtain 222 is not fully closed (NO in S1511), the lace curtain image 413 displayed on the display 101 is varied so as to represent the target position for opening and closing of the lace curtain 222 in accordance with the operation width of the pinch-in operation acquired from the touch panel control section 102 (S1512).

Next, the display control section 103 judges whether or not the pinch-in operation is terminated (S1513). If the pinch-in operation is not terminated (NO in S1513), the process returns to S1512. If the pinch-in operation is terminated in S1513 (YES in S1513), on the other hand, the process is advanced to S1521. Thus, S1512 is executed until the pinch-in operation is terminated. As a result, the lace curtain image 413 displayed on the display 101 is updated each time S1512 is executed (for example, at intervals of 0.1 seconds). The lace curtain image 413 between the left diagram and the middle diagram of FIG. 12 and the lace curtain image 413 between the middle diagram and the right diagram of FIG. 12 are not shown.

If the lace curtain 222 is fully closed in S1511 (YES in S1511), the display control section 103 judges, on the basis of the open/close state acquired in S1404 of FIG. 14, whether or not the curtain 221 of the electric curtain device of the electric curtain system 200 is fully closed (S1514). If the curtain 221 is fully closed (YES in S1514), the process returns to S1501.

If the curtain 221 is not fully closed in S1514 (NO in S1514), on the other hand, the curtain image 412 displayed on the display 101 is varied so as to represent the target position for opening and closing of the curtain 221 in accordance with the operation width of the pinch-in operation acquired from the touch panel control section 102 (S1515).

Next, the display control section 103 judges whether or not the pinch-in operation is terminated (S1516). If the pinch-in operation is not terminated (NO in S1516), the process returns to S1515. If the pinch-in operation is terminated in S1516 (YES in S1516), on the other hand, the process is advanced to S1521. Thus, S1515 is executed until the pinch-in operation is terminated. As a result, the curtain image 412 displayed on the display 101 is updated each time S1515 is executed (for example, at intervals of 0.1 seconds). The curtain image 412 between the left diagram and the middle diagram of FIG. 10 and the curtain image 412 between the middle diagram and the right diagram of FIG. 10 are not shown.

In S1521, the curtain control section 105 generates a control command for opening and closing the curtain 221 or the lace curtain 222 up to the target position corresponding to the operation width of the pinch-out operation or the pinch-in operation acquired from the touch panel control section 102. Subsequently, the communication control section 106 transmits the control command generated by the curtain control section 105 to the electric curtain system 200 (S1522). Next, the communication control section 106 receives the result of control for the curtain 221 or the lace curtain 222 transmitted from the electric curtain system 200, and delivers the received control result to the curtain control section 105 (S1523). The flow is thus terminated.

Figure 16:
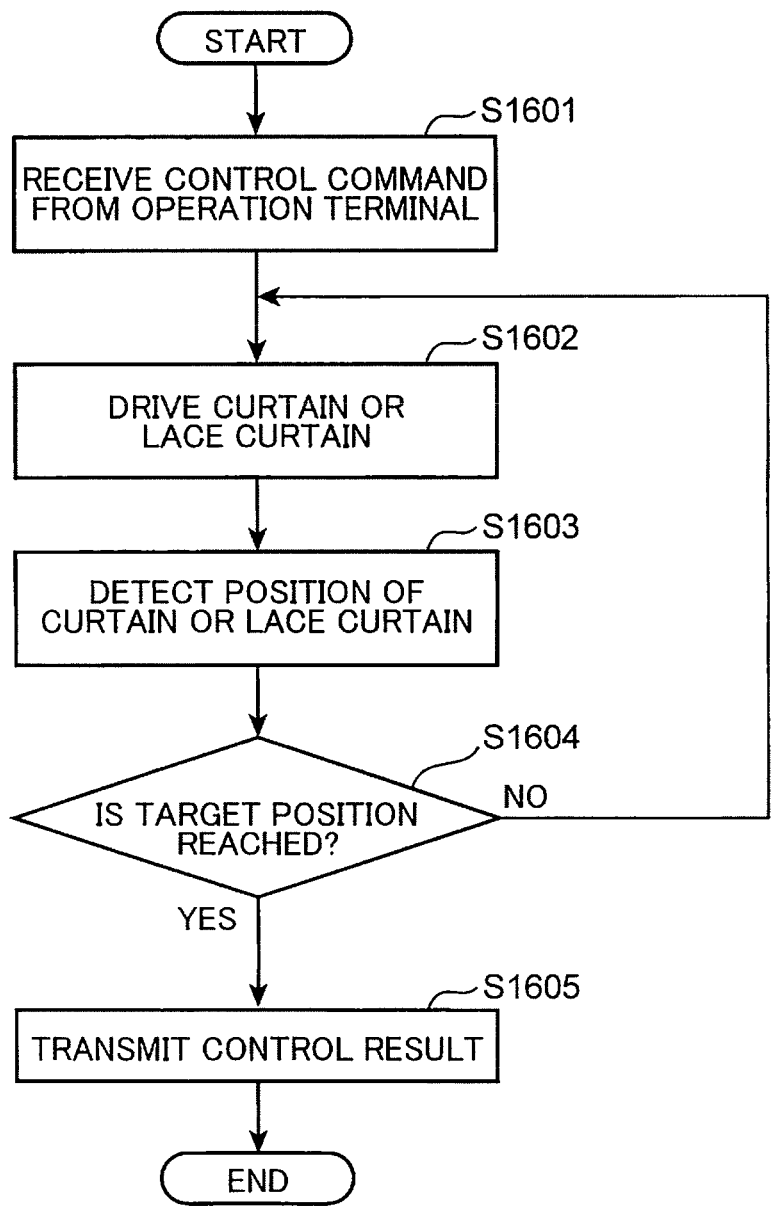
FIG. 16 is a flowchart showing a process flow in the electric curtain system.

FIG. 16 is a flowchart showing a process flow in the electric curtain system 200. First, the communication control section 214 of the electric curtain system 200 receives a control command for opening and closing a curtain transmitted from the operation terminal 100, and delivers the control command to the curtain control section 213 (S1601). Then, the curtain control section 213 controls the drive section 211 in accordance with the received control command to drive the curtain 221 or the lace curtain 222 (S1602). Next, the curtain control section 213 acquires the result of detection of the open/close state of the curtain 221 or the lace curtain 222 from the position sensor 212 (S1603).

Subsequently, the curtain control section 213 judges, on the basis of the acquired detection result, whether or not the curtain 221 or the lace curtain 222 has reached the target position indicated by the control command (S1604). If the curtain 221 or the lace curtain 222 has not reached the target position (NO in S1604), the process returns to S1602. If the curtain 221 or the lace curtain 222 has reached the target position in S1604 (YES in S1604), on the other hand, the communication control section 214 receives a request from the curtain control section 213, and transmits the control result to the operation terminal 100 (S1605). The flow is thus terminated.

(Open/Close Control for Shade Curtain)

FIG. 17 is a diagram showing an example of the curtain control screen 410 displayed on the display 101 of the operation terminal 100, the example being different from the curtain control screen of FIG. 8.

The curtain control screen 410 of FIG. 17 is an operation screen that allows performing an open/close operation for a thick shade curtain (hereinafter referred to simply as a "shade curtain") of the electric curtain device and a thin shade lace curtain of the electric lace curtain device included in the electric curtain system 201 disposed in the bedroom.

The curtain control screen 410 includes a return button 411, a curtain image 421 representing the shade curtain of the electric curtain device, and a lace curtain image (not shown) representing the shade lace curtain of the electric lace curtain device. In addition, a text saying "BEDROOM CURTAIN" is affixed to the curtain control screen 410 of FIG. 17. This allows the user to easily understand that the screen is a control screen for a curtain disposed in the bedroom. The shade curtain is an example of the curtain that opens and closes in one direction, and opens and closes in the vertical direction.

When the user selects the select button 405B with the contacting object in the curtain select screen 400 shown in FIG. 7, the touch panel control section 102 senses the selection. Then, as shown in FIG. 17, the display control section 103 displays the curtain control screen 410 corresponding to the select button 405B on the display 101.

FIGS. 18 and 19 are each a diagram showing an example of an operation by the contacting object and an example of display of the curtain control screen 410 during open/close control for the shade curtain. FIG. 18 shows an operation example and a display example at the time when opening the shade curtain. FIG. 19 shows an operation example and a display example at the time when closing the shade curtain. In FIGS. 18 and 19, the lace curtain image representing the shade lace curtain is not shown.

First, an operation of opening the shade curtain of the electric curtain device of the electric curtain system 201 will be described with reference to FIG. 18. The curtain image 421 in which the shade curtain is closed is displayed (the left diagram of FIG. 18). In this state, the touch panel control section 102 senses an upward swipe operation by the contacting object 150 (for example, one finger of the user) on the curtain control screen 410 (in the order of the left diagram, the middle diagram, and the right diagram of FIG. 18).

Then, the display control section 103 varies the curtain image 421 from the state with a closed shade curtain into a state with an opened shade curtain in accordance with movement of the contacting object 150 (in the order of the left diagram, the middle diagram, and the right diagram of FIG. 18). At this time, the display control section 103 displays a window frame image 414 that represents a window frame as the curtain image 421 is opened. The curtain control section 105 generates a control command (corresponding to an example of the movement control command) for opening the shade curtain of the electric curtain device of the electric curtain system 201 corresponding to the curtain image 421.

In addition, the display control section 103 displays the curtain image 421 which is opened for a distance matching the amount of movement of the swipe operation by the contacting object 150. In addition, the curtain control section 105 generates a control command (corresponding to an example of the distance control command) for opening the shade curtain of the electric curtain device of the electric curtain system 201 for a distance matching the amount of movement of the swipe operation by the contacting object 150.

The communication control section 106 transmits the generated control command to the control unit of the electric curtain system 201.

Next, an operation of closing the shade curtain of the electric curtain device of the electric curtain system 201 will be described with reference to FIG. 19. The curtain image 421 in which the shade curtain is opened and the window frame image 414 are displayed (the left diagram of FIG. 19). In this state, the touch panel control section 102 senses a downward swipe operation by the contacting object 150 on the curtain control screen 410 (in the order of the left diagram, the middle diagram, and the right diagram of FIG. 19).

Then, the display control section 103 varies the curtain image 421 from the state with an opened shade curtain into a state with a closed shade curtain in accordance with movement of the contacting object 150 (in the order of the left diagram, the middle diagram, and the right diagram of FIG. 19). The curtain control section 105 generates a control command (corresponding to an example of the movement control command) for closing the shade curtain of the electric curtain device of the electric curtain system 201 corresponding to the curtain image 421.

In addition, the display control section 103 displays the curtain image 421 which is opened for a distance matching the amount of movement of the swipe operation by the contacting object 150. In addition, the curtain control section 105 generates a control command (corresponding to an example of the distance control command) for opening the shade curtain of the electric curtain device of the electric curtain system 201 for a distance matching the amount of movement of the swipe operation by the contacting object 150.

The communication control section 106 transmits the generated control command to the control unit of the electric curtain system 201.

Although the shade lace curtain is not shown in FIGS. 18 and 19, the shade lace curtain is also subjected to open/close control as in FIGS. 18 and 19.

FIGS. 20A to 20D are flowcharts showing a flow of the process (S1406 of FIG. 14) for the operation terminal 100 to generate and transmit a control command for controlling the shade curtain and the shade lace curtain of the electric curtain system 201. The process flow in the curtain select screen 400 of FIG. 7 is performed as in FIG. 14, and the process of FIGS. 20A to 20D is executed as a sub routine (S1406) of FIG. 14.

First, the touch panel control section 102 judges whether or not selection of the return button 411 by the contacting object 150 is sensed in the curtain control screen 410 (S2001). When selection of the return button 411 is sensed (YES in S2001), the flow is terminated. When selection of the return button 411 is not sensed (NO in S2001), on the other hand, the touch panel control section 102 judges whether or not upward or downward movement of the position of contact by the contacting object 150 is sensed (S2002).

If the touch panel control section 102 senses upward movement of the position of contact by the contacting object 150 in S2002, the process is advanced to S2003. If the touch panel control section 102 senses downward movement, the process is advanced to S2011. If upward or downward movement of the position of contact by the contacting object 150 is not sensed (NO in S2002), the process returns to S2001.

In S2003, the display control section 103 judges, on the basis of the open/close state acquired in S1404 of FIG. 14, whether or not the shade curtain of the electric curtain device of the electric curtain system 201 is fully open. If the shade curtain is not fully open (NO in S2003), the curtain image 421 displayed on the display 101 is varied so as to represent the target position for opening and closing of the shade curtain in accordance with the amount of the upward movement (upward swipe operation) of the contacting object 150 acquired from the touch panel control section 102 (S2004).

Next, the display control section 103 judges whether or not upward movement of the contacting object 150 is terminated (S2005). If the upward movement of the contacting object 150 is not terminated (NO in S2005), the process returns to S2004. If the upward movement of the contacting object 150 is terminated in S2005 (YES in S2005), on the other hand, the process is advanced to S2021. Thus, S2004 is executed until the upward movement is terminated. As a result, the curtain image 421 displayed on the display 101 is updated each time S2004 is executed.

If the shade curtain is fully open in S2003 (YES in S2003), the display control section 103 judges, on the basis of the open/close state acquired in S1404 of FIG. 14, whether or not the shade lace curtain of the electric lace curtain device of the electric curtain system 201 is fully open (S2006). If the shade lace curtain is fully open (YES in S2006), the process returns to S2001.

If the shade lace curtain is not fully open in S2006 (NO in S2006), on the other hand, the lace curtain image displayed on the display 101 is varied so as to represent the target position for opening and closing of the shade lace curtain in accordance with the amount of the upward movement of the contacting object 150 acquired from the touch panel control section 102 (S2007).

Next, the display control section 103 judges whether or not upward movement of the contacting object 150 is terminated (S2008). If the upward movement of the contacting object 150 is not terminated (NO in S2008), the process returns to S2007. If the upward movement of the contacting object 150 is terminated in S2008 (YES in S2008), on the other hand, the process is advanced to S2021. Thus, S2007 is executed until the upward movement is terminated. As a result, the lace curtain image displayed on the display 101 is updated each time S2007 is executed.

In S2011, the display control section 103 judges, on the basis of the open/close state acquired in S1404 of FIG. 14, whether or not the shade lace curtain of the electric lace curtain device of the electric curtain system 201 is fully closed. If the shade lace curtain is not fully closed (NO in S2011), the lace curtain image displayed on the display 101 is varied so as to represent the target position for opening and closing of the shade lace curtain in accordance with the amount of the downward movement (downward swipe operation) of the contacting object 150 acquired from the touch panel control section 102 (S2012).

Next, the display control section 103 judges whether or not downward movement of the contacting object 150 is terminated (S2013). If the downward movement of the contacting object 150 is not terminated (NO in S2013), the process returns to S2012. If the downward movement of the contacting object 150 is terminated in S2013 (YES in S2013), on the other hand, the process is advanced to S2021. Thus, S2012 is executed until the downward movement is terminated. As a result, the lace curtain image displayed on the display 101 is updated each time S2012 is executed.

If the shade lace curtain is fully closed in S2011 (YES in S2011), the display control section 103 judges, on the basis of the open/close state acquired in S1404 of FIG. 14, whether or not the shade curtain of the electric curtain device of the electric curtain system 201 is fully closed (S2014). If the shade curtain is fully closed (YES in S2014), the process returns to S2001.

If the shade curtain is not fully closed in S2014 (NO in S2014), on the other hand, the curtain image 421 displayed on the display 101 is varied so as to represent the target position for opening and closing of the shade curtain in accordance with the amount of the downward movement of the contacting object 150 acquired from the touch panel control section 102 (S2015).

Next, the display control section 103 judges whether or not downward movement of the contacting object 150 is terminated (S2016). If the downward movement of the contacting object 150 is not terminated (NO in S2016), the process returns to S2015. If the downward movement of the contacting object 150 is terminated in S2016 (YES in S2016), on the other hand, the process is advanced to S2021. Thus, S2015 is executed until the downward movement is terminated. As a result, the curtain image 421 displayed on the display 101 is updated each time S2015 is executed.

In S2021, the curtain control section 105 generates a control command for opening and closing the shade curtain or the shade lace curtain up to the target position corresponding to the amount of the upward movement or the downward movement of the contacting object 150 acquired from the touch panel control section 102. Subsequently, the communication control section 106 transmits the control command generated by the curtain control section 105 to the electric curtain system 201 (S2022). Next, the communication control section 106 receives the result of control for the shade curtain or the shade lace curtain transmitted from the electric curtain system 201, and delivers the received control result to the curtain control section 105 (S2023). The flow is thus terminated.

The flow of the process in the electric curtain system 201 is the same as the flow of the process shown in FIG. 16 except that the "curtain" is replaced with the "shade curtain" and the "lace curtain" is replaced with the "shade lace curtain".

(Open/Close Control for One-Way Draw Curtain)

FIGS. 21 and 22 are each a diagram showing an example of display on the curtain control screen 410 and an example of an operation by the contacting object 150 during open/close control for a one-way draw curtain. FIG. 21 shows a display example and an operation example at the time when opening the one-way draw curtain. FIG. 22 shows a display example and an operation example at the time when closing the one-way draw curtain. FIGS. 21 and 22 show an example of a case where the electric curtain system 201 includes an electric curtain device that opens and closes the one-way draw curtain. The curtain control screen 410 of FIGS. 21 and 22 includes a curtain image 422 that represents a one-way draw curtain of an electric curtain device. The one-way draw curtain is an example of the curtain that opens and closes in one direction, and opens and closes in the horizontal direction.

First, an operation of opening the one-way draw curtain of the electric curtain device of the electric curtain system 201 will be described with reference to FIG. 21. The curtain image 422 in which the one-way draw curtain is closed is displayed (the left diagram of FIG. 21). In this state, the touch panel control section 102 senses a rightward swipe operation by the contacting object 150 (for example, one finger of the user) on the curtain control screen 410 (in the order of the left diagram, the middle diagram, and the right diagram of FIG. 21).

Then, the display control section 103 varies the curtain image 422 from the state with a closed one-way draw curtain into a state with an opened one-way draw curtain in accordance with movement of the contacting object 150 (in the order of the left diagram, the middle diagram, and the right diagram of FIG. 21). At this time, the display control section 103 displays a window frame image 414 that represents a window frame as the curtain image 422 is opened. The curtain control section 105 generates a control command (corresponding to an example of the movement control command) for opening the one-way draw curtain of the electric curtain device of the electric curtain system 201 corresponding to the curtain image 422.

In addition, the display control section 103 displays the curtain image 422 which is opened for a distance matching the amount of movement of the swipe operation by the contacting object 150. In addition, the curtain control section 105 generates a control command (corresponding to an example of the distance control command) for opening the one-way draw curtain of the electric curtain device of the electric curtain system 201 for a distance matching the amount of movement of the swipe operation by the contacting object 150.

The communication control section 106 transmits the generated control command to the control unit of the electric curtain system 201.

Next, an operation of closing the one-way draw curtain of the electric curtain device of the electric curtain system 201 will be described with reference to FIG. 22. The curtain image 422 in which the one-way draw curtain is opened is displayed (the left diagram of FIG. 22). In this state, the touch panel control section 102 senses a leftward swipe operation by the contacting object 150 on the curtain control screen 410 (in the order of the left diagram, the middle diagram, and the right diagram of FIG. 22).

Then, the display control section 103 varies the curtain image 422 from the state with an opened one-way draw curtain into a state with a closed one-way draw curtain in accordance with movement of the contacting object 150 (in the order of the left diagram, the middle diagram, and the right diagram of FIG. 22). The curtain control section 105 generates a control command (corresponding to an example of the movement control command) for closing the one-way draw curtain of the electric curtain device of the electric curtain system 201 corresponding to the curtain image 422.

In addition, the display control section 103 displays the curtain image 422 which is closed for a distance matching the amount of movement of the swipe operation by the contacting object 150. In addition, the curtain control section 105 generates a control command (corresponding to an example of the distance control command) for closing the one-way draw curtain of the electric curtain device of the electric curtain system 201 for a distance matching the amount of movement of the swipe operation by the contacting object 150.

The communication control section 106 transmits the generated control command to the control unit of the electric curtain system 201.

In FIGS. 21 and 22, the electric curtain system 201 includes only an electric curtain device that opens and closes a one-way draw curtain. Also in the case where the electric curtain system 201 further includes an electric lace curtain device that opens and closes a one-way draw lace curtain, however, open/close control is performed as in the case of FIGS. 21 and 22.

An electric curtain device having center draw curtains such as the curtain image 412 shown in FIGS. 9 and 10 may be operated as in the case of FIGS. 21 and 22 in the case where only a curtain on one of the right side and the left side is to be opened and closed. Specifically, in the case where only the curtain on the right side is to be opened in FIG. 9, for example, a rightward swipe operation may be performed by the contacting object 150 in the right half portion of the display region of the curtain image 412. Meanwhile, in the case where only the curtain on the left side is to be closed in FIG. 10, for example, a rightward swipe operation may be performed by the contacting object 150 in the left half portion of the display region of the curtain image 412.

(Open/Close Control for Roll Screen)

FIG. 23 is a diagram showing a further different example of the curtain control screen 410 displayed on the display 101 of the operation terminal 100.

The curtain control screen 410 of FIG. 23 is an operation screen that allows performing an open/close operation for a roll screen of an electric roll screen device included in the electric curtain system 202 disposed in the child room. The curtain control screen 410 includes a return button 411, and a curtain image 431 representing the roll screen of the electric roll screen device of the electric curtain system 202. In addition, a text saying "CHILD ROOM CURTAIN" is affixed to the curtain control screen 410 of FIG. 23. This allows the user to easily understand that the screen is a control screen for a curtain disposed in the child room. The roll screen is an example of the curtain that opens and closes in one direction, and opens and closes in the vertical direction.

When the user selects the select button 405C with the contacting object in the curtain select screen 400 shown in FIG. 7, the touch panel control section 102 senses the selection. Then, as shown in FIG. 23, the display control section 103 displays the curtain control screen 410 corresponding to the select button 405C on the display 101.

FIGS. 24 and 25 are each a diagram showing an example of display on the curtain control screen 410 and an example of an operation by the contacting object 150 during open/close control for the roll screen. FIG. 24 shows a display example and an operation example at the time when opening the roll screen. FIG. 25 shows a display example and an operation example at the time when closing the roll screen.

First, an operation of opening the roll screen of the electric roll screen device of the electric curtain system 202 will be described with reference to FIG. 24. The curtain image 431 in which the roll screen is closed is displayed (the left diagram of FIG. 24). In this state, the touch panel control section 102 senses an upward swipe operation by the contacting object 150 (for example, one finger of the user) on the curtain control screen 410 (in the order of the left diagram, the middle diagram, and the right diagram of FIG. 24).

Then, the display control section 103 varies the curtain image 431 from the state with a closed roll screen into a state with an opened roll screen in accordance with movement of the contacting object 150 (in the order of the left diagram, the middle diagram, and the right diagram of FIG. 24). At this time, the display control section 103 displays a window frame image 414 that represents a window frame as the curtain image 431 is opened. The curtain control section 105 generates a control command (corresponding to an example of the movement control command) for opening the roll screen of the electric roll screen device of the electric curtain system 202 corresponding to the curtain image 431.

In addition, the display control section 103 displays the curtain image 431 which is opened for a distance matching the amount of movement of the swipe operation by the contacting object 150. In addition, the curtain control section 105 generates a control command (corresponding to an example of the distance control command) for opening the roll screen of the electric roll screen device of the electric curtain system 202 for a distance matching the amount of movement of the swipe operation by the contacting object 150.

The communication control section 106 transmits the generated control command to the control unit of the electric curtain system 202.

Next, an operation of closing the roll screen of the electric roll screen device of the electric curtain system 202 will be described with reference to FIG. 25. The curtain image 431 in which the roll screen is opened and the window frame image 414 are displayed (the left diagram of FIG. 25). In this state, the touch panel control section 102 senses a downward swipe operation by the contacting object 150 on the curtain control screen 410 (in the order of the left diagram, the middle diagram, and the right diagram of FIG. 25).

Then, the display control section 103 varies the curtain image 431 from the state with an opened roll screen into a state with a closed roll screen in accordance with movement of the contacting object 150 (in the order of the left diagram, the middle diagram, and the right diagram of FIG. 25). The curtain control section 105 generates a control command (corresponding to an example of the movement control command) for closing the roll screen of the electric roll screen device of the electric curtain system 202 corresponding to the curtain image 431.

In addition, the display control section 103 displays the curtain image 431 which is closed for a distance matching the amount of movement of the swipe operation by the contacting object 150. In addition, the curtain control section 105 generates a control command (corresponding to an example of the distance control command) for closing the roll screen of the electric roll screen device of the electric curtain system 202 for a distance matching the amount of movement of the swipe operation by the contacting object 150.

The communication control section 106 transmits the generated control command to the control unit of the electric curtain system 202.

(Open/Close Control for Blind)

FIG. 26 is a diagram showing a further different example of the curtain control screen 410 displayed on the display 101 of the operation terminal 100. FIG. 26 shows another example of the electric curtain system 202 disposed in the child room.

The curtain control screen 410 of FIG. 26 is an operation screen that allows performing an open/close operation for a blind of an electric blind device of the electric curtain system 202 disposed in the child room. The curtain control screen 410 includes a return button 411, and a curtain image 432 representing the blind of the electric blind device of the electric curtain system 202. In addition, a text saying "CHILD ROOM CURTAIN" is affixed to the curtain control screen 410 of FIG. 26. This allows the user to easily understand that the screen is a control screen for a curtain disposed in the child room. The blind is an example of the curtain that opens and closes in one direction, and opens and closes in the vertical direction.

When the user selects the select button 405C with the contacting object in the curtain select screen 400 shown in FIG. 7, the touch panel control section 102 senses the selection. Then, as shown in FIG. 26, the display control section 103 displays the curtain control screen 410 corresponding to the select button 405C on the display 101.

FIGS. 27 and 28 are each a diagram showing an example of display on the curtain control screen 410 and an example of an operation by the contacting object 150 during open/close control for the blind. FIG. 27 shows a display example and an operation example at the time when opening the blind. FIG. 28 shows a display example and an operation example at the time when closing the blind.

First, an operation of opening the blind of the electric blind device of the electric curtain system 202 will be described with reference to FIG. 27. The curtain image 432 in which the blind is closed is displayed (the left diagram of FIG. 27). In this state, the touch panel control section 102 senses an upward swipe operation by the contacting object 150 (for example, one finger of the user) on the curtain control screen 410 (in the order of the left diagram, the middle diagram, and the right diagram of FIG. 27).

Then, the display control section 103 varies the curtain image 432 from the state with a closed blind into a state with an opened blind in accordance with movement of the contacting object 150 (in the order of the left diagram, the middle diagram, and the right diagram of FIG. 27). At this time, the display control section 103 displays a window frame image 414 that represents a window frame as the curtain image 432 is opened. In order to achieve this, as described above, for example, the curtain image 432 and the window frame image 414 may be provided in different layers, and the order of priority for image display of the layer of the curtain image 432 may be made higher than that of the layer of the window frame image 414. The curtain control section 105 generates a control command (corresponding to an example of the movement control command) for opening the blind of the electric blind device of the electric curtain system 202 corresponding to the curtain image 432.

In addition, the display control section 103 displays the curtain image 432 which is opened for a distance matching the amount of movement of the swipe operation by the contacting object 150. In addition, the curtain control section 105 generates a control command (corresponding to an example of the distance control command) for opening the blind of the electric blind device of the electric curtain system 202 for a distance matching the amount of movement of the swipe operation by the contacting object 150.

The communication control section 106 transmits the generated control command to the control unit of the electric curtain system 202.

Next, an operation of closing the blind of the electric blind device of the electric curtain system 202 will be described with reference to FIG. 28. The curtain image 432 in which the blind is opened and the window frame image 414 are displayed (the left diagram of FIG. 28). In this state, the touch panel control section 102 senses a downward swipe operation by the contacting object 150 on the curtain control screen 410 (in the order of the left diagram, the middle diagram, and the right diagram of FIG. 28).

Then, the display control section 103 varies the curtain image 432 from the state with an opened blind into a state with a closed blind in accordance with movement of the contacting object 150 (in the order of the left diagram, the middle diagram, and the right diagram of FIG. 28). The curtain control section 105 generates a control command (corresponding to an example of the movement control command) for closing the blind of the electric blind device of the electric curtain system 202 corresponding to the curtain image 432.

In addition, the display control section 103 displays the curtain image 432 which is closed for a distance matching the amount of movement of the swipe operation by the contacting object 150. In addition, the curtain control section 105 generates a control command (corresponding to an example of the distance control command) for closing the blind of the electric blind device of the electric curtain system 202 for a distance matching the amount of movement of the swipe operation by the contacting object 150.

The communication control section 106 transmits the generated control command to the control unit of the electric curtain system 202.

As described with reference to FIGS. 17 to 28, in the case of a curtain that opens and closes in one direction such as the shade curtain, the one-way draw curtain, the roll screen, and the blind, an open/close operation can be suitably performed by a swipe operation by the contacting object 150.

(Display of Actual Position of Curtain)

FIG. 29 is a diagram showing a display example of the curtain control screen 410 in which the actual position of the curtain is displayed when opening the curtain 221. FIG. 30 is a diagram showing a display example of the curtain control screen 410 in which the actual position of the curtain is displayed when closing the curtain 221.

As described above, the curtain control section 105 of the operation terminal 100 decides the target position for opening and closing of the curtain 221 on the basis of the operation amount of the pinch-out operation or the pinch-in operation by the contacting object 150 (for example, two fingers of the user).

When the user finishes the pinch-out operation in the state shown in the upper middle diagram of FIG. 29, for example, the curtain control section 105 decides the target position for opening and closing of the curtain 221 as a position at which the curtain 221 is half open. In this case, the display control section 103 displays the curtain image 412 representing a half-open curtain as shown in the upper middle diagram of FIG. 29. Display of the curtain image 412 allows the user to easily understand the target position for opening and closing of the curtain 221.

When the user finishes the pinch-out operation in the state shown in the upper right diagram of FIG. 29, for example, the curtain control section 105 decides the target position for opening and closing of the curtain 221 as a position at which the curtain 221 is fully open. In this case, the display control section 103 displays the curtain image 412 representing a fully open curtain as shown in the upper right diagram of FIG. 29.

When the user finishes the pinch-in operation in the state shown in the upper middle diagram of FIG. 30, for example, the curtain control section 105 decides the target position for opening and closing of the curtain 221 as a position at which the curtain 221 is half open. In this case, the display control section 103 displays the curtain image 412 representing a half-open curtain as shown in the upper middle diagram of FIG. 30.

When the user finishes the pinch-in operation in the state shown in the upper right diagram of FIG. 30, for example, the curtain control section 105 decides the target position for opening and closing of the curtain 221 as a position at which the curtain 221 is fully closed. In this case, the display control section 103 displays the curtain image 412 representing a fully closed curtain as shown in the upper right diagram of FIG. 30.

When the target position is decided, the curtain control section 105 generates a control command for opening and closing the curtain 221 to the decided target position. The communication control section 106 transmits the control command generated by the curtain control section 105 to the electric curtain system 200. The curtain control section 213 of the electric curtain system 200 receives the control command transmitted from the operation terminal 100 via the communication control section 214. The curtain control section 213 controls the drive section 211 to start operation of opening and closing the curtain 221 in accordance with the received control command. Specifically, operation of opening the curtain 221 is started in FIG. 29, and operation of closing the curtain 221 is started in FIG. 30.

At this time, actual motion of the curtain 221 is slower than motion of the curtain image 412 displayed on the curtain control screen 410. Thus, in the embodiment of FIGS. 29 and 30, as described below, the display control section 103 displays a schematic curtain movement image 500 representing the actual position of an end portion of the curtain 221 as overlapped on the curtain image 412 on the curtain control screen 410.

When the drive section 211 starts open/close operation of the curtain, the curtain control section 213 of the electric curtain system 200 repeatedly acquires the result of detection of the position of the curtain 221 performed by the position sensor 212. The curtain control section 213 may acquire the result of detection of the position of the curtain 221 performed by the position sensor 212 at certain intervals (for example, 0.1 seconds). The curtain control section 213 generates positional information indicating the position of the curtain 221 on the basis of the result of detection of the position of the curtain 221 performed by the position sensor 212 at each acquisition of the detection result. The positional information may be a numerical value representing the proportion at which the curtain 221 is closed with the fully closed state defined as 100% and the fully open state defined as 0%, for example. In this case, the positional information on the curtain 221 which is halfway closed as in the upper middle diagram of FIG. 29, for example, is 50%.

Each time the curtain control section 213 generates positional information indicating the position of the curtain 221, the communication control section 214 transmits the generated positional information to the operation terminal 100. When it is determined on the basis of the result of detection of the position of the curtain 221 performed by the position sensor 212 that the target position for the curtain 221 included in the control command is reached, the curtain control section 213 controls the drive section 211 so as to stop open/close operation of the curtain.

The display control section 103 of the operation terminal 100 receives the positional information indicating the position of the curtain 221 and transmitted from the electric curtain system 200 via the communication control section 106. The display control section 103 displays the schematic curtain movement image 500 representing the actual position of an end portion of the curtain 221 as overlapped on the curtain image 412 and the lace curtain image 413 on the curtain control screen 410 as shown in the lower left diagram of FIG. 29 and the lower left diagram of FIG. 30 on the basis of the received positional information.

In FIG. 29, the position of a left end portion 500L of the schematic curtain movement image 500 corresponds to the actual position of an end portion of the left curtain 221 moving in the opening direction. In addition, the position of a right end portion 500R of the schematic curtain movement image 500 corresponds to the actual position of an end portion of the right curtain 221 moving in the opening direction. In FIG. 30, the position of a left end portion 500L of the schematic curtain movement image 500 corresponds to the actual position of an end portion of the left curtain 221 moving in the closing direction. In addition, the position of a right end portion 500R of the schematic curtain movement image 500 corresponds to the actual position of an end portion of the right curtain 221 moving in the closing direction.

The display control section 103 may display the schematic curtain movement image 500 in a color that is different from those of the curtain image 412 and the lace curtain image 413 (red if the curtain image 412 is brown and the lace curtain image 413 is white, for example) and translucently on the display 101, for example. For example, the schematic curtain movement image 500 and the curtain image 412 and the lace curtain image 413 may be synthesized by alpha blending. This allows the schematic curtain movement image 500 and the curtain image 412 and the lace curtain image 413 to be distinguished from each other by color-coding. In FIGS. 29 and 30, the schematic curtain movement image 500 is indicated by dots.

Each time the positional information indicating the position of the curtain and transmitted from the electric curtain system 200 is received, the display control section 103 displays the schematic curtain movement image 500 as updated on the basis of the received positional information (the lower left diagram to the lower middle diagram of FIG. 29, the lower left diagram to the lower middle diagram of FIG. 30). For example, in the case where the positional information is received from the electric curtain system 200 every 0.1 seconds, the display control section 103 displays the schematic curtain movement image 500 as updated every 0.1 seconds.

As a result, the actual position of the curtain 221 which gradually opens and closes is represented in the schematic curtain movement image 500 on the curtain control screen 410. Then, when the position of the curtain 221 represented by the schematic curtain movement image 500 reaches the target position (the fully open position in FIG. 29, and the fully closed position in FIG. 30), the display control section 103 erases the schematic curtain movement image 500 from the curtain control screen 410 as shown in the lower right diagram of FIG. 29 and the lower right diagram of FIG. 30.

The schematic curtain movement image 500 between the state in which the curtain is fully closed and the lower left diagram of FIG. 29, the schematic curtain movement image 500 between the lower left diagram and the lower middle diagram of FIG. 29, and the schematic curtain movement image 500 between the lower middle diagram and the lower right diagram of FIG. 29 are not shown. In addition, the schematic curtain movement image 500 between the state in which the curtain is fully open and the lower left diagram of FIG. 30, the schematic curtain movement image 500 between the lower left diagram and the lower middle diagram of FIG. 30, and the schematic curtain movement image 500 between the lower middle diagram and the lower right diagram of FIG. 30 are not shown.

In the embodiment of FIGS. 29 and 30, as has been described above, the display control section 103 displays the schematic curtain movement image 500 representing the actual position of the end portion of the curtain 221 on the curtain control screen 410. Thus, the user can confirm the actual position of the curtain 221 without going to see the curtain. In addition, the display control section 103 displays the curtain image 412 representing the target position for opening and closing of the curtain on the curtain control screen 410 in addition to the schematic curtain movement image 500. Thus, the user can easily understand the difference between the target position and the current position of the curtain 221.

The display control section 103 may display a schematic lace curtain movement image representing the actual position of the lace curtain 222 on the curtain control screen 410 exactly as with the schematic curtain movement image 500. In the embodiment shown in FIGS. 29 and 30, the schematic curtain movement image 500 corresponds to an example of the state information representing the position of the end portion of the curtain of the electric curtain device.

The mode of representation of the actual position of the end portion of the curtain 221 on the curtain control screen 410 is not limited to the schematic curtain movement image 500. Another display example in which the actual position of the end portion of the curtain 221 is represented on the curtain control screen 410 will be described below.

FIG. 31 is a diagram showing a display example of the curtain control screen 410 which is different from FIG. 29 and in which the actual position of the curtain is displayed when opening the curtain 221. FIG. 32 is a diagram showing a display example of the curtain control screen 410 which is different from FIG. 30 and in which the actual position of the curtain is displayed when closing the curtain 221. The upper left diagram, the upper middle diagram, and the upper right diagram of FIG. 31 are the same as the upper left diagram, the upper middle diagram, and the upper right diagram, respectively, of FIG. 29. In addition, the upper left diagram, the upper middle diagram, and the upper right diagram of FIG. 32 are the same as the upper left diagram, the upper middle diagram, and the upper right diagram, respectively, of FIG. 30.

In the embodiment of FIGS. 31 and 32, as in the embodiment of FIGS. 29 and 30, the display control section 103 of the operation terminal 100 receives the positional information indicating the position of the curtain 221 and transmitted from the electric curtain system 200 via the communication control section 106. The display control section 103 displays a position display mark 501 (the lower left diagram of FIG. 31) and a position display mark 502 (the lower left diagram of FIG. 32) representing the actual position of the end portion of the curtain 221 as overlapped on the curtain image 412 and the lace curtain image 413 on the curtain control screen 410 on the basis of the received positional information.

As shown in the lower left diagram of FIG. 31, the position display mark 501 for a case where the curtain 221 is opened is constituted of an arrow extending leftward and rightward from the center of the curtain control screen 410. In FIG. 31, the position of a left end portion 501L of the position display mark 501 corresponds to the actual position of the end portion of the left curtain 221 moving in the opening direction. In addition, the position of a right end portion 501R of the position display mark 501 corresponds to the actual position of the end portion of the right curtain 221 moving in the opening direction.

As shown in the lower left diagram of FIG. 32, the position display mark 502 for a case where the curtain 221 is closed is constituted of an arrow extending rightward from the left end of the curtain control screen 410 and an arrow extending leftward from the right end of the curtain control screen 410. In FIG. 32, the position of an end portion 502L of the left arrow of the position display mark 502 corresponds to the actual position of the end portion of the left curtain 221 moving in the closing direction. In addition, the position of an end portion 502R of the right arrow of the position display mark 502 corresponds to the actual position of the end portion of the right curtain 221 moving in the closing direction.

Each time the positional information indicating the position of the curtain and transmitted from the electric curtain system 200 is received, the display control section 103 displays the position display mark 501 (the lower left diagram to the lower middle diagram of FIG. 31) and the position display mark 502 (the lower left diagram to the lower middle diagram of FIG. 32) as updated on the basis of the received positional information. For example, in the case where the positional information is received from the electric curtain system 200 every 0.1 seconds, the display control section 103 displays the position display marks 501 and 502 as updated every 0.1 seconds.

As a result, the actual position of the curtain 221 which gradually opens and closes is represented by the position display marks 501 and 502 on the curtain control screen 410. Then, when the position of the curtain 221 represented by the position display marks 501 and 502 reaches the target position (the fully open position in FIG. 31, and the fully closed position in FIG. 32), the display control section 103 erases the position display marks 501 and 502 from the curtain control screen 410 as shown in the lower right diagram of FIG. 31 and the lower right diagram of FIG. 32.

The position display mark 501 between the state in which the curtain is fully closed and the lower left diagram of FIG. 31, the position display mark 501 between the lower left diagram and the lower middle diagram of FIG. 31, and the position display mark 501 between the lower middle diagram and the lower right diagram of FIG. 31 are not shown. In addition, the position display mark 502 between the state in which the curtain is fully open and the lower left diagram of FIG. 32, the position display mark 502 between the lower left diagram and the lower middle diagram of FIG. 32, and the position display mark 502 between the lower middle diagram and the lower right diagram of FIG. 32 are not shown.

The display control section 103 may display a position display mark representing the actual position of the lace curtain 222 on the curtain control screen 410 exactly as with the position display marks 501 and 502. In the embodiment shown in FIGS. 31 and 32, the position display marks 501 and 502 correspond to an example of the state information representing the position of the end portion of the curtain of the electric curtain device.

Figure 33:
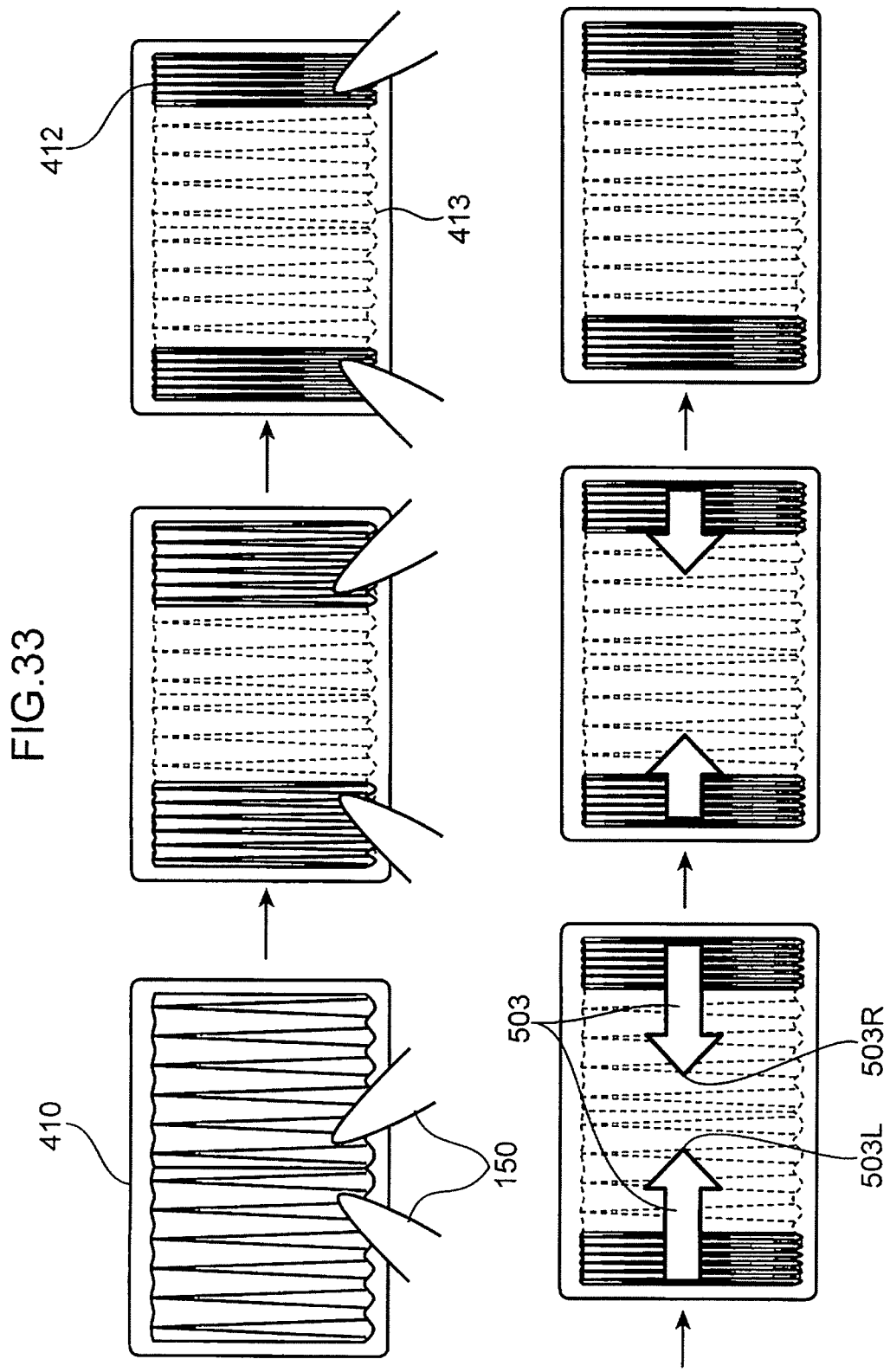
FIG. 33 is a diagram showing a display example of the curtain control screen which is different from FIGS. 29 and 31 and in which the actual position of the curtain is displayed when opening the curtain.

FIG. 33 is a diagram showing a display example of the curtain control screen 410 which is different from FIGS. 29 and 31 and in which the actual position of the curtain is displayed when opening the curtain 221. In the embodiment of FIG. 33, the display control section 103 displays a position display mark 503 representing the actual position of the end portion of the curtain 221 as overlapped on the curtain image 412 and the lace curtain image 413 on the curtain control screen 410 as shown in the lower left diagram of FIG. 33 on the basis of the received positional information.

As shown in the lower left diagram of FIG. 33, the position display mark 503 is constituted of an arrow extending rightward from the left end of the curtain control screen 410 and an arrow extending leftward from the right end of the curtain control screen 410. In FIG. 33, the position of an end portion 503L of the left arrow of the position display mark 503 corresponds to the actual position of the end portion of the left curtain 221 moving in the opening direction. In addition, the position of an end portion 503R of the right arrow of the position display mark 503 corresponds to the actual position of the end portion of the right curtain 221 moving in the opening direction.

As seen when compared with the schematic curtain movement image 500 of FIG. 29, the lengths of the left and right arrows of the position display mark 503 of FIG. 33 correspond to the actual widths of the left and right curtains 221, respectively. As the actual curtain 221 is opened, the display control section 103 gradually reduces the lengths of the arrows of the position display mark 503 (the lower left diagram to the lower middle diagram of FIG. 33). When the curtain 221 becomes fully open, the display control section 103 erases the position display mark 503 (the lower right diagram of FIG. 33).

The position display mark 503 between the state in which the curtain is fully closed and the lower left diagram of FIG. 33, the position display mark 503 between the lower left diagram and the lower middle diagram of FIG. 33, and the position display mark 503 between the lower middle diagram and the lower right diagram of FIG. 33 are not shown.

The position display mark 503 displayed on the curtain control screen 410 when closing the curtain 221 is not shown. However, also when closing the curtain 221, as in FIG. 33, the position display mark 503 may be constituted of an arrow extending rightward from the left end of the curtain control screen 410 and an arrow extending leftward from the right end of the curtain control screen 410. Also in this case, the lengths of the left and right arrows of the position display mark 503 correspond to the actual widths of the left and right curtains 221, respectively.

As the actual curtain 221 is closed, the display control section 103 gradually increases the lengths of the arrows of the position display mark. The lengths of the arrows of the position display mark becomes maximum immediately before the curtain 221 becomes fully closed. When the curtain 221 becomes fully closed, the display control section 103 erases the position display mark. The display control section 103 may display a position display mark representing the actual position of the lace curtain 222 on the curtain control screen 410 exactly as with the position display mark 503. In the embodiment shown in FIG. 33, the position display mark 503 corresponds to an example of the state information representing the position of the end portion of the curtain of the electric curtain device.

Figure 34:
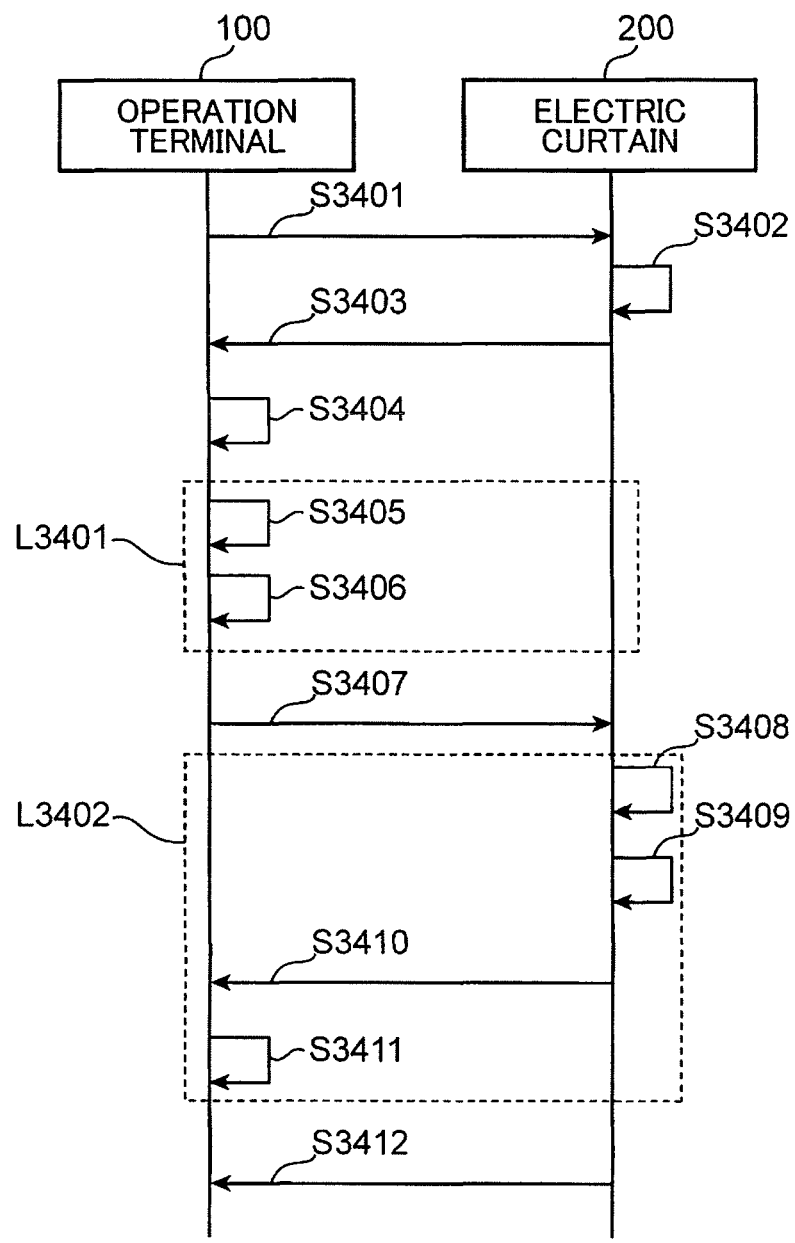
FIG. 34 is a sequence diagram showing a process flow in the operation terminal and the electric curtain system in the embodiment of FIGS. 29 to 33.

FIG. 34 is a sequence diagram showing a process flow in the operation terminal 100 and the electric curtain system 200 in the embodiment of FIGS. 29 to 33. S3401 to S3409 of FIG. 34 are the same as S1301 to S1309, respectively, of FIG. 13. L3401 of FIG. 34 is the same as L1301 of FIG. 13.

Subsequent to S3409, the communication control section 214 transmits the detected current open/close state of the curtain 221 or the lace curtain 222 (for example, the current position of the end portion on the moving side of the curtain 221 or the lace curtain 222) to the operation terminal 100 (S3410).

Next, the display control section 103 of the operation terminal 100 displays the current open/close state of the curtain 221 or the lace curtain 222 received via the communication control section 106 on the curtain control screen 410 of the display 101 (S3411). In S3411, the display control section 103 displays the schematic curtain movement image 500 in the embodiment of FIGS. 29 and 30, displays the position display marks 501 and 502 in the embodiment of FIGS. 31 and 32, and displays the position display mark 503 in the embodiment of FIG. 33.

In the operation terminal 100 and the electric curtain system 200, S3408 to S3411 included in L3402 are repeated until the open/close state of the curtain 221 or the lace curtain 222 (for example, the position of the end portion on the moving side of the curtain 221 or the lace curtain 222) reaches the target position. Thus, display of the current open/close state of the curtain 221 or the lace curtain 222 is updated each time S3411 is executed.

When the open/close state of the curtain 221 or the lace curtain 222 reaches the target position, the communication control section 214 of the electric curtain system 200 receives a request from the curtain control section 213, and transmits the result of control for the curtain 221 or the lace curtain 222 to the operation terminal 100 (S3412). The process is thus terminated.

FIGS. 35A to 35D are flowcharts showing a flow of the process (S1406 of FIG. 14) for the operation terminal 100 to generate and transmit a control command for controlling the curtain 221 and the lace curtain 222 of the electric curtain system 200 in the embodiment of FIGS. 29 to 33. The process flow in the curtain select screen 400 of FIG. 7 is performed as in FIG. 14, and the process of FIGS. 35A to 35D is executed as a sub routine (S1406) of FIG. 14.

Figure 15A:
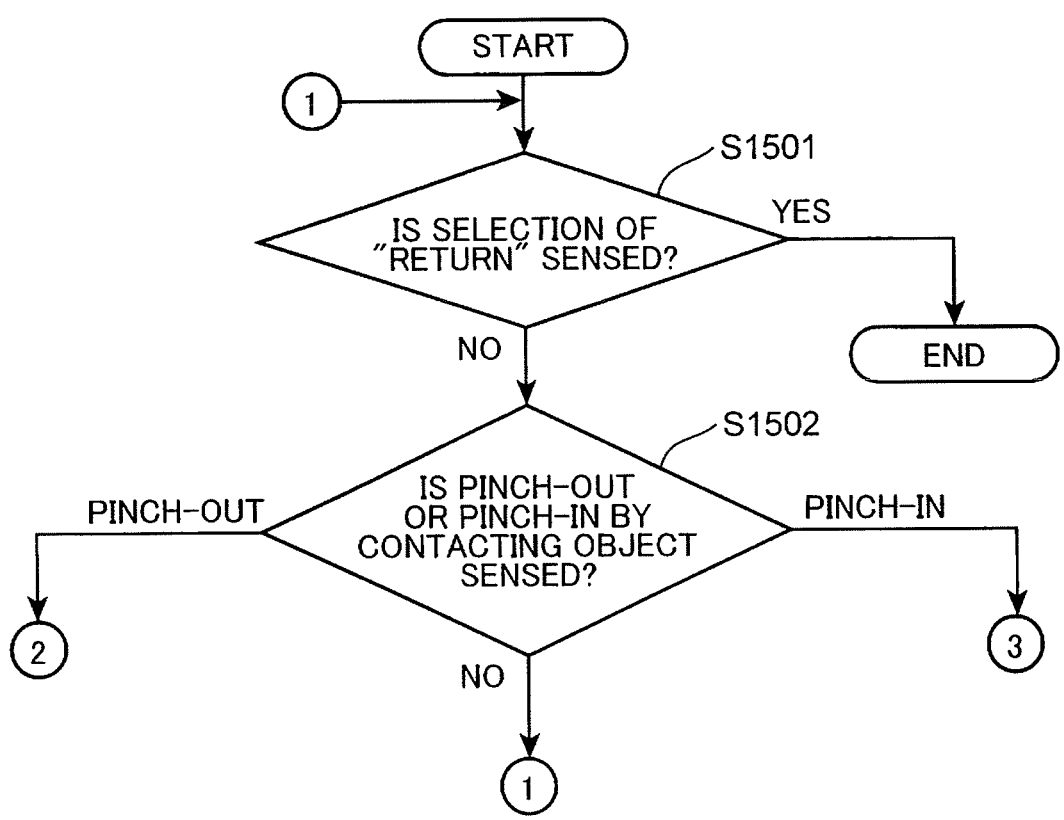
FIG. 15A is a flowchart showing a process flow for the operation terminal to generate and transmit a control command for controlling the curtain and the lace curtain of the electric curtain system.
Figure 15B:
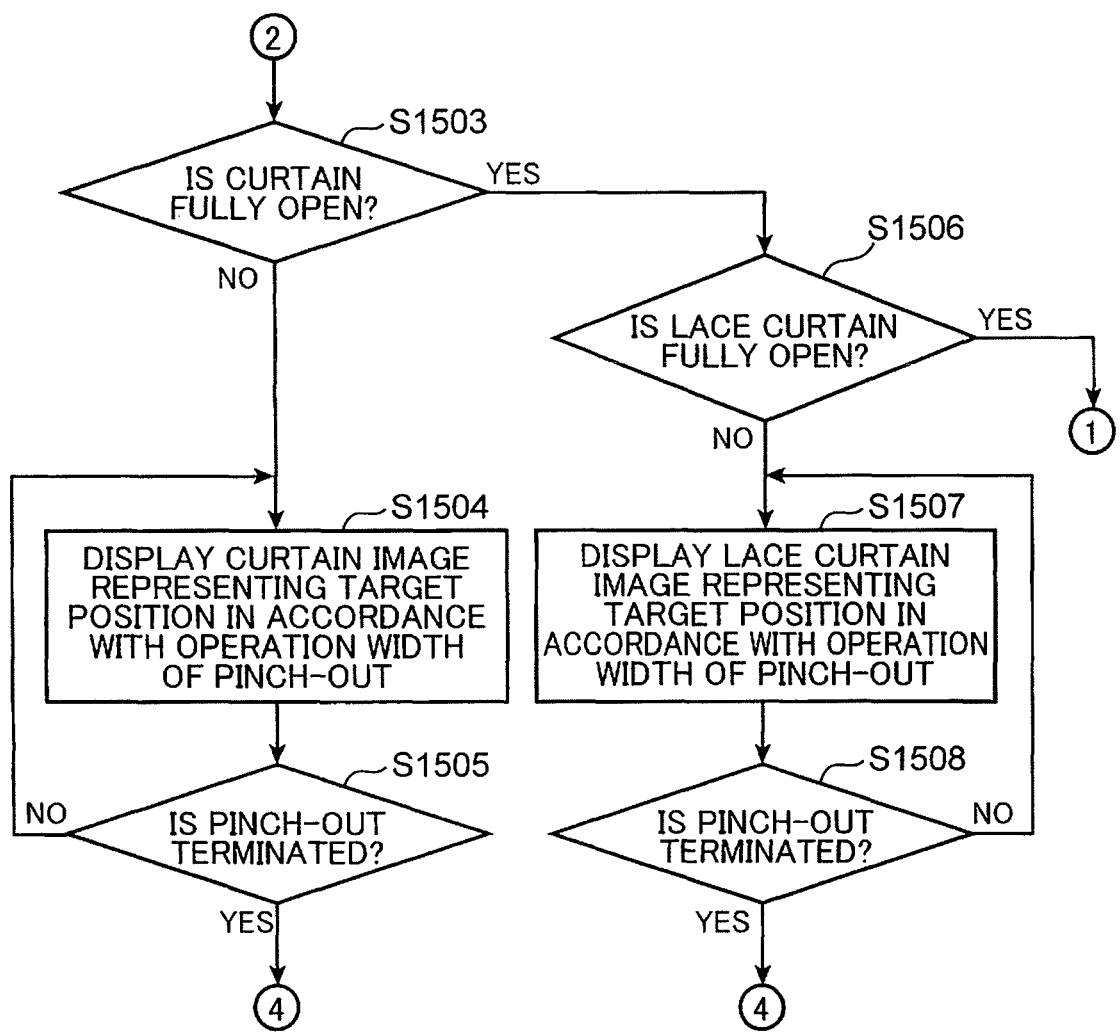
FIG. 15B is a flowchart showing a process flow for the operation terminal to generate and transmit a control command for controlling the curtain and the lace curtain of the electric curtain system.
Figure 15C:
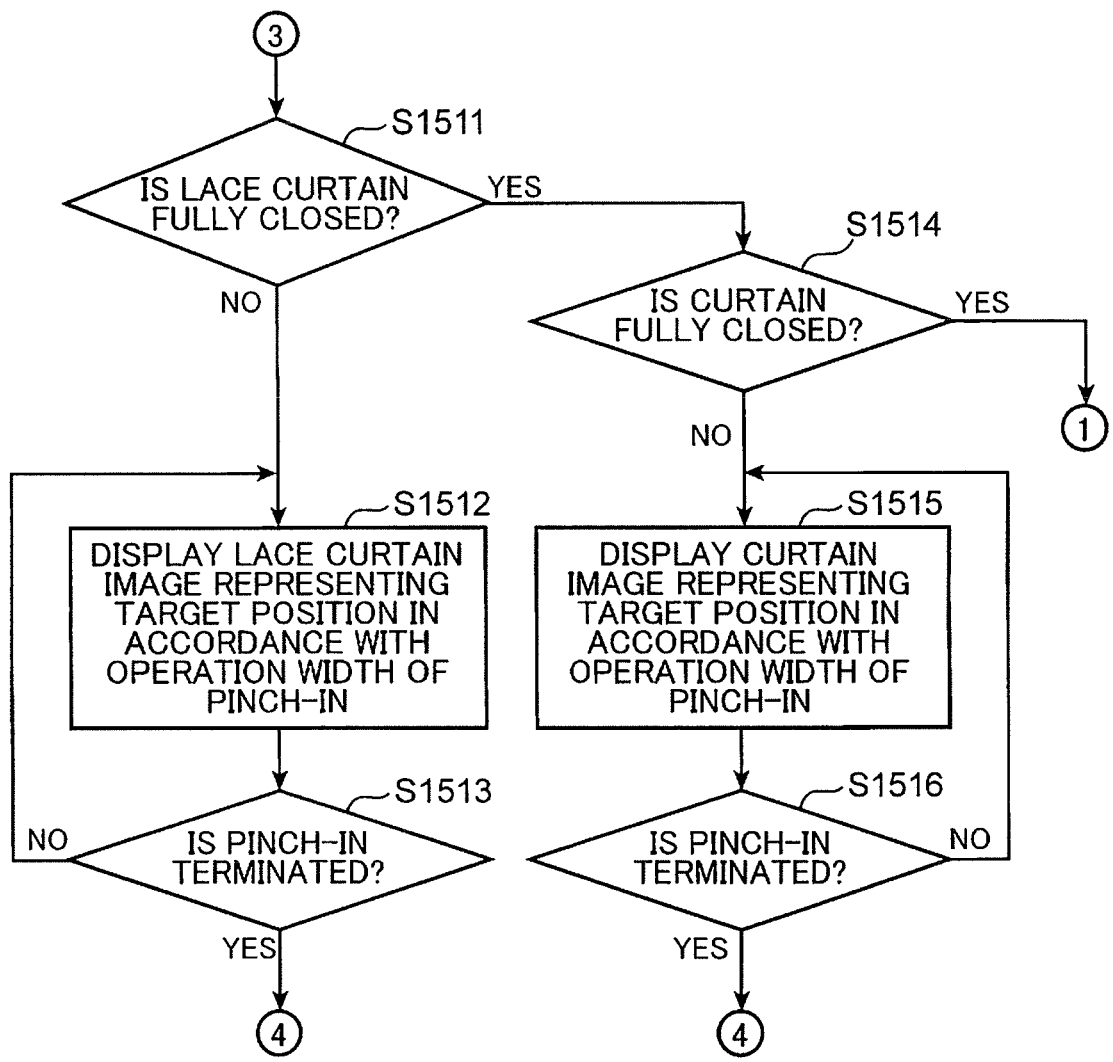
FIG. 15C is a flowchart showing a process flow for the operation terminal to generate and transmit a control command for controlling the curtain and the lace curtain of the electric curtain system.
Figure 15D:
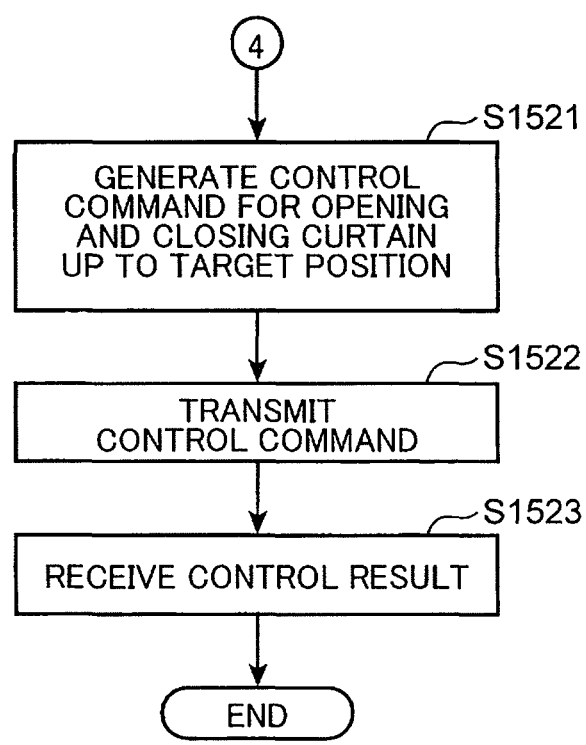
FIG. 15D is a flowchart showing a process flow for the operation terminal to generate and transmit a control command for controlling the curtain and the lace curtain of the electric curtain system.
Figure 35B:
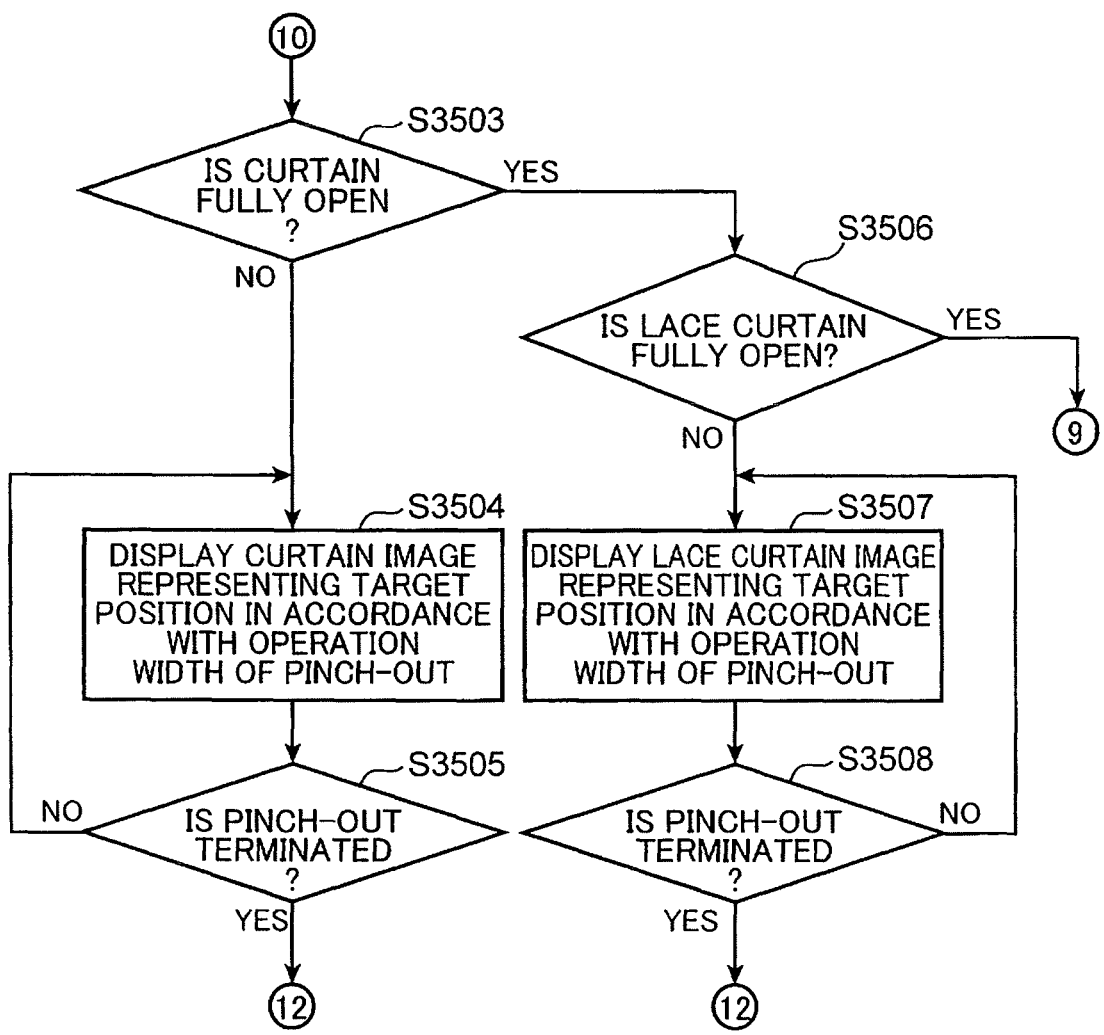
FIG. 35B is a flowchart showing a process flow for the operation terminal to generate and transmit a control command for controlling the curtain and the lace curtain of the electric curtain system in the embodiment of FIGS. 29 to 33.
Figure 35C:
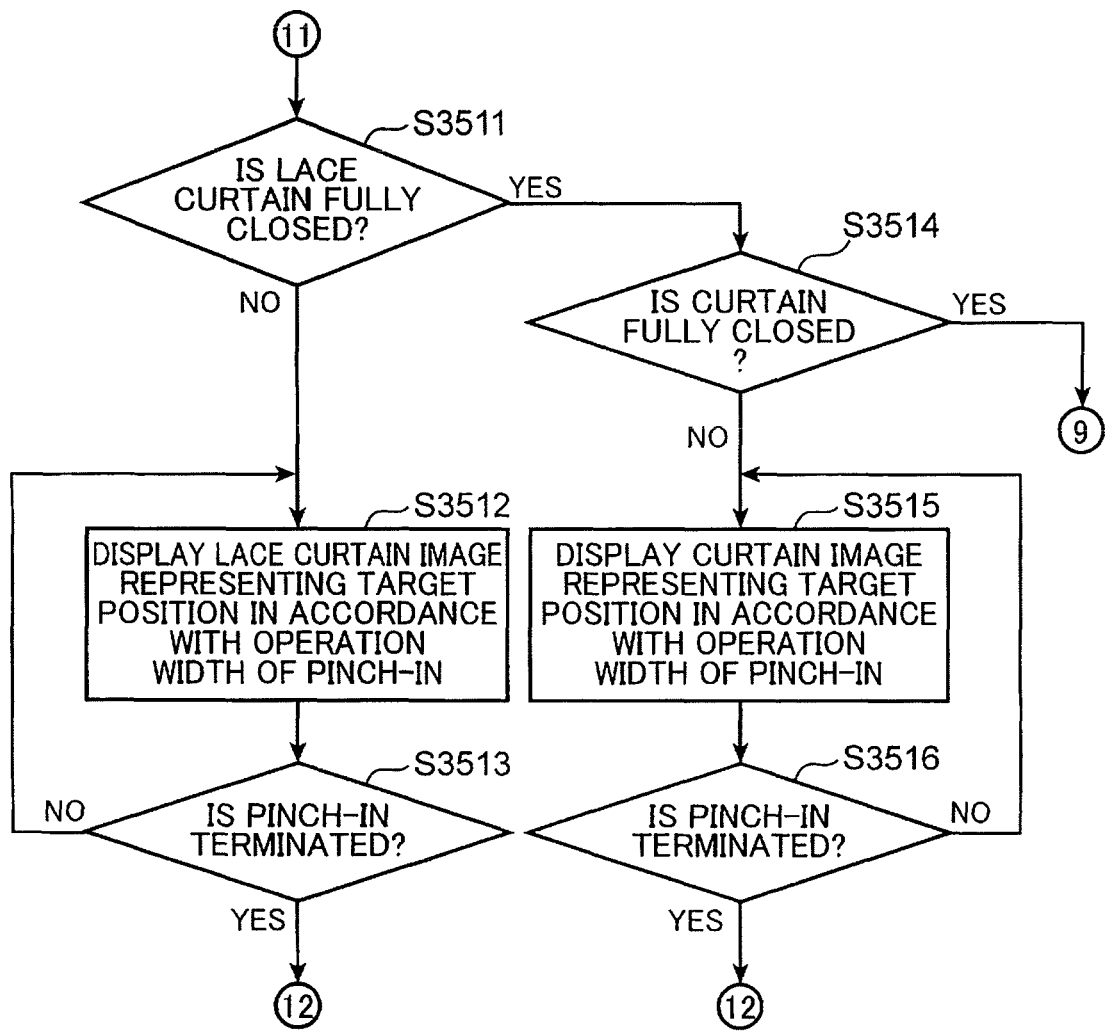
FIG. 35C is a flowchart showing a process flow for the operation terminal to generate and transmit a control command for controlling the curtain and the lace curtain of the electric curtain system in the embodiment of FIGS. 29 to 33.

S3501 to S3508 of FIGS. 35A and 35B are the same as S1501 to S1508, respectively, of FIGS. 15A and 15B. S3511 to S3516 of FIG. 35C are the same as S1511 to S1516, respectively, of FIG. 15C. S3521 and S3522 of FIG. 35D are the same as S1521 and S1522, respectively, of FIG. 15D.

Figure 35D:
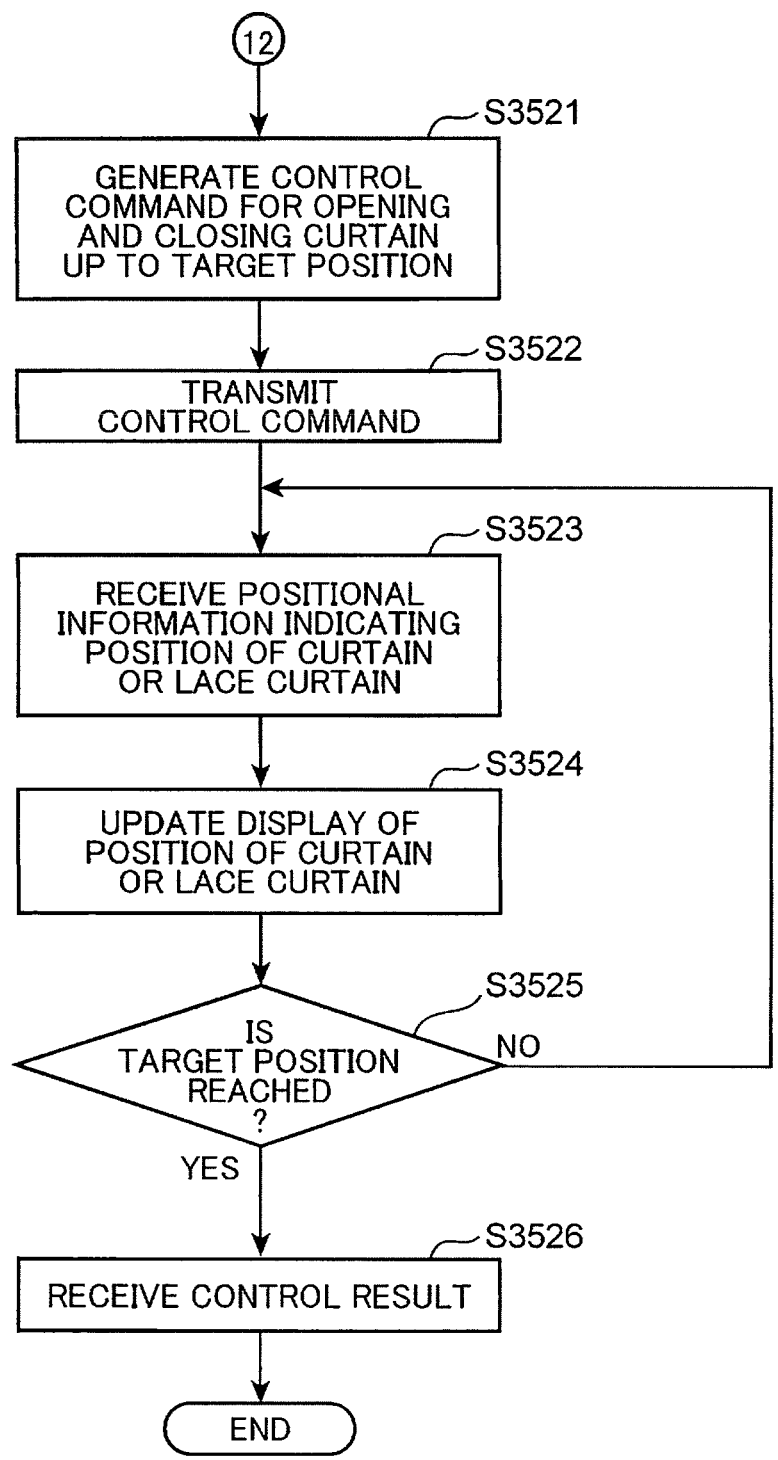
FIG. 35D is a flowchart showing a process flow for the operation terminal to generate and transmit a control command for controlling the curtain and the lace curtain of the electric curtain system in the embodiment of FIGS. 29 to 33.

In FIG. 35D, subsequent to S3522, the communication control section 106 receives positional information indicating the position of the curtain 221 or the lace curtain 222, and delivers the received positional information to the display control section 103 and the curtain control section 105 (S3523). Then, the display control section 103 displays the position of the curtain 221 or the lace curtain 222 on the basis of the received positional information (S3524). In S3524, the display control section 103 displays the schematic curtain movement image 500 in the embodiment of FIGS. 29 and 30, displays the position display marks 501 and 502 in the embodiment of FIGS. 31 and 32, and displays the position display mark 503 in the embodiment of FIG. 33.

Then, the curtain control section 105 judges, on the basis of the positional information received in S3523, whether or not the curtain 221 or the lace curtain 222 has reached the target position (S3525). If the curtain 221 or the lace curtain 222 has not reached the target position in S3525 (NO in S3525), the process returns to S3523. If the curtain 221 or the lace curtain 222 has reached the target position in S3525 (YES in S3525), on the other hand, the communication control section 106 receives the control result transmitted from the electric curtain system 200, and delivers the received control result to the curtain control section 105 (S3526). The flow is thus terminated.

Thus, S3524 is executed until the curtain 221 or the lace curtain 222 reaches the target position. As a result, the position of the curtain 221 or the lace curtain 222 displayed on the curtain control screen 410 of the display 101 is updated each time S3524 is executed (for example, at intervals of 0.1 seconds).

Figure 36:
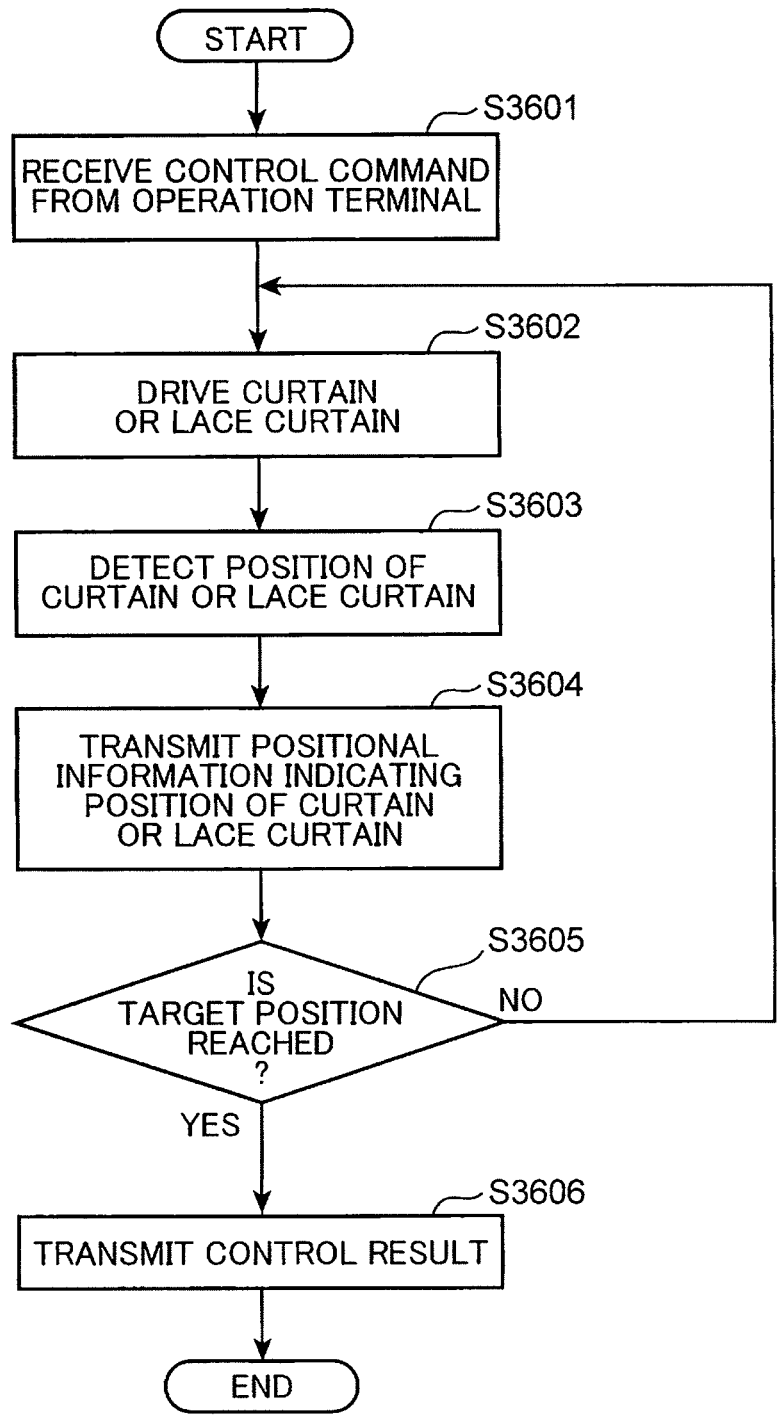
FIG. 36 is a flowchart showing a process flow in the electric curtain system in the embodiment of FIGS. 29 to 33.

FIG. 36 is a flowchart showing a process flow in the electric curtain system 200 in the embodiment of FIGS. 29 to 33. S3601 to S3603 of FIG. 36 are the same as S1601 to S1603, respectively, of FIG. 16. Subsequent to S3603, the curtain control section 213 generates positional information indicating the position of the curtain 221 or the lace curtain 222 on the basis of the result of detection of the open/close state (position) of the curtain 221 or the lace curtain 222, and the communication control section 214 transmits the generated positional information to the operation terminal 100 (S3604). S3605 and S3606 which follow S3604 are the same as S1604 and S1605, respectively, of FIG. 16.

Thus, S3604 is executed until the curtain 221 or the lace curtain 222 reaches the target position. As a result, the positional information indicating the position of the curtain 221 or the lace curtain 222 is transmitted to the operation terminal 100 each time S3604 is executed (for example, at intervals of 0.1 seconds).

Figure 37:
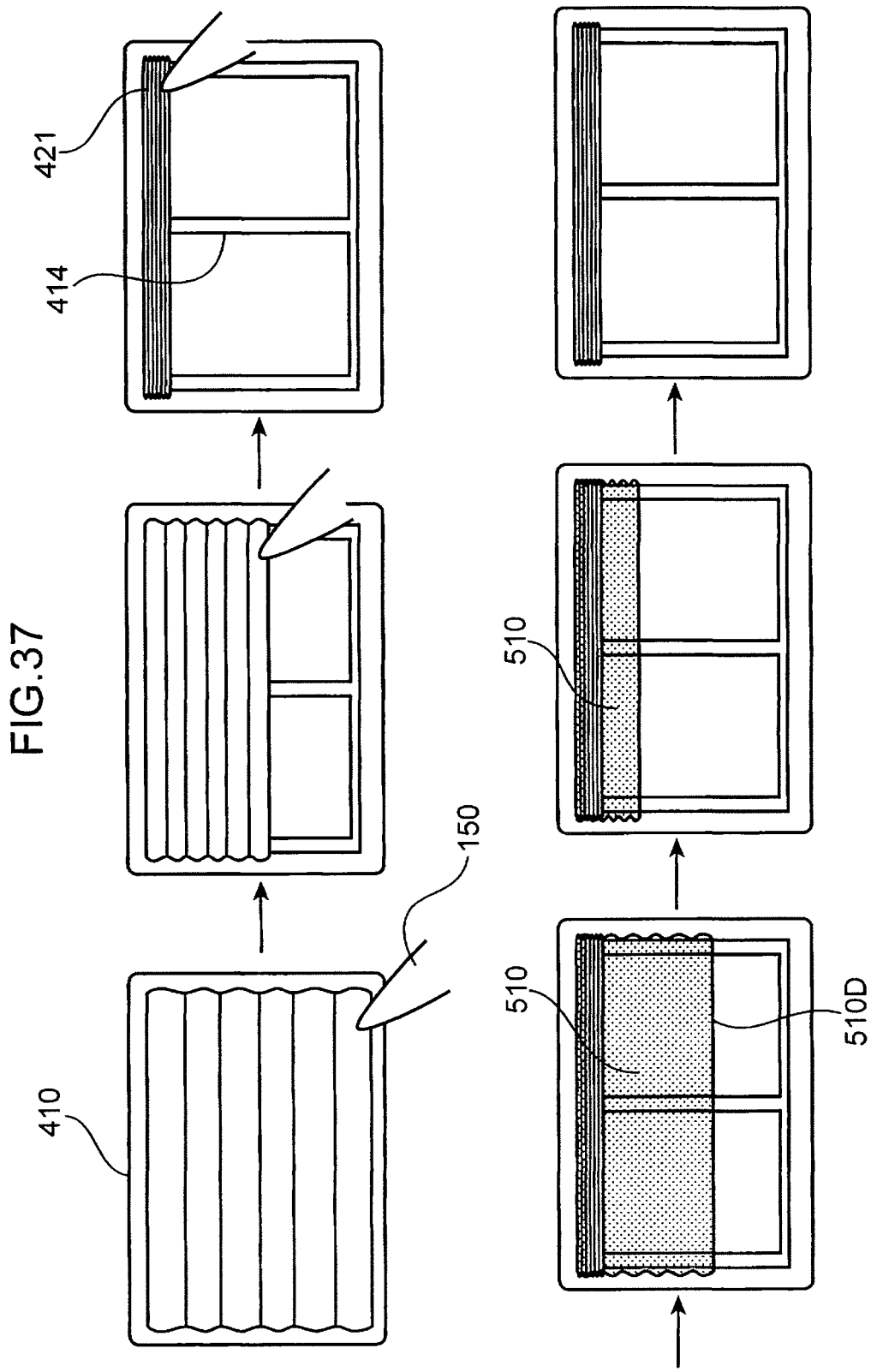
FIG. 37 is a diagram showing a display example of the curtain control screen in which the actual position of the shade curtain is displayed when opening the shade curtain.
Figure 38:
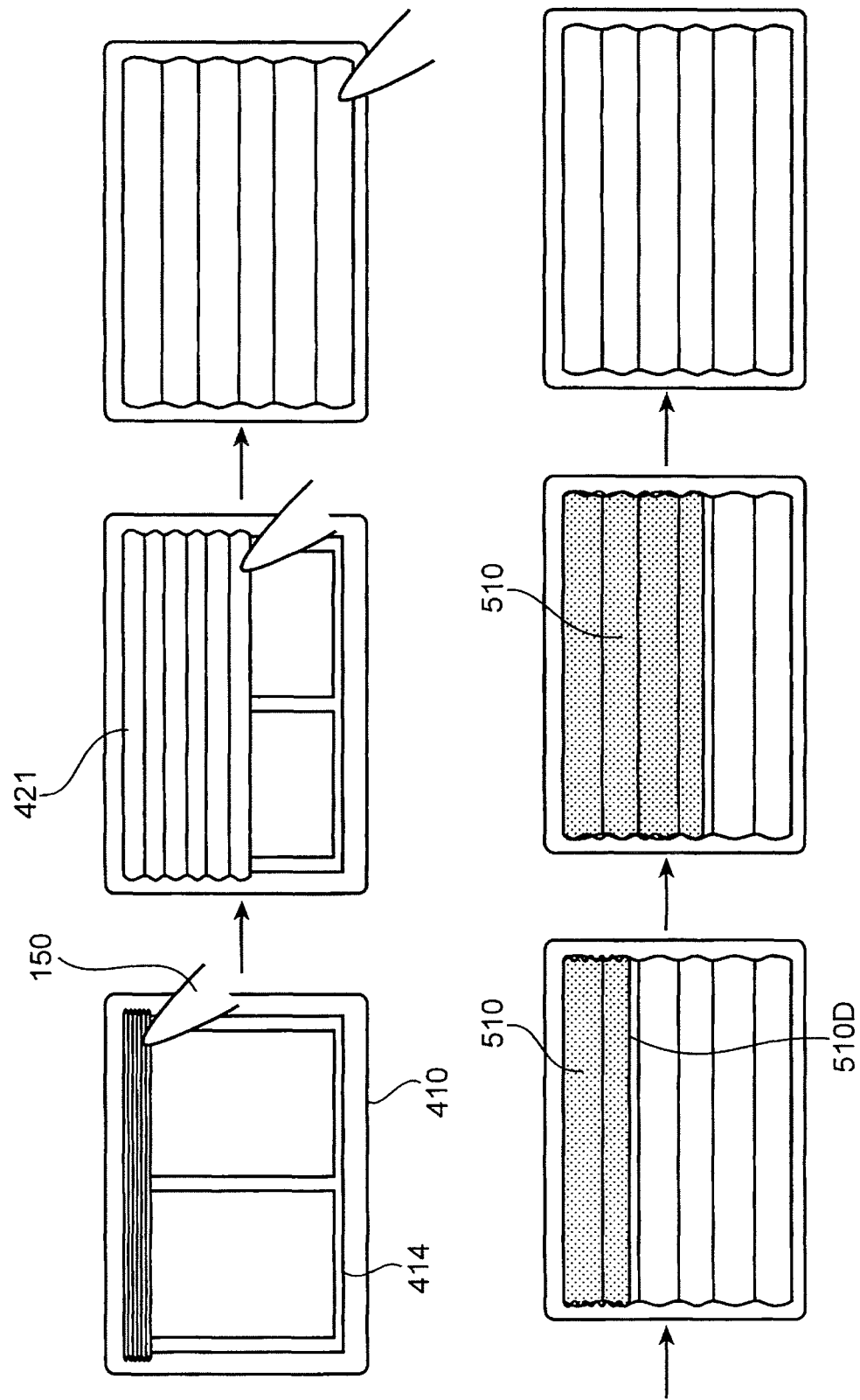
FIG. 38 is a diagram showing a display example of the curtain control screen in which the actual position of the shade curtain is displayed when closing the shade curtain.

FIG. 37 is a diagram showing a display example of the curtain control screen 410 in which the actual position of the shade curtain is displayed when opening the shade curtain. FIG. 38 is a diagram showing a display example of the curtain control screen 410 in which the actual position of the shade curtain is displayed when closing the shade curtain.

As described above, the curtain control section 105 of the operation terminal 100 decides the target position for opening and closing of the shade curtain on the basis of the amount of movement of the swipe operation by the contacting object 150 (for example, one finger of the user).

When the user finishes the upward swipe operation in the state shown in the upper middle diagram of FIG. 37, for example, the curtain control section 105 decides the target position for opening and closing of the shade curtain as a position at which the shade curtain is half open. In this case, the display control section 103 displays the curtain image 421 representing a half-open shade curtain as shown in the upper middle diagram of FIG. 37. Display of the curtain image 421 allows the user to easily understand the target position for opening and closing of the shade curtain.

When the user finishes the upward swipe operation in the state shown in the upper right diagram of FIG. 37, for example, the curtain control section 105 decides the target position for opening and closing of the shade curtain as a position at which the shade curtain is fully open. In this case, the display control section 103 displays the curtain image 421 representing a fully open shade curtain as shown in the upper right diagram of FIG. 37.

When the user finishes the downward swipe operation in the state shown in the upper middle diagram of FIG. 38, for example, the curtain control section 105 decides the target position for opening and closing of the shade curtain as a position at which the shade curtain is half open. In this case, the display control section 103 displays the curtain image 421 representing a half-open shade curtain as shown in the upper middle diagram of FIG. 38.

When the user finishes the downward swipe operation in the state shown in the upper right diagram of FIG. 38, for example, the curtain control section 105 decides the target position for opening and closing of the shade curtain as a position at which the shade curtain is fully closed. In this case, the display control section 103 displays the curtain image 421 representing a fully closed shade curtain as shown in the upper right diagram of FIG. 38.

Control performed after the target position is decided is the same as that described above. Operation of opening the shade curtain is started in FIG. 37, and operation of closing the shade curtain is started in FIG. 38. At this time, actual motion of the shade curtain is slower than motion of the curtain image 421 displayed on the curtain control screen 410. Thus, in the embodiment of FIGS. 37 and 38, as in the embodiment of FIGS. 29 and 30, the display control section 103 displays the schematic curtain movement image 510 representing the actual position of an end portion of the shade curtain on the curtain control screen 410.

In FIG. 37, the position of a lower end 510D of the schematic shade curtain movement image 510 corresponds to the actual position of the end portion of the shade curtain moving in the opening direction. In FIG. 38, the position of the lower end 510D of the schematic shade curtain movement image 510 corresponds to the actual position of the end portion of the shade curtain moving in the closing direction.

The display control section 103 may display the schematic shade curtain movement image 510 in a color that is different from that of the curtain image 421 (red if the curtain image 421 is brown, for example) and translucently on the display 101, for example. For example, the schematic shade curtain movement image 510 and the curtain image 421 may be synthesized by alpha blending. This allows the schematic shade curtain movement image 510 and the curtain image 421 to be distinguished from each other by color-coding. In FIGS. 37 and 38, the schematic shade curtain movement image 510 is indicated by dots.

Each time the positional information indicating the position of the shade curtain and transmitted from the electric curtain system 200 is received, the display control section 103 displays the schematic shade curtain movement image 510 as updated on the basis of the received positional information. Consequently, in FIG. 37, the position of the lower end 510D of the schematic shade curtain movement image 510 is raised corresponding to the actual position of the end portion of the shade curtain moving in the opening direction (the lower left diagram to the lower middle diagram of FIG. 37). In FIG. 38, meanwhile, the position of the lower end 510D of the schematic shade curtain movement image 510 is lowered corresponding to the actual position of the end portion of the shade curtain moving in the closing direction (the lower left diagram to the lower center diagram of FIG. 38).

As a result, the actual position of the shade curtain which gradually opens and closes is represented in the schematic shade curtain movement image 510 on the curtain control screen 410. Then, when the position of the shade curtain represented by the schematic shade curtain movement image 510 reaches the target position (the fully open position in FIG. 37, and the fully closed position in FIG. 38), the display control section 103 erases the schematic shade curtain movement image 510 from the curtain control screen 410 as shown in the lower right diagram of FIG. 37 and the lower right diagram of FIG. 38.

The schematic shade curtain movement image 510 between the state in which the shade curtain is fully closed and the lower left diagram of FIG. 37, the schematic shade curtain movement image 510 between the lower left diagram and the lower middle diagram of FIG. 37, and the schematic shade curtain movement image 510 between the lower middle diagram and the lower right diagram of FIG. 37 are not shown. In addition, the schematic shade curtain movement image 510 between the state in which the shade curtain is fully open and the lower left diagram of FIG. 38, the schematic shade curtain movement image 510 between the lower left diagram and the lower middle diagram of FIG. 38, and the schematic shade curtain movement image 510 between the lower middle diagram and the lower right diagram of FIG. 38 are not shown.

The display control section 103 may display a schematic shade lace curtain movement image representing the actual position of the shade lace curtain on the curtain control screen 410 exactly as with the schematic shade curtain movement image 510. In the embodiment shown in FIGS. 37 and 38, the schematic shade curtain movement image 510 corresponds to an example of the state information representing the position of the end portion of the curtain of the electric curtain device.

FIG. 39 is a diagram showing a display example of the curtain control screen 410 which is different from FIG. 37 and in which the actual position of the shade curtain is displayed when opening the shade curtain. FIG. 40 is a diagram showing a display example of the curtain control screen 410 which is different from FIG. 38 and in which the actual position of the shade curtain is displayed when closing the shade curtain. The upper left diagram, the upper middle diagram, and the upper right diagram of FIG. 39 are the same as the upper left diagram, the upper middle diagram, and the upper right diagram, respectively, of FIG. 37. In addition, the upper left diagram, the upper middle diagram, and the upper right diagram of FIG. 40 are the same as the upper left diagram, the upper middle diagram, and the upper right diagram, respectively, of FIG. 38.

In the embodiment of FIGS. 39 and 40, as in the embodiment of FIGS. 37 and 38, the display control section 103 of the operation terminal 100 receives the positional information indicating the position of the shade curtain and transmitted from the electric curtain system 200 via the communication control section 106. The display control section 103 displays a position display mark 511 (the lower left diagram of FIG. 39) and a position display mark 512 (the lower left diagram of FIG. 40) representing the actual position of the end portion of the shade curtain as overlapped on the curtain image 421 on the curtain control screen 410 on the basis of the received positional information.

As shown in the lower left diagram of FIG. 39, the position display mark 511 for a case where the shade curtain is opened is constituted of an arrow extending upward from the lower end of the curtain control screen 410. In FIG. 39, the position of an upper end 511U of the position display mark 511 corresponds to the actual position of the end portion of the curtain moving in the opening direction.

As shown in the lower left diagram of FIG. 40, the position display mark 512 for a case where the shade curtain is closed is constituted of an arrow extending downward from the upper end of the curtain control screen 410. In FIG. 40, the position of a lower end 512D of the position display mark 512 corresponds to the actual position of the end portion of the shade curtain moving in the closing direction.

Each time the positional information indicating the position of the curtain and transmitted from the electric curtain system 200 is received, the display control section 103 displays the position display mark 511 (the lower left diagram to the lower middle diagram of FIG. 39) and the position display mark 512 (the lower left diagram to the lower middle diagram of FIG. 40) as updated on the basis of the received positional information. For example, in the case where the positional information is received from the electric curtain system 200 every 0.1 seconds, the display control section 103 displays the position display marks 511 and 512 as updated every 0.1 seconds.

As a result, the actual position of the shade curtain which gradually opens and closes is represented by the position display marks 511 and 512 on the curtain control screen 410. Then, when the position of the shade curtain represented by the position display marks 511 and 512 reaches the target position (the fully open position in FIG. 39, and the fully closed position in FIG. 40), the display control section 103 erases the position display marks 511 and 512 from the curtain control screen 410 as shown in the lower right diagram of FIG. 39 and the lower right diagram of FIG. 40.

The position display mark 511 between the state in which the shade curtain is fully closed and the lower left diagram of FIG. 39, the position display mark 511 between the lower left diagram and the lower middle diagram of FIG. 39, and the position display mark 511 between the lower middle diagram and the lower right diagram of FIG. 39 are not shown. In addition, the position display mark 512 between the state in which the shade curtain is fully open and the lower left diagram of FIG. 40, the position display mark 512 between the lower left diagram and the lower middle diagram of FIG. 40, and the position display mark 512 between the lower middle diagram and the lower right diagram of FIG. 40 are not shown.

The display control section 103 may display a position display mark representing the actual position of the shade lace curtain on the curtain control screen 410 exactly as with the position display marks 511 and 512. In the embodiment shown in FIGS. 39 and 40, the position display marks 511 and 512 correspond to an example of the state information representing the position of the end portion of the curtain of the electric curtain device.

FIGS. 41A to 41D are flowcharts showing a flow of the process (S1406 of FIG. 14) for the operation terminal 100 to generate and transmit a control command for controlling the shade curtain of the electric curtain system 201 in the embodiment of FIGS. 37 to 40. The process flow in the curtain select screen 400 of FIG. 7 is performed as in FIG. 14, and the process of FIGS. 41A to 41D is executed as a sub routine (S1406) of FIG. 14.

Figure 20A:
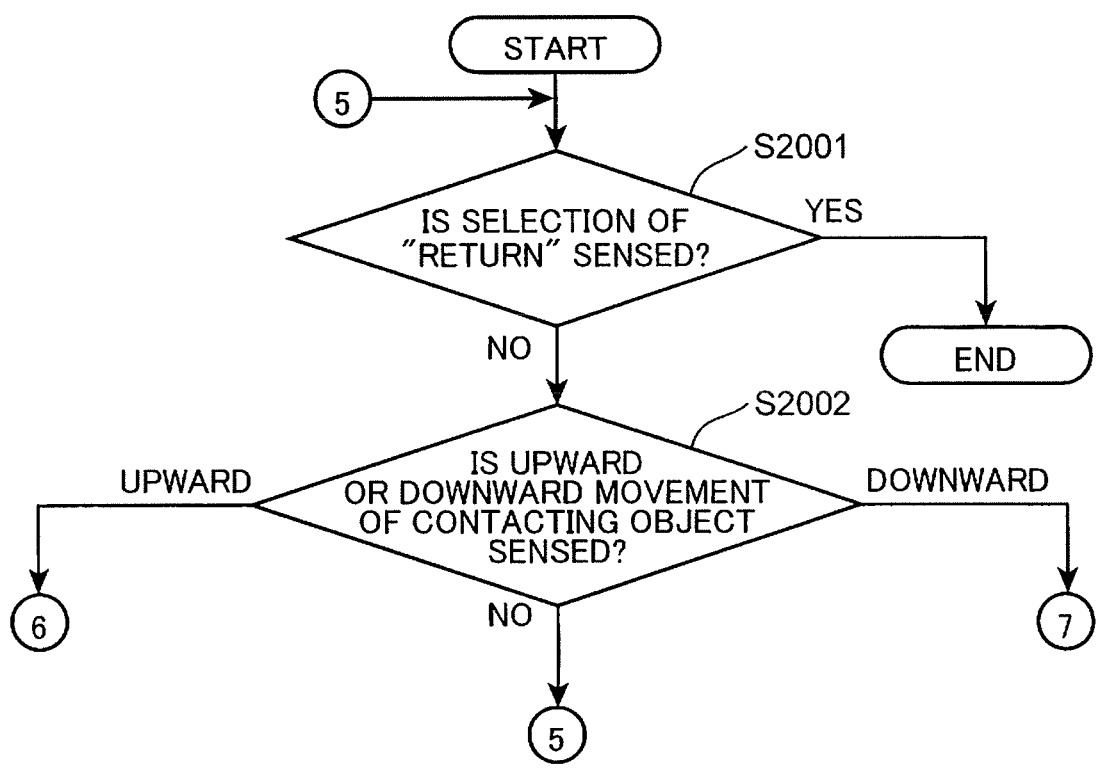
FIG. 20A is a flowchart showing a process flow for the operation terminal to generate and transmit a control command for controlling the shade curtain and a shade lace curtain of the electric curtain system.
Figure 20B:
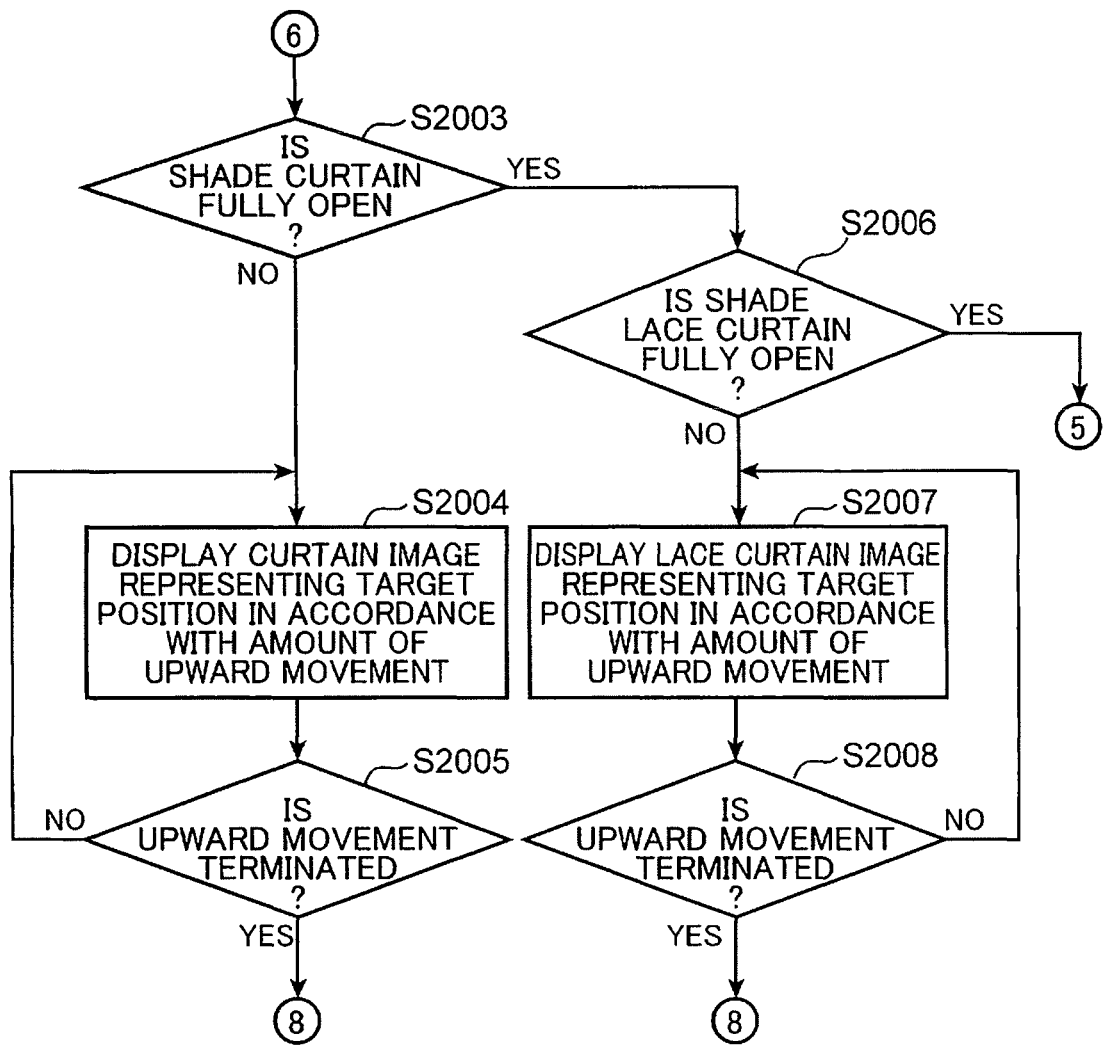
FIG. 20B is a flowchart showing a process flow for the operation terminal to generate and transmit a control command for controlling the shade curtain and the shade lace curtain of the electric curtain system.
Figure 20C:
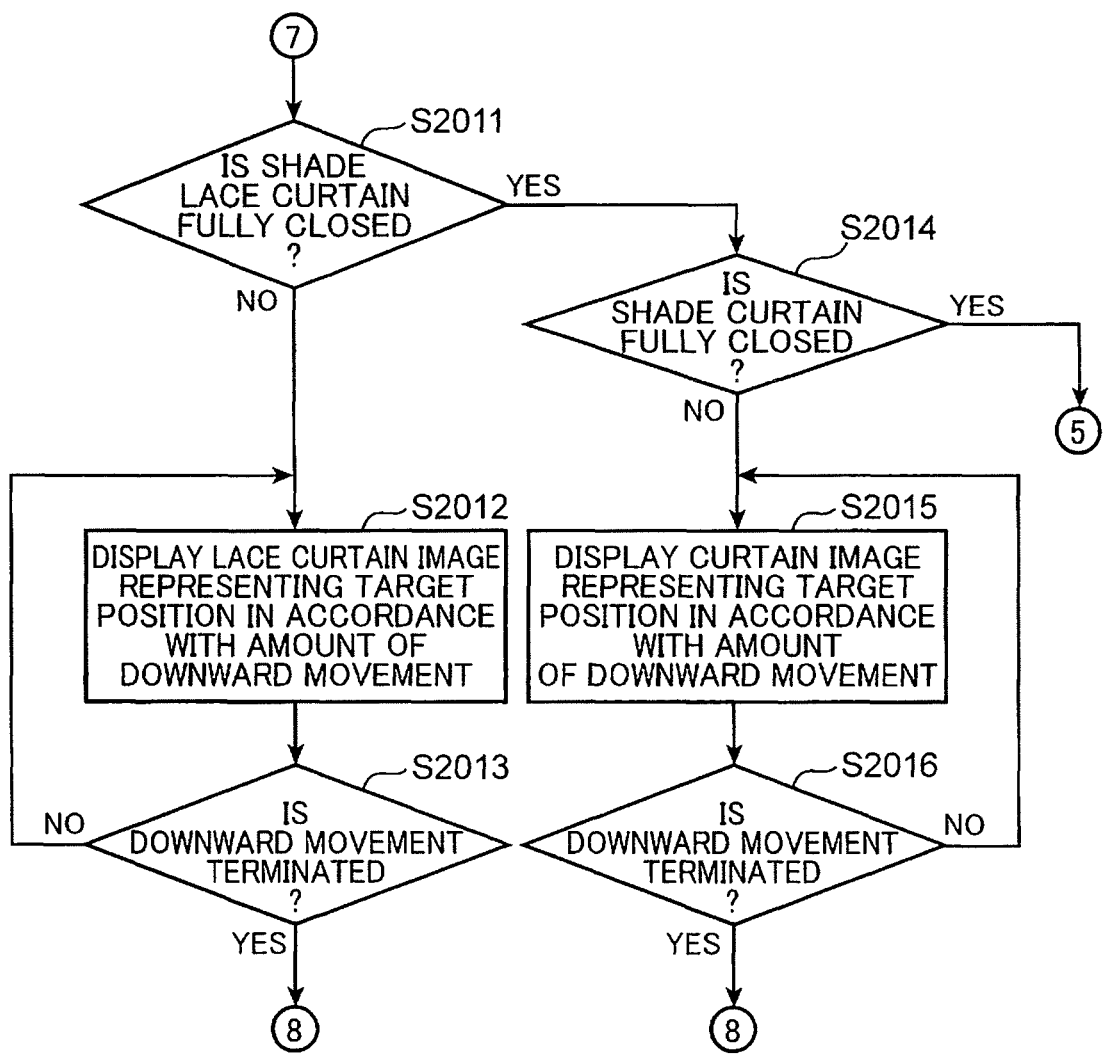
FIG. 20C is a flowchart showing a process flow for the operation terminal to generate and transmit a control command for controlling the shade curtain and the shade lace curtain of the electric curtain system.
Figure 20D:
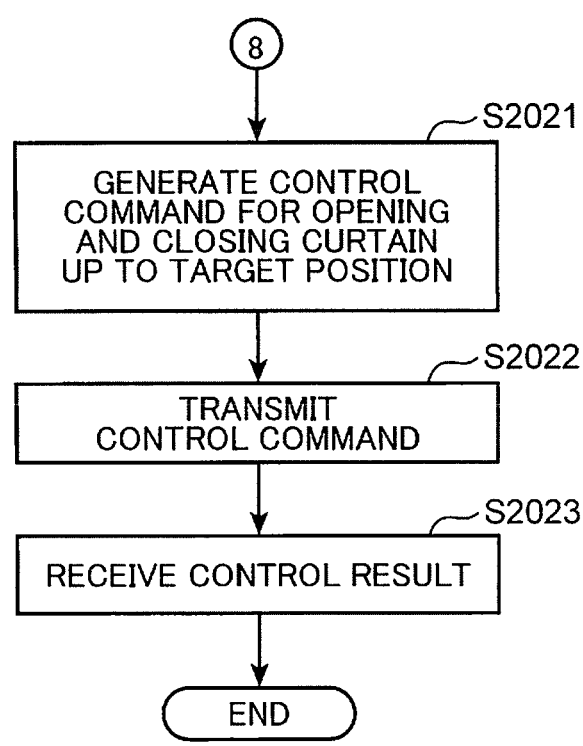
FIG. 20D is a flowchart showing a process flow for the operation terminal to generate and transmit a control command for controlling the shade curtain and the shade lace curtain of the electric curtain system.
Figure 41A:
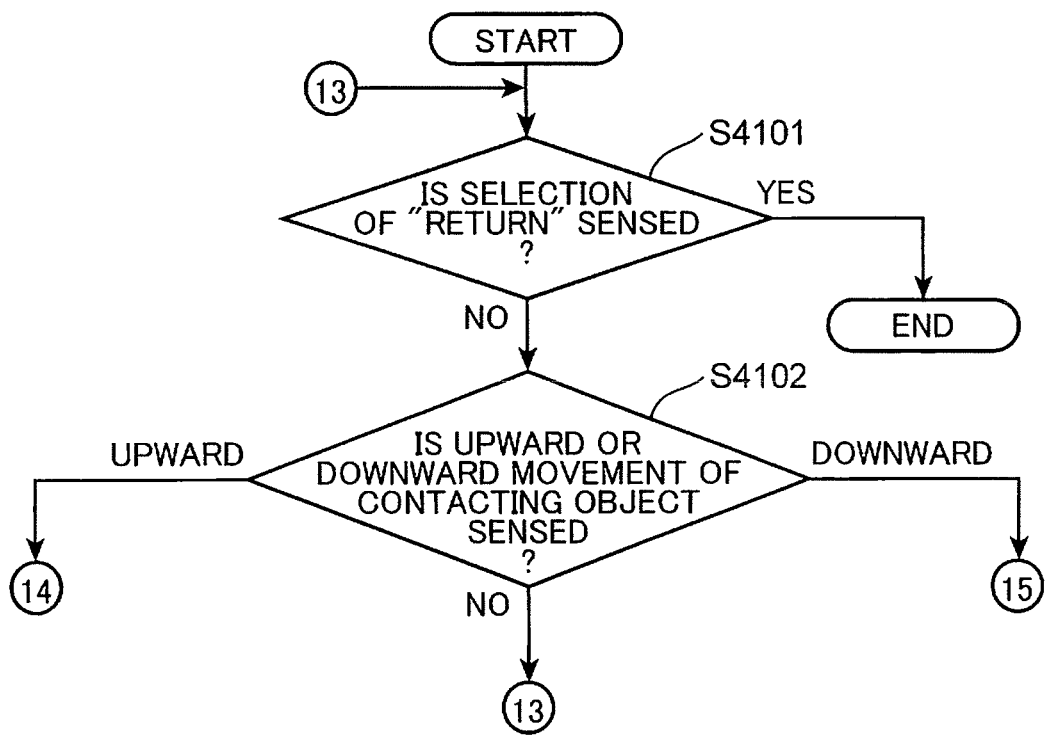
FIG. 41A is a flowchart showing a process flow for the operation terminal to generate and transmit a control command for controlling the shade curtain of the electric curtain system in the embodiment of FIGS. 37 to 40.
Figure 41B:
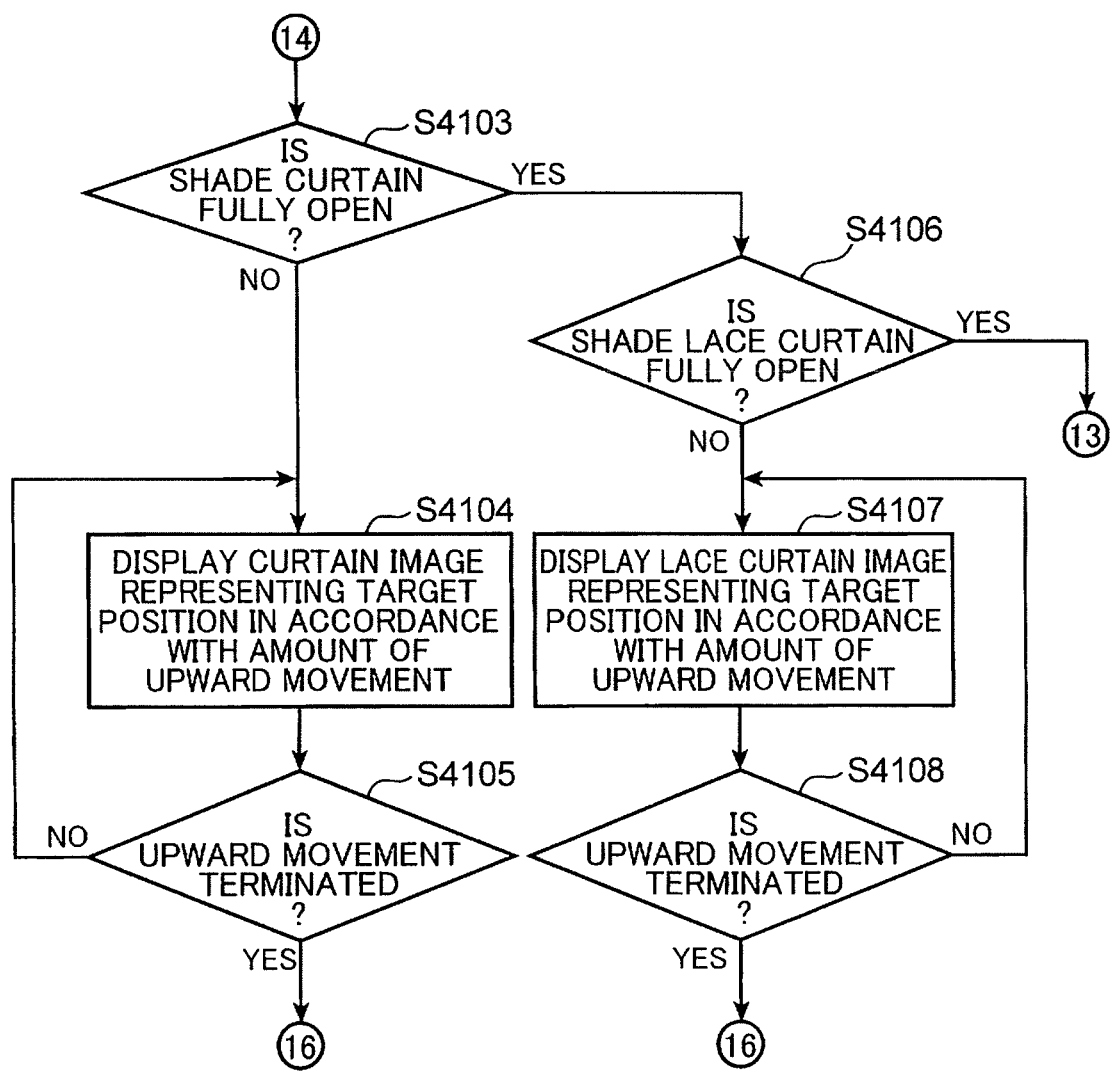
FIG. 41B is a flowchart showing a process flow for the operation terminal to generate and transmit a control command for controlling the shade curtain of the electric curtain system in the embodiment of FIGS. 37 to 40.
Figure 41C:
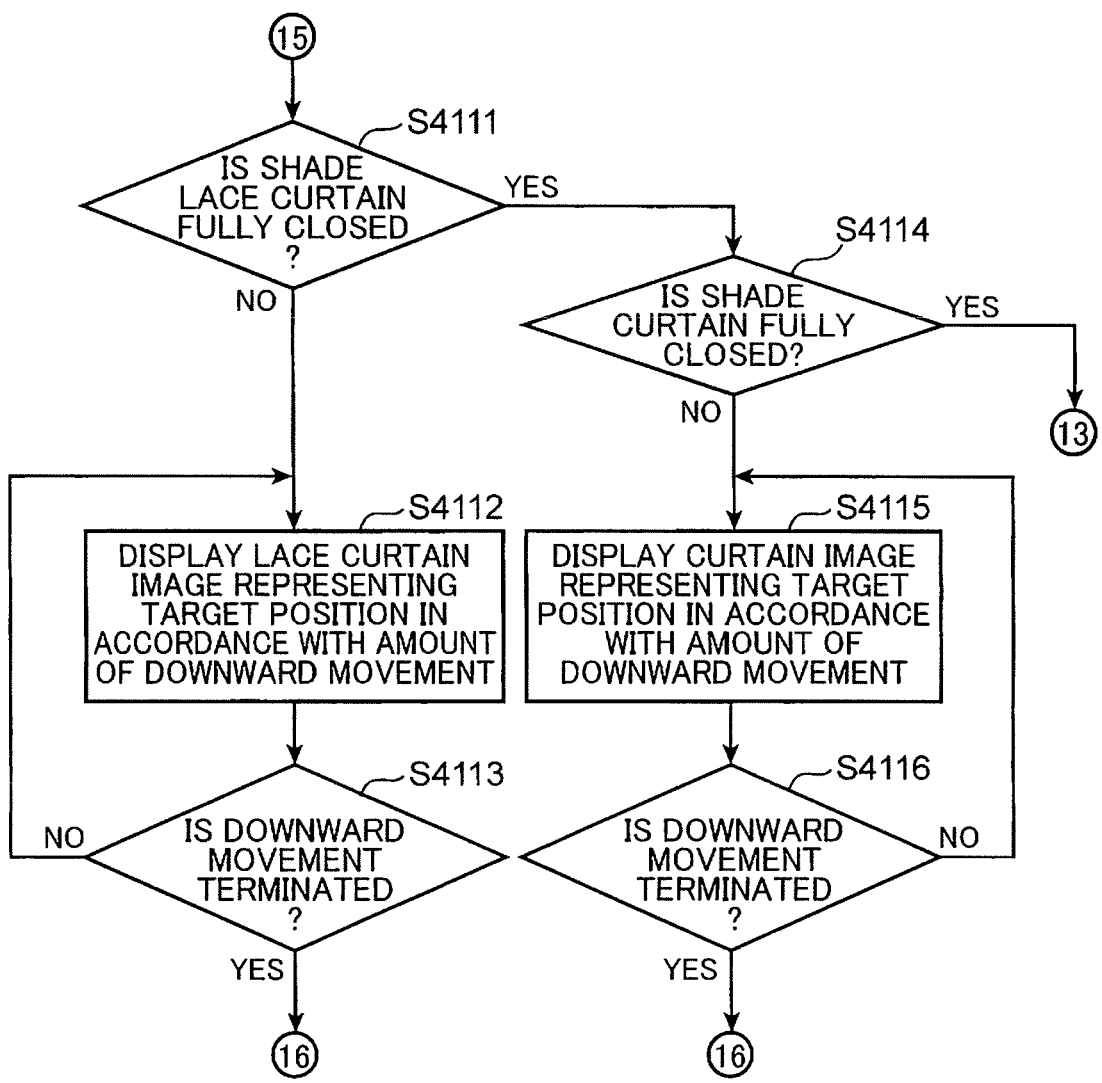
FIG. 41C is a flowchart showing a process flow for the operation terminal to generate and transmit a control command for controlling the shade curtain of the electric curtain system in the embodiment of FIGS. 37 to 40.
Figure 41D:
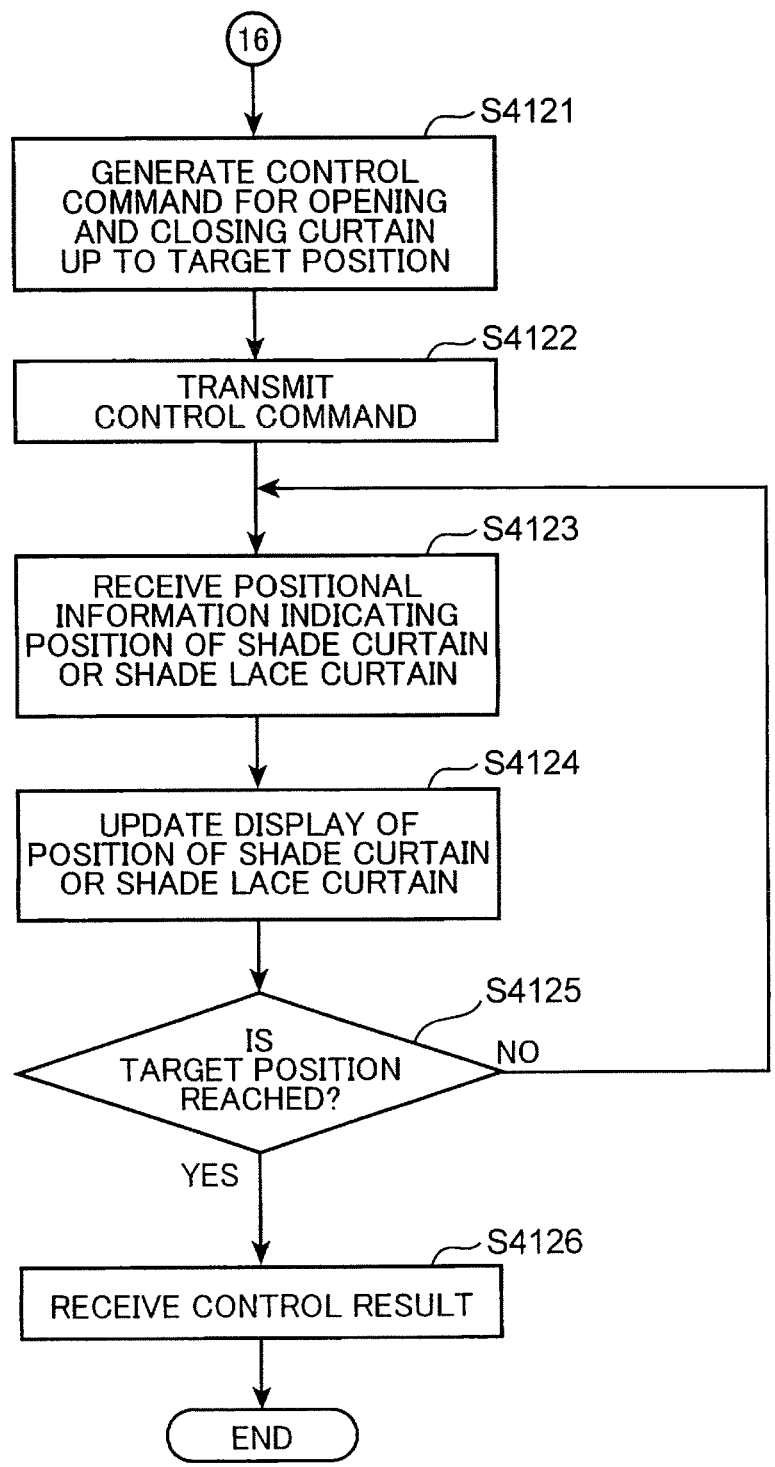
FIG. 41D is a flowchart showing a process flow for the operation terminal to generate and transmit a control command for controlling the shade curtain of the electric curtain system in the embodiment of FIGS. 37 to 40.

S4101 to S4108 of FIGS. 41A and 41B are the same as S2001 to S2008, respectively, of FIGS. 20A and 20B. S4111 to S4116 of FIG. 41C are the same as S2011 to S2016, respectively, of FIG. 20C. S4121 and S4122 of FIG. 41D are the same as S2021 and S2022, respectively, of FIG. 20D. It should be noted, however, that a control command is transmitted in S4122 to the electric curtain system 201, not to the electric curtain system 200 as in S2022.

In FIG. 41D, subsequent to S4122, the communication control section 106 receives positional information indicating the position of the shade curtain or the shade lace curtain, and delivers the received positional information to the display control section 103 and the curtain control section 105 (S4123). Then, the display control section 103 displays the position of the shade curtain or the shade lace curtain on the curtain control screen 410 on the basis of the received positional information (S4124). In S4124, the display control section 103 displays the schematic shade curtain movement image 510 in the embodiment of FIGS. 37 and 38, and displays the position display marks 511 and 512 in the embodiment of FIGS. 39 and 40.

Then, the curtain control section 105 judges, on the basis of the positional information received in S4123, whether or not the shade curtain or the shade lace curtain has reached the target position (S4125). If the shade curtain or the shade lace curtain has not reached the target position in S4125 (NO in S4125), the process returns to S4123. If the shade curtain or the shade lace curtain has reached the target position in S4125 (YES in S4125), on the other hand, the communication control section 106 receives the control result transmitted from the electric curtain system 201, and delivers the received control result to the curtain control section 105 (S4126). The flow is thus terminated.

Thus, S4124 is executed until the shade curtain or the shade lace curtain reaches the target position. As a result, the position of the shade curtain or the shade lace curtain displayed on the curtain control screen 410 of the display 101 is updated each time S4124 is executed (for example, at intervals of 0.1 seconds).

Figure 42:
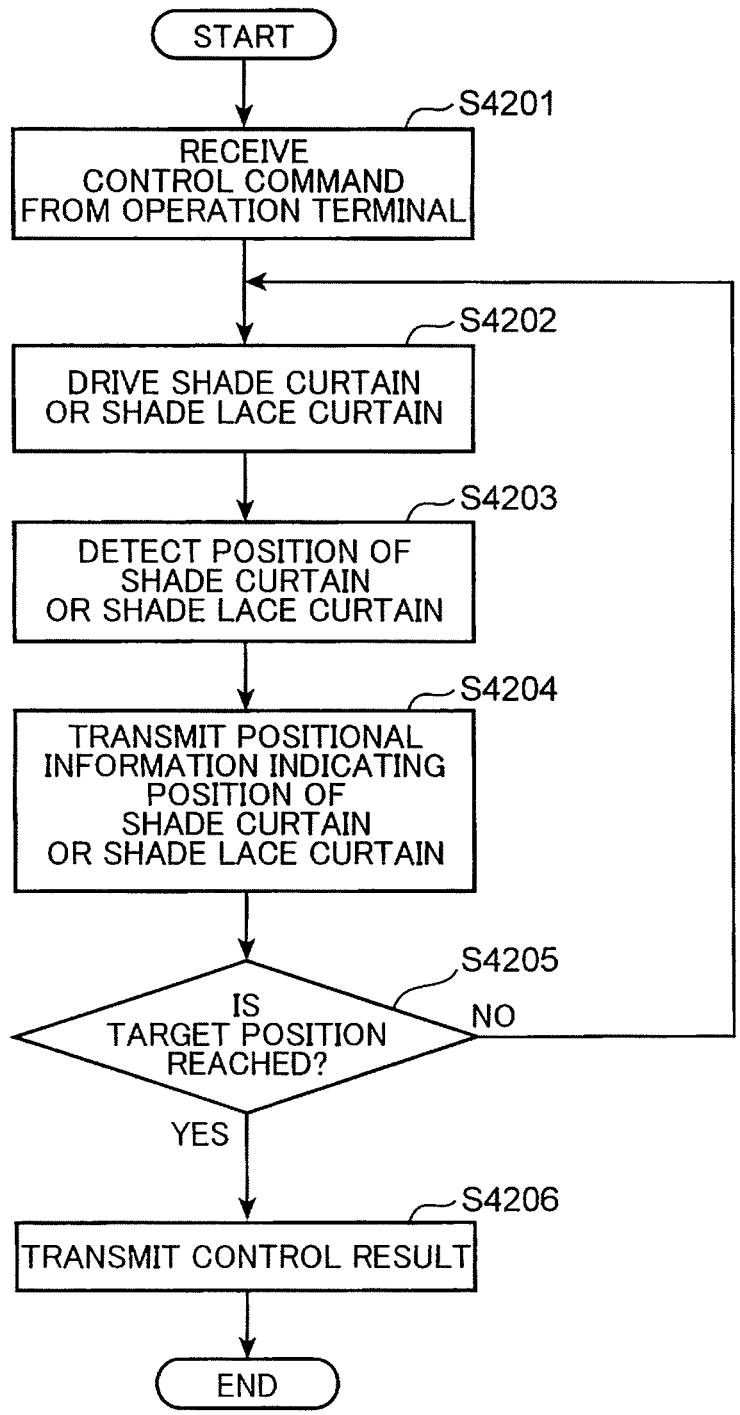
FIG. 42 is a flowchart showing a process flow in the electric curtain system in the embodiment of FIGS. 37 to 40.

FIG. 42 is a flowchart showing a process flow in the electric curtain system 201 in the embodiment of FIGS. 37 to 40. First, the communication control section 214 of the electric curtain system 201 receives a control command for opening and closing a curtain transmitted from the operation terminal 100, and delivers the control command to the curtain control section 213 (S4201).

Then, the curtain control section 213 controls the drive section 211 in accordance with the received control command to drive the shade curtain or the shade lace curtain (S4202). Next, the curtain control section 213 acquires the result of detection of the open/close state (position) of the shade curtain or the shade lace curtain from the position sensor 212 (S4203).

Next, the curtain control section 213 generates positional information indicating the position of the shade curtain or the shade lace curtain on the basis of the result of detection of the open/close state of the shade curtain or the shade lace curtain, and the communication control section 214 transmits the generated positional information to the operation terminal 100 (S4204).

Subsequently, the curtain control section 213 judges, on the basis of the acquired detection result, whether or not the shade curtain or the shade lace curtain has reached the target position indicated by the control command (S4205). If the shade curtain or the shade lace curtain has not reached the target position (NO in S4205), the process returns to S4202.

If the shade curtain or the shade lace curtain has reached the target position in S4205 (YES in S4205), on the other hand, the communication control section 214 receives a request from the curtain control section 213, and transmits the control result to the operation terminal 100 (S4206). The flow is thus terminated.

Thus, S4204 is executed until the shade curtain or the shade lace curtain reaches the target position. As a result, the positional information indicating the position of the shade curtain or the shade lace curtain is transmitted to the operation terminal 100 each time S4204 is executed (for example, at intervals of 0.1 seconds).

INDUSTRIAL APPLICABILITY

The present disclosure provides a useful control method for controlling an electric curtain device connected to a network.

The invention claimed is:

1. A method for controlling an information apparatus, the information apparatus having a touch panel display and being connected to a network, an electric curtain device being controlled over the network, the electric curtain device being capable of opening and closing a curtain through remote operation, the method causing the touch panel display to:
   display on the touch panel an operation icon causing an operation screen for the electric curtain device to be displayed when selected;
   display the operation screen for the electric curtain device when selecting of the operation icon is sensed,
      the operation screen simultaneously displaying
         a curtain image representing the curtain of the electric curtain device and movable on the operation screen to a target position in response to an input operation on the curtain image comprising a pinch-out operation, causing outputting of a first open control command instructing movement of the curtain to a corresponding target position corresponding to the target position of the curtain image, the movement of the curtain being sensed by a position sensor, which outputs the results thereof to the touch panel display, and
         a schematic curtain movement image,
            different from the curtain image,
            displayed on the operation screen as overlapped on the curtain image,
            which moves in response to the movement of the curtain image, as a result of the instructing of curtain movement by the pinch-out operation via the first open control command to change the position of the curtain, and as a result of the sensing of the changing position of the curtain by the position sensor, and
            which is erased when the curtain is moved to the corresponding target position corresponding to the target position to which the curtain image is moved,
         wherein the schematic curtain movement image represents the actual position of the curtain, thereby facilitating a comparison between the actual position of the curtain and the curtain image;
   sense a width of the pinch out operation on the operation screen of the touch panel display;
   when the pinch-out operation is sensed on the curtain image of the operation screen, output to the network the first open control command for opening the curtain of the electric curtain device in accordance with an operation width of the pinch-out operation on the curtain image;
   when the operation width of the pinch out operation on the curtain image corresponds to less than fully open, open the curtain image on the operation screen by a width matching an operation width of the pinch out operation on the curtain image,
   when the operation width of the pinch out operation on the curtain image corresponds to fully open, fully open the curtain image on the operation screen, and
   wherein the electric curtain device receives the first open control command via the network and is responsive to the first open control command in opening the curtain device to a width matching the operation width.

2. The method according to claim 1, wherein a lace curtain image is displayed on the operation screen in a gap between two spaced-art curtain images displayed in response to a pinch-out operation on the curtain image, the lace curtain image representing a lace curtain of an electric lace curtain device capable of opening and closing the lace curtain through remote operation.

3. The method according to claim 2, wherein when a second pinch-out operation is sensed on the touch panel on the lace curtain image, a second open control command is output to the network, the second open control command for opening the lace curtain of the electric lace curtain device corresponding to the lace curtain image.

4. The method according to claim 3, wherein when the second pinch-out operation is sensed on the touch panel, display of the lace curtain image on the operation screen is varied to a state in which the lace curtain of the electric lace curtain device is opened.

5. The method according to claim 1, wherein when a pinch-in operation is sensed on the touch panel on the curtain image, a first close control command is output to the network, the first close control command being for closing the curtain of the electric curtain device corresponding to the curtain image.

6. The method according to claim 5, wherein when the pinch-in operation is sensed on the touch panel on the curtain image, display of the curtain image on the curtain control screen is varied from a state in which the curtain of the electric curtain device is opened to a state in which the curtain of the electric curtain device is closed.

7. The method according to claim 1, wherein the electric curtain device includes an electric blind device capable of opening or closing a blind through a remote operation.

8. The method according to claim 1, wherein
   positional information indicating a position of the curtain of the electric curtain device is received via the network, and
   state information representing a position of an end portion of the curtain of the electric curtain device is displayed on the curtain control screen in accordance with the positional information.

9. The method according to claim 8, wherein the state information representing the position of the end portion of the curtain of the electric curtain device is displayed on the curtain control screen as overlapped on the curtain image.

10. The method according to claim 8, wherein the state information representing the position of the end portion of the curtain of the electric curtain device includes a schematic curtain movement image representing the position of the end portion of the curtain of the electric curtain device.

11. The method according to claim 1, wherein
   the operation screen simultaneously displays both the curtain image representing the curtain of the electric curtain device, and
a lace curtain image representing the lace curtain of the electric curtain device,
the lace curtain of the electric curtain device being moved in correspondence with an input operation on the lace curtain image for confirmation of the input operation;
when a pinch-out operation is sensed on the lace curtain image of the operation screen, output to the network, a second open control command for opening the lace curtain of the electric curtain device in accordance with an operation width of the pinch-out operation on the lace curtain image;
the curtain image is always displayed on the curtain control screen, while the lace curtain image is displayed only when the curtain image is opened fully or partially in a gap between two spaced apart curtain images generated by a pinch-out operation on the curtain image, and
the lace curtain image is movable on the operation screen only when visible in the gap between the two spaced apart curtain images and a pinch out operation is performed on the visible lace curtain image.

12. The method according to claim 1, the method further causing the touch panel display to:
sense the position of the curtain with a position sensor of the electric curtain device to determine an actual position of the curtain;
each time the actual position of the curtain is determined, transmitting the actual position of the curtain to the touch panel display; and
when the actual motion of the curtain is slower than the motion of the curtain image, overlap the actual position of the curtain on the curtain image, thereby facilitating a comparison between the actual position of the curtain and the curtain image.

13. A method for controlling an information apparatus, the information apparatus having a touch panel display and being connected to a network, an electric curtain device being controlled over the network, the electric curtain device being capable of opening and closing a curtain through remote operation, the method causing the touch panel display to:
display on the touch panel display an operation icon causing an operation screen for the electric curtain device to be displayed when selected;
display the operation screen for the electric curtain device when selecting of the operation icon is sensed;
the operation screen simultaneously displaying
a curtain image representing the curtain of the electric curtain device and movable on the operation screen to a target position in response to an input operation on the curtain image comprising a pinch-in operation, causing outputting of a first close control command instructing movement of the curtain to a corresponding target position corresponding to the target position of the curtain image, the movement of the curtain being sensed by a position sensor, which outputs the results thereof to the touch panel display, and
a schematic curtain movement image,
different from the curtain image,
displayed on the operation screen as overlapped on the curtain image,
which moves in response to the movement of the curtain image, as a result of the instructing of curtain movement by the pinch-in operation via the first close control command to change the position of the curtain, and as a result of the sensing of the changing position of the curtain by the position sensor, and
which is erased when the curtain is moved to the corresponding target position corresponding to the target position to which the curtain image is moved,
wherein the schematic curtain movement image represents the actual position of the curtain, thereby facilitating a comparison between the actual position of the curtain and the curtain image; and
sense a width of the pinch-in operation on the operation screen of the touch panel display;
when the pinch-in operation is sensed on the curtain image of the operation screen, output to the network the first close control command for closing the curtain of the electric curtain device in accordance with an operation width of the pinch-in operation on the curtain image;
when the operation width of the pinch-in operation on the curtain image corresponds to less than fully closed, close the curtain image on the operation screen by a width matching an operation width of the pinch-in operation on the curtain image,
when the operation width of the pinch-in operation on the curtain image corresponds to fully closed, fully close the curtain image on the operation screen, and
wherein the electric curtain device receives the first close control command via the network and is responsive to the first close control command in closing the curtain for a width matching the operation width.

14. The method according to claim 13, wherein
positional information indicating a position of the curtain of the electric curtain device is received via the network; and
state information representing a position of an end portion of the curtain of the electric curtain device is displayed on the curtain control screen in accordance with the positional information.

15. The method according to claim 14, wherein the state information representing the position of the end portion of the curtain of the electric curtain device is displayed on the curtain control screen as overlapped on the curtain image.

16. The method according to claim 14, wherein the state information representing the position of the end portion of the curtain of the electric curtain device includes a schematic curtain movement image representing the position of the end portion of the curtain of the electric curtain device.

17. A method for controlling an information apparatus, the information apparatus having a touch panel display and being connected to a network, an electric curtain device being controlled over the network, the electric curtain device being capable of opening and closing a curtain through remote operation, the method causing the touch panel display to:
display on the touch panel display an operation icon causing an operation screen for the electric curtain device to be displayed when selected;
display the operation screen for the electric curtain device when selecting of the operation icon is sensed;
the operation screen simultaneously displaying
a curtain image representing the curtain of the electric curtain device and movable on the operation screen to a target position in response to an input operation on the curtain image comprising a swipe operation, causing outputting of a first distance control command instructing movement of the curtain to a corresponding target position corresponding to the target position of the curtain image, the movement of the curtain being sensed by a position sensor, which outputs the results thereof to the touch panel display, and a schematic curtain movement image,
different from the curtain image,
displayed on the operation screen as overlapped on the curtain image,
which moves in response to the movement of the curtain image, as a result of the instructing of curtain movement by the swipe operation via the first distance control command to change the position of the curtain, and as a result of the sensing of the changing position of the curtain by the position sensor, and
which is erased when the curtain is moved to the corresponding target position corresponding to the target position to which the curtain image is moved,
wherein the schematic curtain movement image represents the actual position of the curtain, thereby facilitating a comparison between the actual position of the curtain and the curtain image;

sense a width and direction of the swipe operation on the operation screen of the touch panel display;

when the swipe operation is sensed on the curtain image of the operation screen, output to the network the first distance control command for moving the curtain of the electric curtain device in a swipe direction of the swipe operation in accordance with an amount of movement in the swipe direction of the swipe operation on the curtain image;

when the amount of movement in the swipe direction on the curtain image corresponds to less than fully open and less than fully closed, move the curtain image on the operation screen for a distance matching an operation distance of the swipe operation on the curtain image, when the amount of movement in the swipe direction of the swipe operation on the curtain image corresponds to fully open or fully close, move the curtain image on the operation screen to fully open or fully close, and wherein the electric curtain device receives the first distance control command via the network and is responsive to the first distance control command in moving the curtain.

18. The method according to claim 17, wherein movement of the curtain of the electric curtain device includes movement to open the curtain of the electric curtain device or movement to close the curtain of the electric curtain device.

19. The method according to claim 17, wherein the electric curtain device has a curtain which opens or closes in one direction.

20. The method according to claim 19, wherein the electric curtain device includes an electric roll screen device, the electric roll screen device having a roll screen which opens or closes in one direction, as the curtain which opens or closes in one direction.

21. The method according to claim 19, wherein the electric curtain device includes an electric blind device, the electric blind device having a blind which opens or closes in one direction, as the curtain which opens or closes in one direction.

22. The method according to claim 17, wherein
positional information indicating a position of the curtain of the electric curtain device is received via the network, and
state information representing a position of an end portion of the curtain of the electric curtain device is displayed on the curtain control screen in accordance with the positional information.

23. The method according to claim 22, wherein the state information representing the position of the end portion of the curtain of the electric curtain device is displayed on the curtain control screen as overlapped on the image representing movement of the curtain of the electric curtain device.

24. The method according to claim 22, wherein the state information representing the position of the end portion of the curtain of the electric curtain device includes a schematic curtain movement image representing the position of the end portion of the curtain of the electric curtain device.

25. A non-transitory computer-readable recording medium which stores a program to be executed by an information apparatus, the information apparatus having a touch panel display and being connected to a network, an electric curtain device being controlled over the network, the electric curtain device being capable of opening and closing a curtain through remote operation, the program causing the touch panel display to:

display on the touch panel display an operation icon causing an operation screen for the electric curtain device to be displayed when selected;

display the operation screen for the electric curtain device when selecting of the operation icon is sensed;
the operation screen simultaneously displaying
a curtain image representing the curtain of the electric curtain device and movable on the operation screen to a target position in response to an input operation on the curtain image comprising a pinch-out operation, causing outputting of a first open control command instructing movement of the curtain to a corresponding target position corresponding to the target position of the curtain image, the movement of the curtain being sensed by a position sensor, which outputs the results thereof to the touch panel display, and
a schematic curtain movement image,
different from the curtain image,
displayed on the operation screen as overlapped on the curtain image,
which moves in response to the movement of the curtain image, as a result of the instructing of curtain movement by the pinch-out operation via the first open control command to change the position of the curtain, and as a result of the sensing of the changing position of the curtain by the position sensor, and
which is erased when the curtain is moved to the corresponding target position corresponding to the target position to which the curtain image is moved,
wherein the schematic curtain movement image represents the actual position of the curtain movable on the operation screen, thereby facilitating a comparison between the actual position of the curtain and the curtain image;

sense a width of the pinch out operation on the operation screen of the touch panel display;

when the pinch-out operation is sensed on the curtain image of the operation screen, output to the network the first open control command for opening the curtain of the electric curtain device in accordance with an operation width of the pinch-out operation on the curtain image;

when the operation width of the pinch out operation on the curtain image corresponds to less than fully open, open the curtain image on the operation screen for a width matching the operation width of the pinch out operation on the curtain image, when the operation width of the pinch out operation on the curtain image corresponds to a fully open position, fully open the curtain image on the operation screen, and wherein the electric curtain device receives the first open control command via the network and is responsive to the first open control command in opening the curtain for a width matching the operation width.

26. A non-transitory computer-readable recording medium which stores a program to be executed by an information apparatus, the information apparatus having a touch panel display and being connected to a network, an electric curtain device being controlled over the network, the electric curtain device being capable of opening and closing a curtain through remote operation, the program causing the touch panel to:

display on the touch panel display an operation icon causing an operation screen for the electric curtain device to be displayed when selected;

display the operation screen for the electric curtain device when selecting of the operation icon is sensed;

the operation screen simultaneously displaying a curtain image representing the curtain of the electric curtain device and movable on the operation screen to a target position in response to an input operation on the curtain image comprising a pinch-in operation, causing outputting of a first close control command instructing movement of the curtain to a corresponding target position corresponding to the target position of the curtain image, the movement of the curtain being sensed by a position sensor, which outputs the results thereof to the touch panel display, and a schematic curtain movement image,
different from the curtain image,
displayed on the operation screen as overlapped on the curtain image,
which moves in response to the movement of the curtain image, as a result of the instructing of curtain movement by the pinch-in operation via the first close control command to change the position of the curtain, and as a result of the sensing of the changing position of the curtain by the position sensor, and
which is erased when the curtain is moved to the corresponding target position corresponding to the target position to which the curtain image is moved,
wherein the schematic curtain movement image represents the actual position of the curtain movable on the operation screen thereby facilitating a comparison between the actual position of the curtain and the curtain image, sense a width of the pinch-in operation on the operation screen of the touch panel display;

when the pinch-in operation is sensed on the curtain image of the operation screen, output to the network the first close control command for closing the curtain of the electric curtain device in accordance with an operation width of the pinch-in operation on the curtain image;

when the operation width of the pinch-in operation on the curtain image corresponds to less than fully closed, close the curtain image on the operation screen by a width matching an operation width of the pinch-in operation on the curtain image, when the operation width of the pinch-in operation on the curtain image corresponds to fully closed, fully close the curtain image on the operation screen, and wherein the electric curtain device receives the first close control command via the network and is responsive to the first close control command in closing the curtain for a width matching the operation width.

27. A non-transitory computer-readable recording medium which stores a program to be executed by an information apparatus, the information apparatus having a touch panel display and being connected to a network, an electric curtain device being controlled over the network, the electric curtain device being capable of opening and closing a curtain through remote operation, the program causing the touch panel display to:

display on the touch panel display an operation icon causing an operation screen for the electric curtain device to be displayed when selected;

display the operation screen for the electric curtain device when selecting of the operation icon is sensed;

the operation screen simultaneously displaying a curtain image representing the curtain of the electric curtain device and movable on the operation screen to a target position in response to an input operation on the curtain image comprising a swipe operation, causing outputting of a first distance control command instructing movement of the curtain to a corresponding target position corresponding to the target position of the curtain image, the movement of the curtain being sensed by a position sensor, which outputs the results thereof to the touch panel display, and a schematic curtain movement image,
different from the curtain image,
displayed on the operation screen as overlapped on the curtain image,
which moves in response to the movement of the curtain image, as a result of the instructing of curtain movement by the swipe operation via the first distance control command to change the position of the curtain, and as a result of the sensing of the changing position of the curtain by the position sensor, and
which is erased when the curtain is moved to the corresponding target position corresponding to the target position to which the curtain image is moved,
wherein the schematic curtain movement image represents the actual position of the curtain movable on the operation screen, thereby facilitating a comparison between the actual position of the curtain and the curtain image, sense a width and direction of the swipe operation on the operation screen of the touch panel display;

when the swipe operation is sensed on the curtain image of the operation screen, output to the network the first distance control command for moving the curtain of the electric curtain device in a swipe direction of the swipe operation in accordance with an amount of movement in the swipe direction of the swipe operation on the curtain image;

when the amount of movement in the swipe direction on the curtain image corresponds to less than fully open and less than fully closed, move the curtain image on the operation screen for a distance matching an operation distance of the swipe operation on the curtain image, when the amount of movement in the swipe direction of the swipe operation on the curtain image corresponds to fully open or fully closed, move the curtain image on the operation screen to fully open or fully closed, and wherein the electric curtain device receives the first distance control command via the network and is responsive to the first distance control command in moving the curtain.

* * * * *